United States Patent
Aruga et al.

(12) 
(10) Patent No.: US 6,667,615 B2
(45) Date of Patent: Dec. 23, 2003

(54) COIN IDENTIFYING DEVICE USING MAGNETIC SENSORS

(75) Inventors: Fusayoshi Aruga, Hara-mura (JP); Junichi Nakajyo, Hara-mura (JP); Shogo Momose, Hara-mura (JP); Hiroshi Nakamura, Hara-mura (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 11 days.

(21) Appl. No.: 09/780,263

(22) Filed: Feb. 9, 2001

(65) Prior Publication Data

US 2001/0028246 A1 Oct. 11, 2001

(30) Foreign Application Priority Data

| Feb. 10, 2000 | (JP) | 2000-033234 |
| Sep. 19, 2000 | (JP) | 2000-283249 |
| Sep. 25, 2000 | (JP) | 2000-291148 |
| Oct. 12, 2000 | (JP) | 2000-312516 |
| Oct. 31, 2000 | (JP) | 2000-333698 |
| Oct. 31, 2000 | (JP) | 2000-333714 |
| Dec. 7, 2000 | (JP) | 2000-372507 |

(51) Int. Cl.[7] .............. G07D 5/02; G01B 7/34; G01B 7/00; G01N 27/72
(52) U.S. Cl. ............. 324/232; 324/299; 324/243; 194/320; 194/328
(58) Field of Search ............... 324/229, 232, 324/233, 234, 235, 239–243, 207.17, 207.26; 194/206, 317, 318, 319, 320, 328

(56) References Cited

FOREIGN PATENT DOCUMENTS

EP    1 124 111 A2    8/2001

*Primary Examiner*—Jay Patidar
(74) *Attorney, Agent, or Firm*—Reed Smith LLP

(57) ABSTRACT

The present invention provides for a metallic surface identifying sensor including: a magnetic pole portion for detection which shifts facing a surface of a magnetic body to be identified having an uneven shape wherein the distance from the surface to be identified changes along with the uneven shape while shifting; a reference magnetic pole portion which is placed across from a reference surface, wherein the distance from the reference surface to the magnetic pole portion is maintained approximately constant regardless of the shifting of the magnetic pole portion for detection in relation with the surface to be identified; magnetizing coils which are separately wound around the magnetic pole portion for detection and the reference magnetic pole portion to generate magnetic fluxes; and detecting coils which are separately wound around the magnetic pole portion for detection and the reference magnetic pole portion to detect the magnetic fluxes wherein the uneven shape of the surface to be identified of the metallic body is detected based on detection outputs from the magnetic pole portion. The present invention also provides for a differential magnetism sensor apparatus, a coin identifying apparatus, a magnetic sensor body, a coin identifying sensor, a displacement sensor and a proximity sensor.

7 Claims, 29 Drawing Sheets

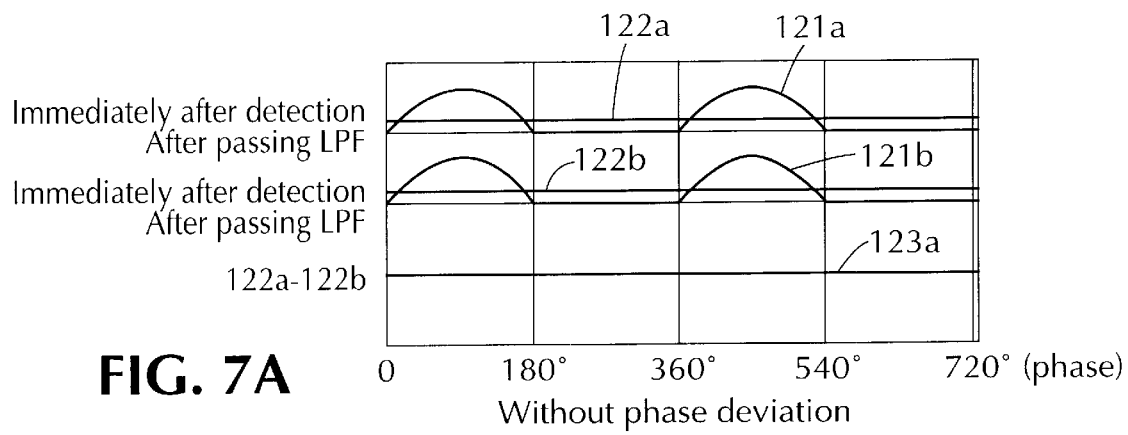
FIG. 7A — Without phase deviation
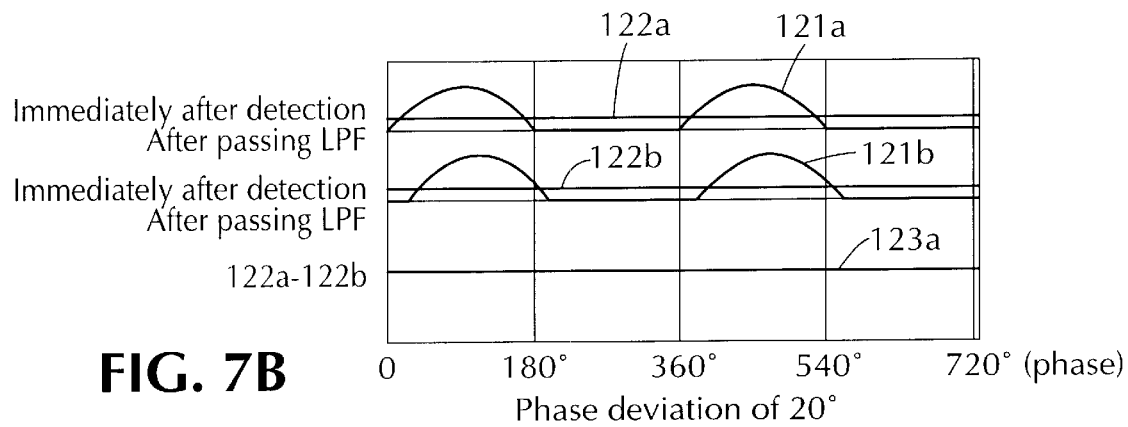
FIG. 7B — Phase deviation of 20°
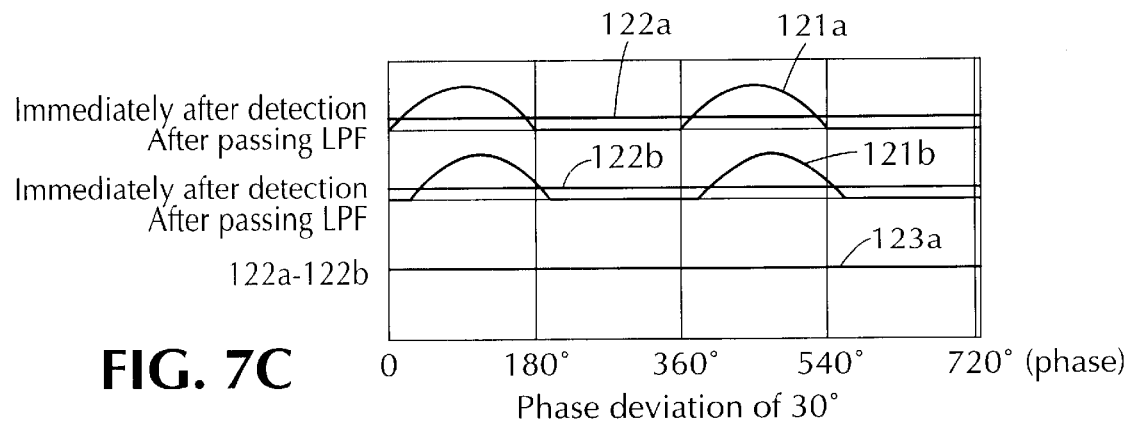
FIG. 7C — Phase deviation of 30°

COIN IDENTIFYING DEVICE USING MAGNETIC SENSORS

BACKGROUND OF THE INVENTION

1. Field of the Invention

The present invention relates to a magnetic sensor, in particular a metallic surface identifying sensor, which detects an uneven shape on a surface of a metallic body.

The present invention also relates to a differential magnetism sensor apparatus in which the magnetic variation in a magnetizing coil caused by an object to be detected which generates a magnetic flux in a closed loop is amplified and output. In particular, the present invention relates to a signal processing method for a signal output from a differential detecting coil.

In addition, the present invention relates to a coin identifying apparatus and a magnetic sensor body. More specifically, the present invention relates to improvement in the configuration of an identifying sensor which identifies the authenticity of coins in a vending machine and the like.

Also, the present invention relates to a displacement sensor which detects a relative position in relation to an object to be detected.

Furthermore, the present invention relates to a proximity sensor which detects magnetically the location of an object to be detected without touching the object.

2. Related Art

A coin discriminating machine of an automatic vending machine which makes a distinction between the absence and presence of a coin and between types of coins and a card discriminating machine which makes a distinction between the absence and presence of a magnetic card and between types of magnetic cards both have a magnetism sensor apparatus on board. One type of magnetism sensor apparatus is a differential magnetism sensor apparatus which differentially detects a variation caused by an object to be detected in a magnetic flux which passes through a magnetizing coil, and is disclosed in Tokuhyo No. H7-506687 and Kokai No. H3-162688.

Tokkai S53-42985 discloses a magnetic sensor, in particular a metallic surface identifying sensor, which enables highly precise identification with a simple configuration by using a change in magnetic fluxes. Herein, as shown in FIG. 1, a pair of magnetic pole portions for detection 1 and 2 move while facing the surface to be identified 3a of metallic body 3 having an uneven shape wherein detecting coils 4 and 5 are wound around magnetic pole portions 1 and 2, respectively. Additionally, magnetizing coil 7 is wound around support magnetic pole portion 6 between the pair of detecting magnetic pole portions 1 and 2. When magnetic fluxes 1 and 2 are generated in detecting magnetic pole portions 1 and 2 by an electric flow in magnetizing coil 7, detection signals corresponding to magnetic fluxes 1 and 2 are sent out from detecting coils 4 and 5, respectively.

In the above case, eddy currents are generated on the surface to be identified 3a of metallic body 3 based on magnetic fluxes 1 and 2 such that the eddy currents restrict magnetic fluxes 1 and 2. The eddy currents correspond to the distance between the surface to be identified 3a as a front surface of metallic body 3 and magnetic pole portions for detection 1 and 2. In other words, when surface 3a is flat, both magnetic poles 1 and 2 are at the same distance from surface 3a such that the amounts of magnetic fluxes 1 and 2 to be restricted are identical. As a result, detecting coils 4 and 5 send out output signals of the same intensity. Therefore, a differential output by detecting coils 4 and 5 is maintained at zero.

In the case of the surface to be identified 3a of metallic body 3 having an uneven shape, the distance between magnetic pole portions for detection 1 and 2 and surface 3a continually increases or decreases according to the uneven shape on surface 3a during the shift. Consequently, eddy currents generated on surface 3a change according to a change in the distance. More specifically, when magnetic pole portion 1, which precedes to magnetic pole portion 2 on the right side in FIG. 1, faces convex portion 3b of surface 3a, the distance from magnetic pole portion 1 is small such that the eddy current becomes larger. As a result, the output from detecting coil 4 decreases. On the other hand, the following magnetic pole portion 2 on the left hand in the figure has a larger space between it and surface 3a wherein the eddy current is small such that detecting coil 5 generates a larger output. Consequently, the differential output from detecting coils 4 and 5 increases, for example, the output has a wave form including projecting portions A as shown in FIG. 10. Therefore, it is detected that surface 3a of metallic body 3 has convex portion 3b.

In recent years, there has been a problem with forged foreign coins and counterfeit coins being frequently used with domestic vending machines and ticket machines.

Currently, the following means are employed solely or in combination to identify coins in vending machines, ticket machines and central processors depending on the required rate of identification:

1) a magnetic sensor detecting conductivity, mass, diameter and thickness of a metal piece as a difference in eddy current loss;

2) an optical sensor, such as a CCD, identifying the optical pattern of a coin; and 3) identifying the diameter and thickness by mechanically selecting the size.

The conventional apparatus as described above has a simple configuration and is able to provide reliable detection outputs. However, the wave form of the detection outputs may differ from the actual shape of the surface.

For example, as shown in FIG. 1, when the summit of convex portion 3b on the surface to be identified 3a of metallic body 3 has an extended flat plane, both magnetic pole portion for detection 1, which is positioned on the right side in the figure, and the other magnetic pole portion 2, which follows magnetic pole 1 from the left side, can face the flat portion of convex portion 3b simultaneously. As a result, the distances from each of magnetic poles 1 and 2 to the surface become identical. Therefore, the sensor does not provide a differential output from detecting coils 4 and 5 although convex portion 3b exists thereat. As shown in FIG. 2(b), the differential output is zero such that the convex portion 3b cannot be detected.

However, qualities of the forged foreign coins and counterfeit coins are improved every year. Therefore, it is very difficult to prevent illegal use of those coins by using simple identification parameters such as the material, diameter and/or thickness.

Also, simultaneously verifying a section of a coin for more accurate identification data is required instead of the conventional macro identification of material, diameter and/or thickness.

In a coin transferring apparatus, the position of coin 102 tends to move (e.g. by about 0.3 mm) while being transferred, i.e., when the coin is falling with rotation in a vending machine or when the coin is transferred on belt 103 in a central processor. Therefore, a magnetic sensor using eddy current loss cannot identify any coin 102 having a diameter which is different from the original coin 102 by an amount smaller than the amount of the change in position.

The above discussed fluctuations in the position of the coin are within the acceptable limit as long as only domestic coins are subject of identification. However, identification may be impossible in the case of foreign coins which are similar in material, diameter and thickness.

The present invention intends to provide a magnetic sensor, in particular a metallic surface identifying sensor which can precisely identify the shape of a surface of a metallic body while maintaining a simple configuration. Also, the present invention intends to provide a magnetic sensor which individually detects information about metallic bodies such as coins, e.g., material, thickness and diameter, such that is precisely identifies the kind of metallic body to be detected or weather the metallic is authentic.

It is another purpose of the present invention to provide a differential magnetism sensor apparatus which gives a high precision of the detection even if outputs from differential detecting coils have a phase shift and which can cope with a high magnetizing frequency without an expensive differential amplifier.

Another purpose of the present invention is to provide a coin identifying apparatus and a magnetic sensor body which identify the authenticity of coins by improving identifying performance using the characteristics of the coins.

Yet another purpose of the present invention is to provide a coin identifying sensor which can accurately detect the diameter of a coin in spite of a change in the position of the coin.

Another purpose of the present invention is to provide a coin identifying sensor which accurately detects the thickness of a coin regardless of a change in the position of the coin.

The present invention also intends to provide a proximity sensor which shows a high sensitivity due to a large variation of the output of the detection corresponding to a variation of the distance from an object to be detected and also shows a good linearity of the output of the detection.

Another purpose of the present invention is to provide a proximity sensor which shows a good temperature characteristic of the output of the detection, the shape of which is thin.

SUMMARY OF THE INVENTION

It has now been discovered that these purposes can be achieved by the present invention. In particular, the present invention provides for a metallic surface identifying sensor including a magnetic pole portion for detection, a reference magnetic pole portion, magnetizing coils and detecting coils. The magnetic pole portion shifts facing a surface of a magnetic body to be identified having an uneven shape wherein the distance from the surface to be identified changes along with the uneven shape while shifting. The reference magnetic pole portion is placed across from a reference surface, wherein the distance from the reference surface to the magnetic pole portion is maintained approximately constant regardless of the shifting of the magnetic pole portion for detection in relation with the surface to be identified. The magnetizing coils are separately wound around the magnetic pole portion for detection and the reference magnetic pole portion to generate magnetic fluxes. The detecting coils are separately wound around the magnetic pole portion for detection and the reference magnetic pole portion to detect the magnetic fluxes wherein said uneven shape of the surface to be identified of the metallic body is detected based on detection outputs from the magnetic pole portion.

The present invention provides for a differential magnetism sensor apparatus including a magnetizing coil which generates a closed loop magnetic field, a differential detecting coil which detects a variation of a magnetic flux passing through the magnetizing coil, and a differential amplifying device which amplifies a difference between two outputs from ends of the differential detecting coil and outputs the amplified difference as a differential output. The differential magnetism sensor apparatus further includes a demodulating device which demodulates each of the two outputs from the differential detecting coil and a low-pass filter which removes a high-frequency constituent from each of two outputs from the demodulating device, the two outputs from the differential detecting coil pass through the demodulating device and the low-pass filter and are input to the differential amplifying device.

In addition, the present invention provides for a coin identifying apparatus including a coin transferring path on which a coin to be detected is transferred along a guide while being held on a moving surface; a first detecting sensor which is positioned on the coin transferring path and which detects data regarding the material or the thickness of the coin; a second detecting sensor which detects data regarding the diameter of the coin; a third detecting sensor which detects at least one of the following: data regarding unevenness on the surface of the coin, data regarding unevenness on the side of the coin, and data regarding unevenness at the edge of the coin; and an identifying means which identifies the coin based on output signals from the first, second and third detecting sensors. The identifying means provides a temporary decision on the coin to be detected based on outputs from the first detecting sensor and the second detecting sensor and identifies the coin based on the output from the third detecting sensor while considering the temporary decision.

Furthermore, the present invention provides for a magnetic sensor body including a coin transferring path on which a coin to be detected is transferred along a guide while being held on a moving surface; a first detecting sensor which is positioned on the coin transferring path and which detects data regarding the material or the thickness of the coin; a second detecting sensor which detects data regarding the diameter of the coin; and a third detecting sensor which detects at least one of the following: data regarding unevenness on the surface of the coin, data regarding unevenness on the side of the coin, and data regarding unevenness at the edge of the coin. Furthermore, the magnetic sensor body identifies the coin by using the first, second and third detecting sensors which are integrated by a mold. Also, the first detecting sensor is configured such that it is shaped as a "U", the coin transferring path is formed between two free ends, each of the free ends has a projecting portion which projects toward the coin transferring path, and a magnetizing coil and a detecting coil are wound around the projecting portion. The second detecting sensor is configured such that it is shaped as a "] (U)", and the coin transferring path is formed between two free ends, and a magnetizing coil and a detecting coil are wound around a connecting portion which is positioned opposite from the free ends. The third detecting sensor is placed in the vicinity of the guide on the coin transferring path.

Also, the present invention provides for a magnetic sensor shaped as a "] (U)." This magnetic sensor has projecting portions such that two free ends face each other wherein a magnetizing coil and a detecting coil are wound around each of the projecting portions and a metallic body is detected while passing between the projecting portions.

In addition, the present invention provides for a magnetic sensor shaped as a "] (U)." This magnetic sensor has a magnetizing coil and a detecting coil wound around a connecting portion opposite from two free ends and a metallic body to be detected sandwiched between the two free ends.

Additionally, the present invention provides for a coin identifying sensor including first and second detecting sensor portions which detect data regarding the diameter on both sides of a coin transferred along a guide. The first and second detecting sensor portions are formed such that their cross sections are shaped as an "E". The free ends of the E-shaped first and second detecting sensor portions face each other. A magnetizing coil and first and second detecting coils are wound around the first and second detecting sensor portions. Further, the magnetizing coils of the first and second detecting sensor portions are connected in series while the first and second detecting coils are connected in phase. The first detecting coil and the second detecting coil are configured to be differential.

Further, the present invention provides for a coin identifying sensor including a first detecting sensor portion and a second detecting portion. The first detecting sensor portion has a detecting magnetic sensor including a cross section shaped as a "U" wherein a coin is transferred along a guide between free ends of the U-shaped detecting magnetic sensor, and a reference magnetic sensor which has a shape identical to the detecting magnetic sensor. The first detecting sensor portion detects data regarding the diameter on one side of the coin transferred along the guide. The second detecting sensor portion is configured identical to the first detecting sensor portion and is placed such that free ends of the detecting magnetic sensors of the first and second detecting sensor portions face each other wherein the second detecting sensor portion detects data regarding the diameter on the other side of the coin. A magnetizing coil and first and second detecting coils are wound around the first and second detecting sensor portions. The magnetizing coil of the first and second detecting sensor portions are connected in series while the first and second detecting coils are connected in phase. The first detecting coil and the second detecting coil are configured to be differential.

The present invention also provides for a coin identifying sensor including first and second thickness detecting sensor portions placed at both ends of a coin transferred along a guide wherein each of the first and second thickness detecting sensor portions include a combination of sensor bodies having a "] (U)"-shaped cross section. The first thickness detecting sensor portion is placed in the vicinity of one side of the coin in the thickness direction while the second thickness detecting sensor portion is placed in the vicinity of the other side of the coin. Also, magnetizing coils and first and second detecting coils are wound around the first and second thickness detecting sensor portions. Further, the magnetizing coils of the first and second thickness are connected in series and the first detecting coil and the second detecting coil are connected in phase and are configured to be differential.

In addition, the present invention provides for a displacement sensor which provides stable detection results with high detection sensitivity by using a simple configuration. More specifically, the displacement sensor has a configuration in which an output changes corresponding to a change in the relative position to an object to be detected and which detects a proximity position in relation to the object to be detected based on the change in the output. Magnetizing coils and detecting coils are wound around a core body such that they are lined on the axis of the core body. Furthermore, one end of each of the magnetizing coils and the detecting coils are placed at a core center portion at the approximate center of the core body in the axial direction while the other ends of the magnetizing coils and detecting coils are placed at a pair of core end portions at each end of the core body in the axial direction. Also, the axial direction of the core body is arranged to be approximately equal to the direction of a change in the relative position in relation to the object to be detected such that one of the core end portions and the object to be detected face each other when the object to be detected approaches and retreats from the core end portion.

Finally, the present invention provides for a proximity sensor which detects the location of an object to be detected without touching the object. The proximity sensor includes two magnetizing portions each of which includes a magnetizing core and a magnetizing coil wound around the magnetizing core and which are disposed at a predetermined interval, and a magnetism detecting portion which includes a detecting core and a detecting coil wounded around the detecting core and which is disposed between the two magnetizing portions. The two magnetic portions generate a flux path which passes the object to be detected and a flux path which passes the magnetism detecting portion. Also, the variation of the magnetic flux of the flux path which passes the object to be detected corresponding to a variation of the location of the object to be detected varies the magnetic flux of the flux path which passes the magnetism detecting portion, and the location of the object to be detected is detected by means of a variation of the output of the detection from the magnetism detecting portion.

BRIEF DESCRIPTION OF THE DRAWINGS

FIGS. 7(a), (b) and (c) show the simulated outputs from demodulating devices, the simulated outputs from low-pass filters and a simulated differential output from a differential amplifier in the case of a phase shift of 0 degrees, 20 degrees and 30 degrees between outputs from the differential detecting coils, respectively, when the leakage of the magnetic flux is not generated by the object to detected, in the differential magnetism sensor apparatus shown in FIG. 6.

FIG. 13(a) indicates a first detecting sensor and a second detecting sensor on the front (back) side.

FIG. 28(a) is a schematic front view and FIG. 28(b) is a schematic plan view.

FIG. 30(a) is a schematic front view and FIG. 30(b) is a schematic plan view.

DETAILED DESCRIPTION OF THE INVENTION

Figure 1:
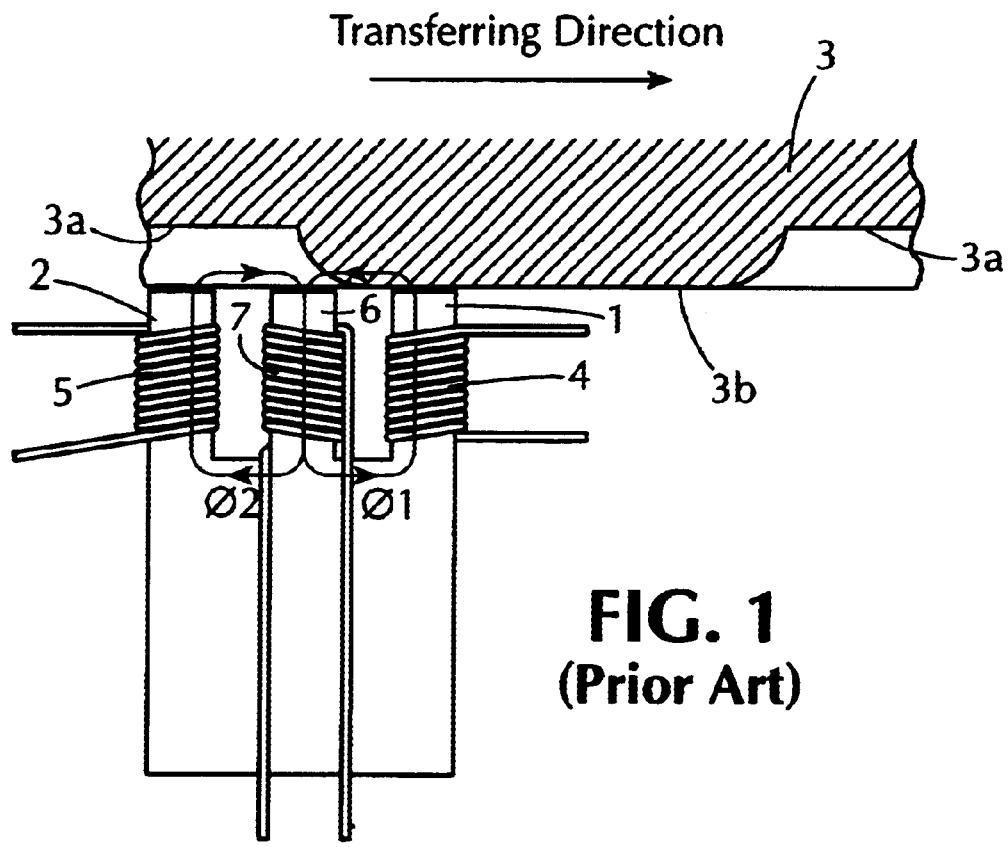
FIG. 1 is an enlarged side view of a preferred configuration of a conventional metallic surface identifying sensor according to present invention.
Figure 2:
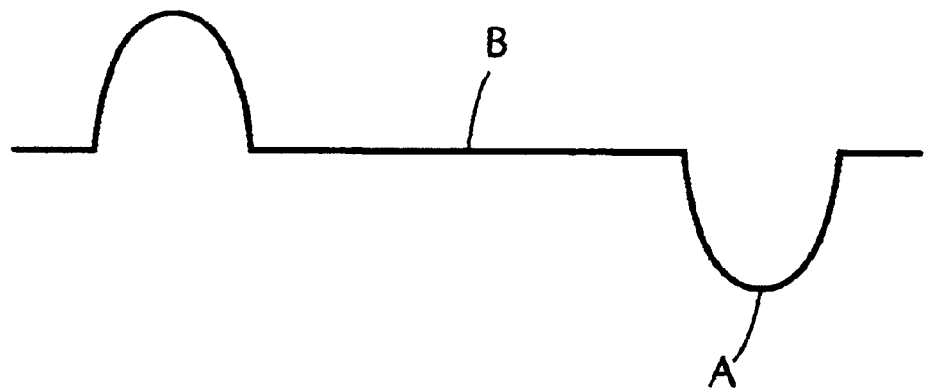
FIG. 2 is a diagram showing differential outputs by the conventional metallic surface identifying sensor shown in FIG. 1.
Figure 3:
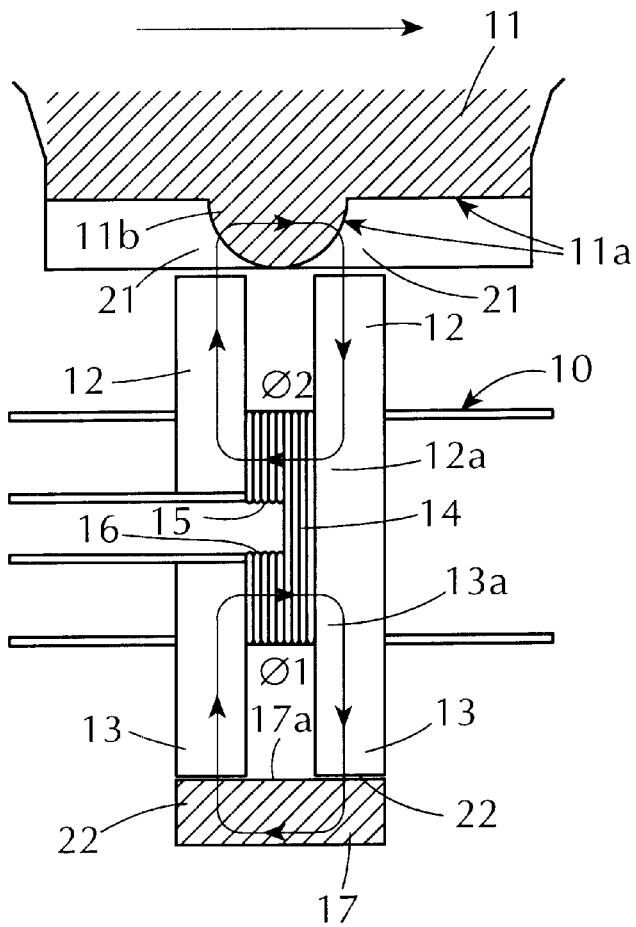
FIG. 3 is an enlarged side view of another preferred configuration of a metallic surface identifying sensor according to the present invention.

The following describes one preferred embodiment of the present invention. In magnetic sensor (metallic surface identifying sensor) 10 shown in FIG. 3, various coins 11, such as a 500 Yen coin, are metallic bodies to be identified. The sensor detects unevenly shaped portions 11b as an example of a pattern formed on surface to be identified 11a which can be either the head or the tail of the coin. The sensor comprises a pair of magnetic pole portions for detection 12 and a pair of reference magnetic pole portions 13 which project out of the facing magnetic pole portions 12.

Magnetic pole portions 12 and reference magnetic pole portions 13 are formed of a core body having an approximate shape. Magnetizing coils 14 are wound around base portions 12a and 13a of magnetic pole portions for detection 12 and reference magnetic pole portions 13. Alternating-current power supply 21 shown in FIG. 6 constantly sends magnetizing signals having a given sine wave form to magnetizing coils 14 such that magnetic fluxes 1 and 2 corresponding to the magnetizing signals are generated at magnetic pole portions for detection 12 and reference magnetic pole portions 13. In addition, detecting coils 15 and 16 are wound around base portions 12a and 13a of magnetic pole portions for detection 12 and reference magnetic pole portions 13.

Herein, magnetic pole portions for detection 12 form space for detection 21 with the surface to be identified 11a of coin 11. When coin 11 shifts in the horizontal direction as indicated with an arrow in the figure, space for detection 21 in relation to surface 11a including unevenly shaped portions 11b changes according to the shape of surface 11a, such as a design pattern thereon. Further, eddy currents are generated on surface to be identified 11a of coin 11 due to magnetic flux 2 at magnetic pole portions for detection 12. The intensity of the eddy currents change according to the size of space for detection 21 as surface 11a including unevenly shaped portions 11b passes thereby.

In other words, when magnetic pole portions for detection 12 is placed across from convex portion 11b of coin 11, space for detection 21 becomes smaller. As a result, the eddy current increases while magnetic flux 2 decreases such that the output from detecting coil 15 decreases. On the other hand, when magnetic pole portions 12 faces a concave portion of coin 11, resulting in larger space 21, the eddy current decreases. Consequently, magnetic flux 2 increases such that the output from detecting coil 15 also increases. It is said that the outputs from detecting coil 15 formed on magnetic pole portions for detection 12 completely correspond to the shape on surface 11a of coin 11.

Reference magnetic pole portion 13 maintains reference space 22 having a constant distance with reference surface 17a of reference metallic body 17 which is separately placed from coin 11 as a metallic body to be identified. More specifically, reference metallic body 17 is fixed to the core side to maintain a constant distance with reference magnetic pole portion 13, and reference surface 17a of reference metallic body 17 is formed to be flat. Consequently, the size of reference space 22 is maintained at a constant during the horizontal shift of coin 11 in the direction indicated with an arrow in the figure. Reference metallic body 17 can be formed of a material with a resistivity approximately identical to the one of coin 11, for example, copper, white copper and the like is used for a 500 Yen coin.

In spite of the shift of coin 11, reference space 22 remains constant. Therefore, the eddy current, which is generated on reference metallic body 17 by magnetic flux 1, is also maintained at a constant. Consequently, magnetic flux 1 at reference magnetic pole portion 13 remains constant such that the output from detecting coil 16 of reference magnetic pole portion 13 remains constant as well.

Figure 6:
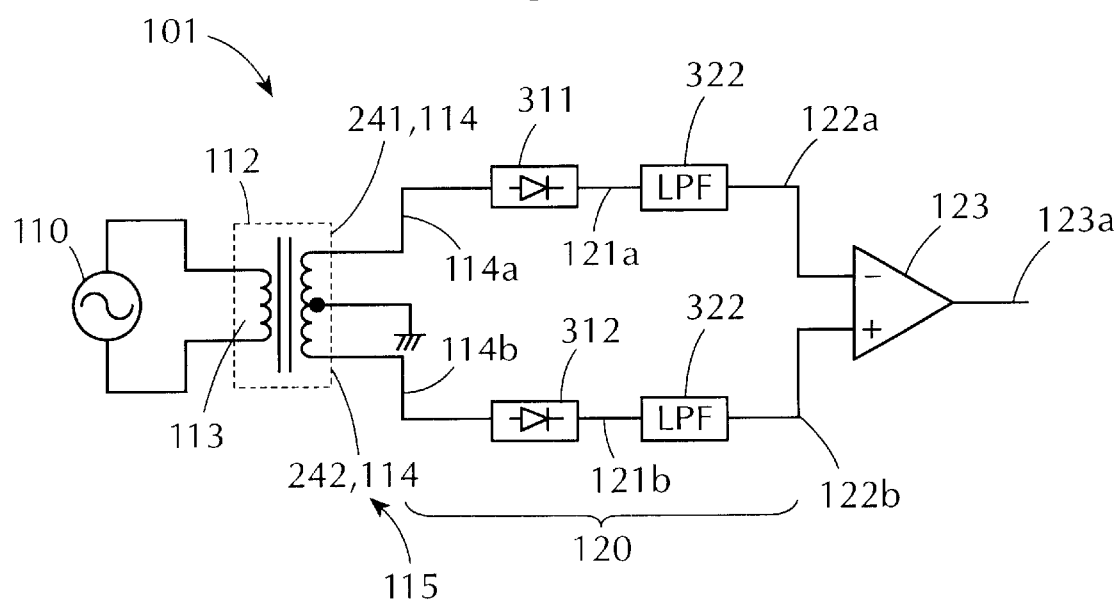
FIG. 6 is a circuit diagram which shows a differential magnetism sensor apparatus in accordance with the present invention.

As shown in FIG. 6, the output from detecting coil 15 of magnetic pole portions for detection 12 and the output from detecting coil 16 of reference magnetic pole portion 13 are provided to differential amplifier 26 via envelope detectors 22 and 23 and low path filters 24 and 25 such that differential amplifier 26 provides differential outputs.

In metallic surface identifying sensor 10 of the above embodiment, magnetic pole portions for detection 12 shift along with the unevenly shaped surface 11a of coin 11 as a metallic body to be identified. Therefore, the detection outputs at magnetic pole portions 12 change according to the shape of surface 11a. Reference magnetic pole portion 13 maintains a constant positional relation with reference surface 17a, which is different from the surface to be identified 11a, such that the detection outputs are constant. Hence, differential amplifier 26 precisely extracts the change in the detection outputs at magnetic pole portions for detection 12.

Figure 4:
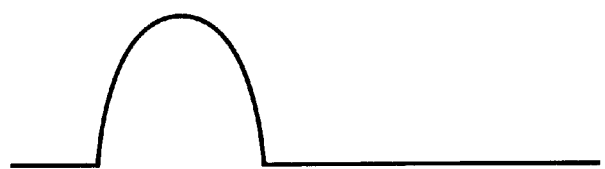
FIG. 4 is a diagram showing differential outputs by the metallic surface identifying sensor shown in FIG. 3.

As shown in FIG. 4, the detection outputs are a precise indication of the shape on the surface to be identified 11a of coin 11.

As above-described in the embodiment of the magnetic sensor (the metallic surface identifying sensor) of the present invention, the magnetic pole portion for detection is shifted along the uneven surface to be identified of a metallic body while the reference magnetic pole portion maintains a constant positional relation with a reference surface which is different from the surface to be identified. As a result, the detection outputs precisely indicate a change in the detection outputs at the magnetic pole portions for detection, that is the detection outputs which show the uneven shape on the surface to be identified. Therefore, a simple configuration can provide a highly accurate identification of the uneven shape of the coin surface. In other words, the performance of the magnetic sensor (the metallic surface identifying sensor) is improved while increasing productivity.

Figure 5:
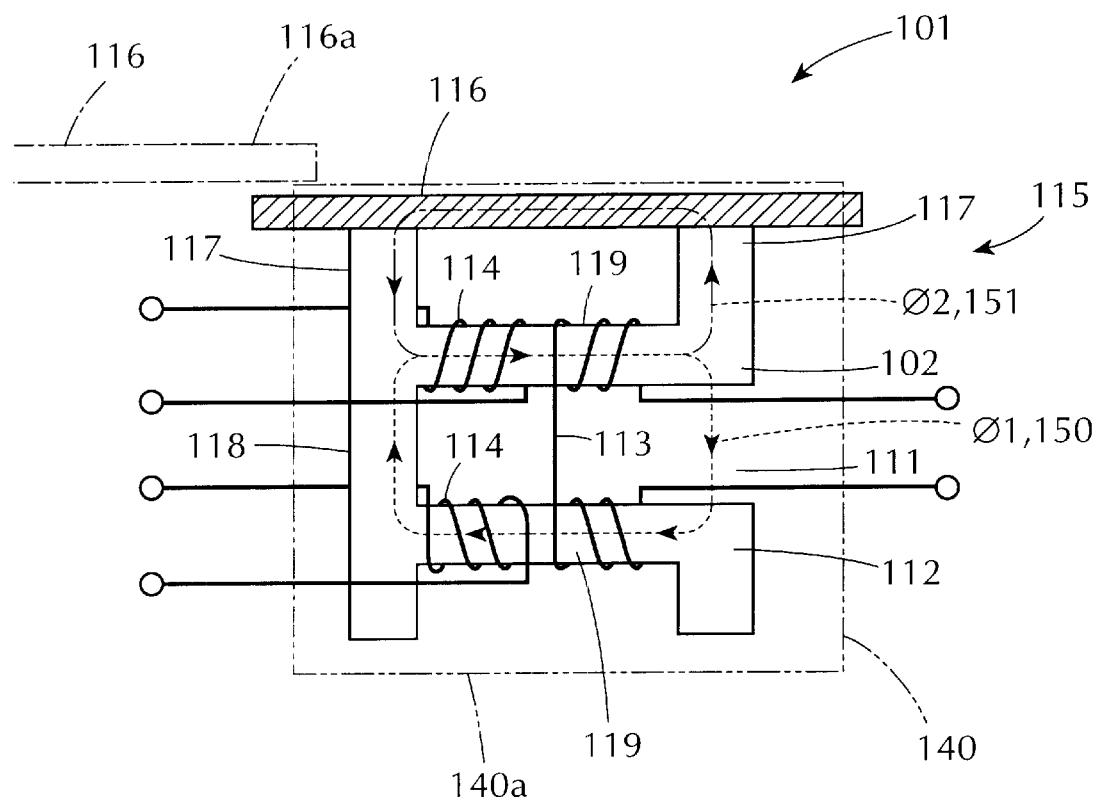
FIG. 5 shows an example of the structure of a magnetizing coil and a differential detecting coil used for a differential magnetism sensor apparatus in accordance with the present invention.

The following describes a preferred embodiment of a differential magnetic sensor apparatus of the present invention. In particular, FIG. 5 shows an example of the structures of a magnetizing coil and a differential detecting coil used in a differential magnetism sensor apparatus in accordance with the present invention. A differential magnetism sensor apparatus 101 has a magnetic sensor portion 115 which includes a magnetizing coil 113 and a differential detecting coil 114 which are wound around two main magnetic poles 112 which are disposed side by side so as to have a gap portion 111 at least on one side. The magnetic sensor portion 115 is disposed so that a magnetic flux which passes through one of the two main magnetic poles 112 varies when an object to detected 116 such as a coin or magnetic card is carried on a medium path, and has a structure such that the differential detecting coil 114 can detect a variation of a magnetic flux which passes through one of the two main magnetic poles 112. In the magnetic sensor portion 115 shown in FIG. 5, the gap portion 111 is placed only on one end side of each main magnetic pole 112, and the other ends of the two main magnetic poles 112 are connected by a connecting portion 118.

At least one end of the two main magnetic poles 112 has an auxiliary core portion 117 which assists formation of a flux path by the object to detected 116. In this embodiment, an auxiliary core portion 117 is formed on both ends of the two main magnetic poles 112. Each auxiliary core portion 117 is formed so as to project in a direction opposite to the connecting portion 118. Each main magnetic pole 112 and each auxiliary core portion 117 are made of a magnetic material with a high magnetic permeability in one united body. The magnetizing coil 113 and the differential detecting coil 114 are wound around a coil-wound portion 119 between the auxiliary core portions 117.

The magnetizing coil 113 is wound around the coil-wound portion 119 of each main magnetic pole 112. When an alternating current power, which is discussed below, is applied to the magnetizing coil 113, a magnetic flux 1 is generated, which passes through one main magnetic pole 112 and passes through the other main magnetic pole 112 in an opposite direction, as shown as a dotted line L1, resulting in a closed loop.

When the object to detected 116 is not present around the magnetic sensor portion 115 and the magnetic flux which passes through each main magnetic pole 112 is equal to each other, the magnetic fluxes which pass through each main magnetic pole 112 balance each other resulting in no difference between both outputs from the two differential detecting coils 14.

When the object to detected 116 approaches the magnetic sensor portion 115, a magnetic flux 2 shown as the dotted chain line L2 is generated. The magnetic flux 2 leaks from one main magnetic pole 112 via the auxiliary core portion 117 toward the object to detected 116, and the magnetic flux which passes through each main magnetic pole 112 is put out of balance. Since the amount of the magnetic flux 2 varies according to the magnetic permeability of the object to detected 116, an output from the differential detecting coils 114 varies depending on the magnetic permeability. The amount of a differential output in a detecting circuit described later depends on the magnetic permeability of the object to detected 116.

The configuration of the above-described differential magnetism sensor apparatus 101 is shown in FIG. 6. which is a circuit diagram. In particular, the differential magnetism sensor apparatus 101 includes magnetizing coil 113 which generates a closed loop magnetic field, an alternative-current power supply 110 for magnetizing coil 113, first and second differential detecting coils 241 and 242 (differential detecting coils 114) which are wound around magnetic pole 112 in common with the magnetizing coil 113. The median point of differential detecting coils 241 and 242 is connected to the ground.

In this embodiment of a differential magnetism sensor apparatus 101, a detecting circuit 120 includes two demodulating devices 311 and 312 which demodulate two outputs 114a and 114b from the differential detecting coils 241 and 242, respectively, and two low-pass filters 321 and 322 which remove high-frequency constituents from two outputs 114a and 114b from the differential detecting coils 241 and 242, respectively. Two outputs 114a and 114b from the differential detecting coils 241 and 242 pass through two demodulating devices 311 and 312 and two low-pass filters 321 and 322, respectively, and then are input to the differential amplifier 123. In this embodiment, since the demodulating devices 311 and 312 are disposed in front of the low-pass filters 321 and 322, two outputs 114a and 114b from the differential detecting coils 241 and 242 are input to the demodulating devices 311 and 312, outputs 121a and 121b from the demodulating devices 311 and 312 are input to the low-pass filters 321 and 322, and outputs 122a and 122b from two low-pass filters 321 and 322 are input to the differential amplifier 123, respectively.

The operation of the differential magnetism sensor apparatus 101 which is constructed as described above is now described with reference to FIGS. 6 and 7. FIGS. 7(a), (b) and (c) show simulated outputs 121a and 121b from the demodulating devices 311 and 312, simulated outputs 122a and 122b from the low-pass filters 321 and 322 and a simulated differential output 123a from the differential amplifier 123 in the case of a phase shift of 0 degrees, 20 degrees and 30 degrees between the outputs 114a and 114b from the differential detecting coils 241 and 242, respectively, when the magnetic flux 2 shown in FIG. 5 is not generated. The outputs 114a and 114b from the differential detecting coils 241 and 242 are not shown in FIGS. 7(a), (b) and (c). The wave shapes of the outputs 114a and 114b are following shown in FIGS. 11 and 12.

Figure 11A:
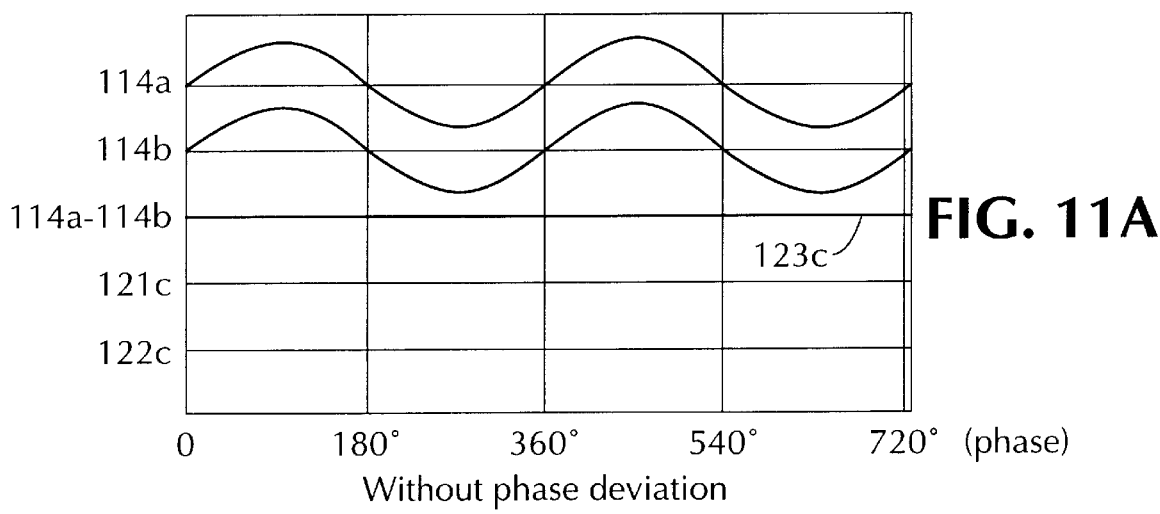
FIGS. 11(a), (b) and (c) show the simulated outputs from the differential detecting coils, the simulated differential output from a differential amplifier, the simulated output from a demodulating device and the simulated output from a low-pass filter in the case of a phase shift of 0 degrees, 20 degrees and 30 degrees between outputs from the differential detecting coils, respectively, when the leakage of the magnetic flux is not generated by the object to detected, in the differential magnetism sensor apparatus shown in FIG. 9.
Figure 11B:
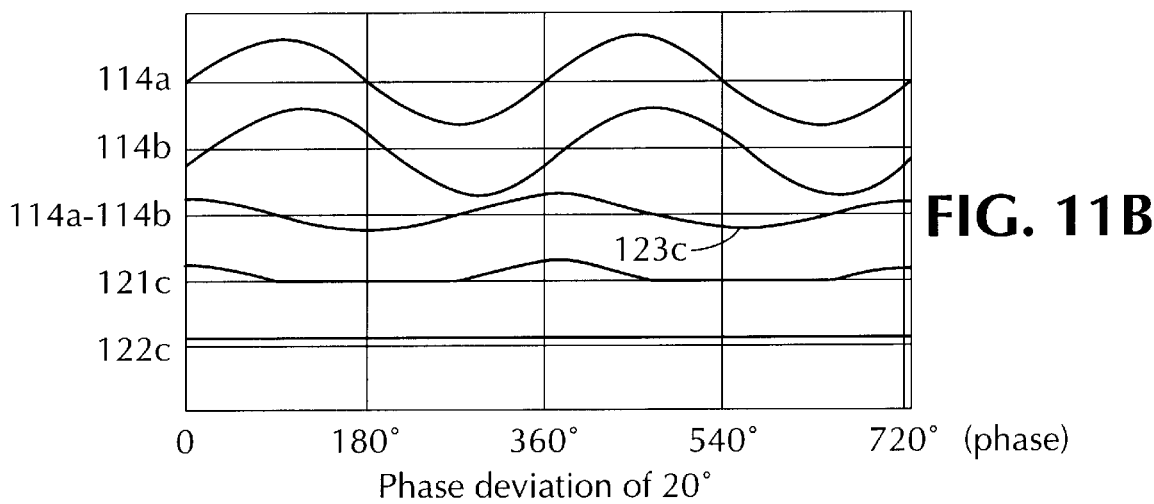
Figure 11C:
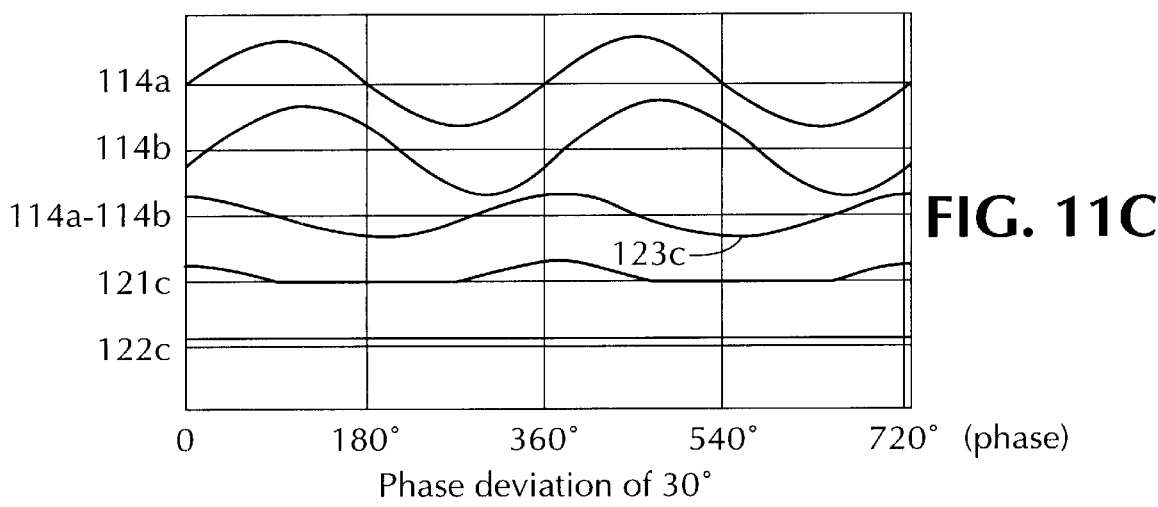
Figure 12A:
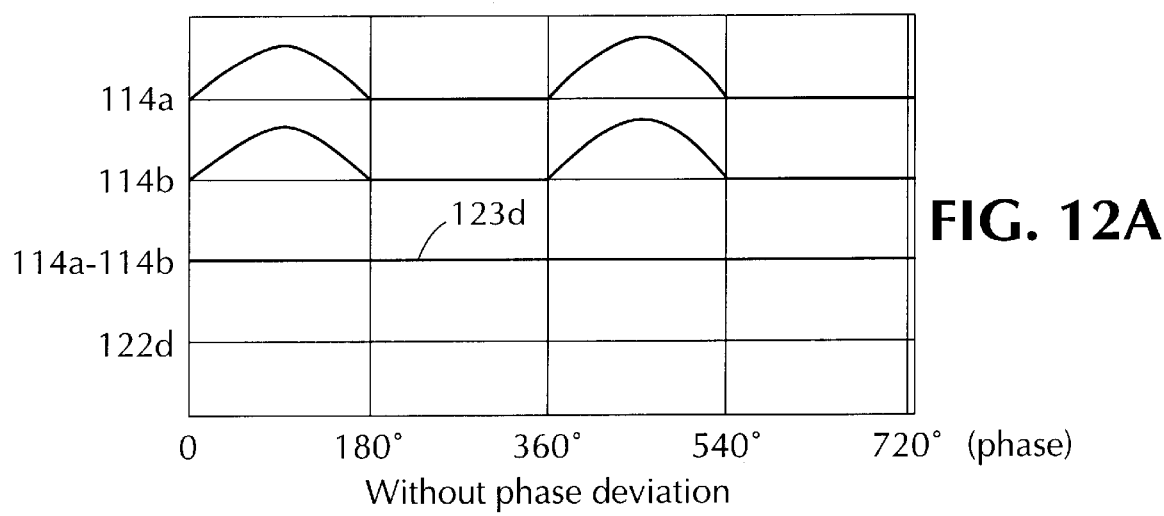
FIGS. 12(a), (b) and (c) show the simulated outputs from the differential detecting coils, the simulated differential output from a differential amplifier and the simulated output from a low-pass filter in the case of a phase shift of 0 degrees, 20 degrees and 30 degrees between outputs from the differential detecting coils, respectively, when the leakage of the magnetic flux is not generated by the object to detected, in the differential magnetism sensor apparatus shown in FIG. 10.
Figure 12B:
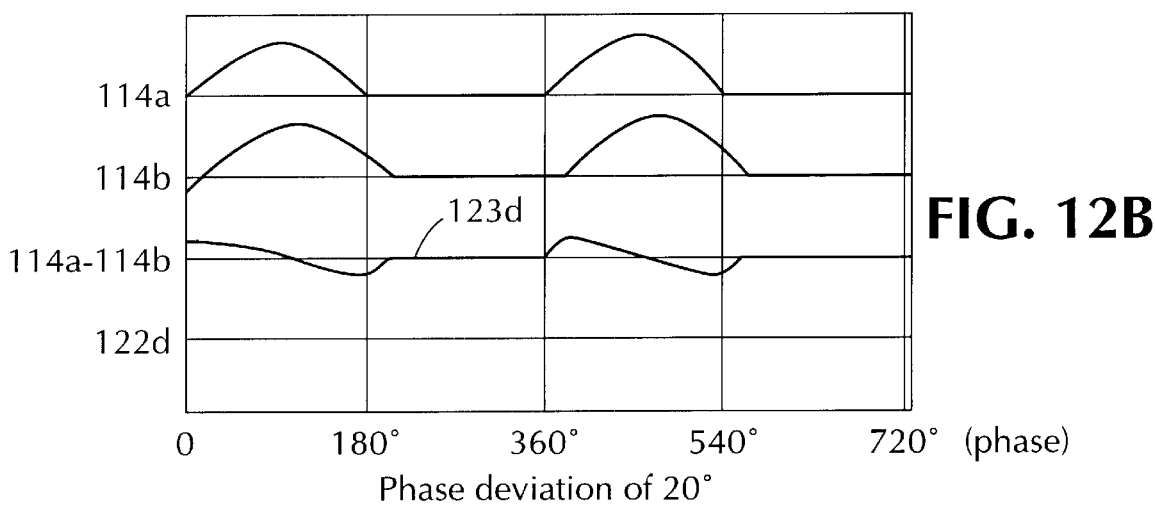
Figure 12C:
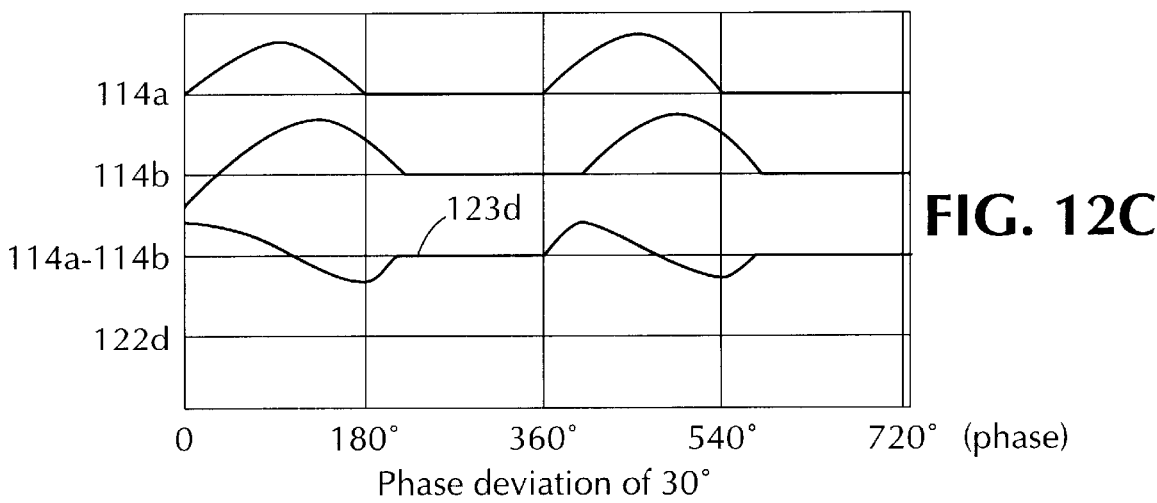

In FIGS. 6 and 7(a), two outputs 114a and 114b (See FIGS. 11(a) and 12(a)) from two differential detecting coils 241 and 242 are demodulated at two demodulating devices 311 and 312, resulting in the half-wave rectified outputs 121a and 121b, respectively. Next, the outputs 121a and 121b are input to two low-pass filters 321 and 322, and a high-frequency constituent is removed by the low-pass filters 321 and 322, resulting in the perfect direct current outputs 122a and 122b, respectively. Finally, the outputs 122a and 122b from the low-pass filters 321 and 322 are input to the differential amplifier 123, and the differential output 123a is output from the differential amplifier 123 as a difference between the outputs 122a and 122b.

As described in the above embodiment of the differential magnetism sensor apparatus 101, two outputs 114a and 114b from the differential detecting coils 241 and 242 are input as a direct current signal to the differential amplifier 123, respectively. Therefore, as shown in FIGS. 7(b) and (c), when outputs 114a and 114b from the differential detecting coils 241 and 242 have a phase shift and the outputs 121a and 121b from the demodulating devices 311 and 312 have a phase shift, the outputs 122a and 122b from the low-pass filters 321 and 322 do not have a phase shift. Therefore, the differential output 123a which is output from the differential amplifier 123, is 0 V, regardless of the presence of a phase shift between the outputs 114a and 114b, resulting in high precision of the detection of the sensor.

Also, two outputs 114a and 114b from the differential detecting coils 241 and 242 are input to the differential amplifier 123 after being converted to a perfect direct current signal. Therefore, an expensive differential amplifier 123 which shows that an excellent frequency characteristic does not need to be used resulting in the reduction of the cost of the differential magnetism sensor apparatus 101.

In addition, the detection of the present embodiment is highly precise when the magnetizing coil 113, the main magnetic poles 112 and the differential detecting coils 241 and 242 are sealed with a resin as the detection of the sensor is highly precise when a phase shift is caused. FIG. 5 shows a sealing resin shown as two dotted chain line 140a and the location of the object to detected 116 shown as two dotted chain line 116a. When the magnetizing coil 113 and the differential detecting coils 241 and 242 are sealed with a resin 140, the stress from the resin 140 during sealing or the stress from the resin 140 following a temperature change after sealing causes a phase shift between the two outputs 114a and 114b from the differential detecting coils 241 and 242. Even in such a case, the phase shift dose not reduce the precision of the detection of the sensor.

An example of a use of the differential magnetism sensor apparatus of the present invention is described with reference to FIG. 8. Since the differential magnetism sensor apparatus 101 shown in FIG. 8 is identical to that described in FIG. 6, a portion in FIG. 8 which corresponds to that in FIG. 6 has an identical code and is not described.

Figure 8:
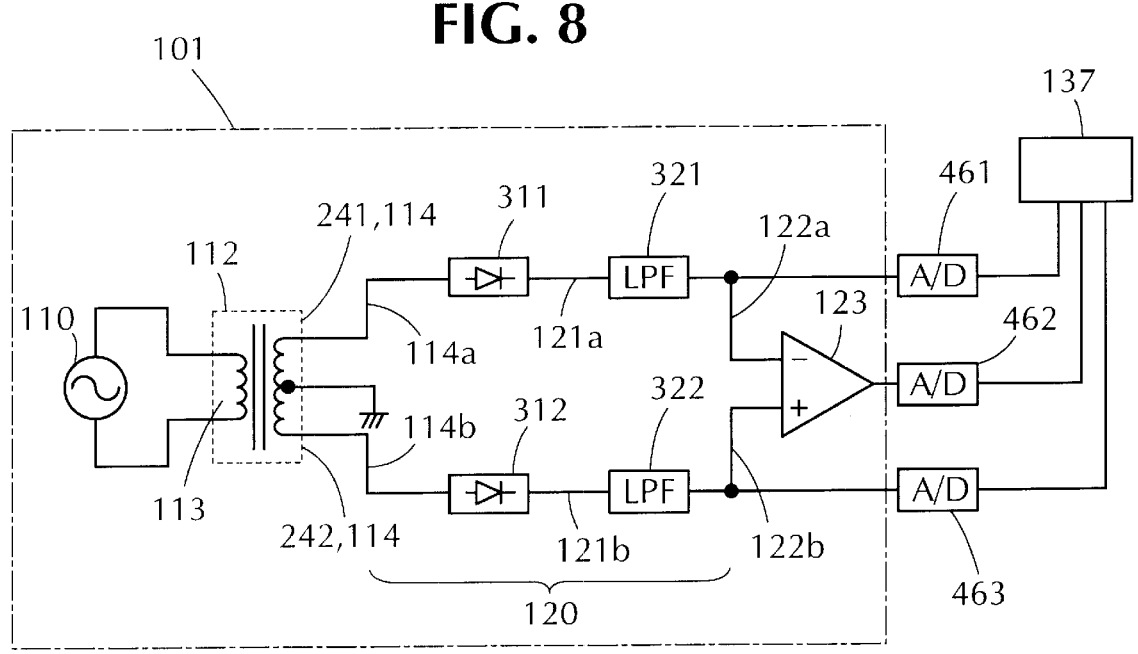
FIG. 8 is a circuit diagram which shows an example of the use of the differential magnetism sensor apparatus shown in FIG. 6.

FIG. 8 is a circuit diagram which shows the construction of an electronic instrument having the present embodiment of the differential magnetism sensor apparatus. In the electronic instrument shown in FIG. 8, the differential output 123a from the differential magnetism sensor apparatus 101 is input to a microcomputer 137 via an A/D converter 462 (analog/digital converter). Also, in the present embodiment of the differential magnetism sensor apparatus 101, two outputs 114a and 114b from the differential detecting coils 241 and 242 pass through the low-pass filters 321 and 322 after being demodulated and rectified by the demodulating devices 311 and 312, the outputs from the low-pass filters 321 and 322 are direct current signals which do not have a high-frequency constituent. Therefore, the outputs 122a and 122b from the low-pass filters 321 and 322 are input to the microcomputer 137 via A/D converters 461 and 463.

In the electronic instrument described above, as the differential output 123a from the differential amplifier 123 is input to the microcomputer 137, the presence or absence of a variation of the magnetic flux which passes through the inside of the magnetizing coil 113 shown in FIG. 5 enables the detection of the presence or absence of the object to detected 116, and the amount of a variation of the magnetic flux enables one to detect the type of object to be detected 116.

The microcomputer 137 has a function to supervise the differential magnetism sensor apparatus 101 on the basis of the input from the low-pass filters 321 and 322 and detect that the magnetizing coil 113 is broken when both two inputs (the outputs 122a and 122b) from the low-pass filters 321 and 322 are 0.

Also, the microcomputer 137 detects that either of two differential detecting coils 241 and 242 is broken when either of two inputs (the outputs 122a and 122b) from the low-pass filters 321 and 322 is 0.

In addition, the microcomputer 137 detects that the main magnetic pole 112 is broken or abraded when two inputs (the outputs 122a and 122b) from the low-pass filters 321 and 322 have a large difference or a very small difference.

The following is a description of another preferred embodiment of the present invention. In the differential magnetism sensor apparatus 101, the constructions of the magnetic pole 112, the magnetizing coil 113 and the differential detecting coils 241 and 242 which are included by the magnetic sensor portion 115 are not limited to those shown in FIG. 5. The present invention is applicable to any differential magnetism sensor apparatus which includes a magnetizing coil which generates a closed loop magnetic field and a differential detecting coil which detects a variation of a magnetic flux passing through the magnetizing coil.

Figure 9:
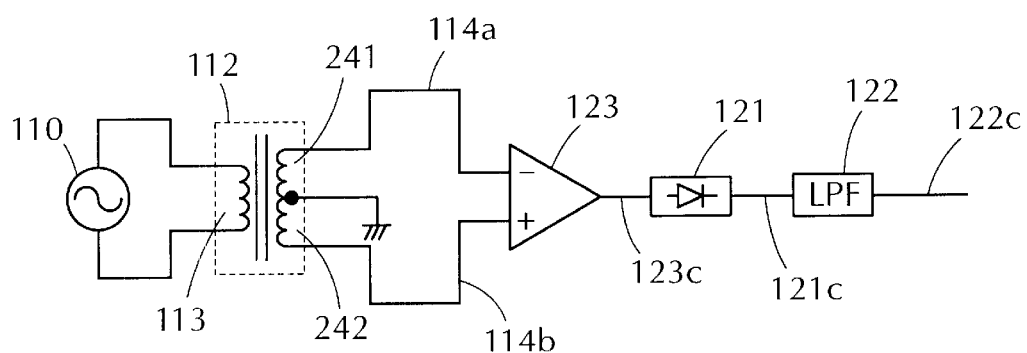
FIG. 9 is a circuit diagram which shows another differential magnetism sensor apparatus of the present invention.

The differential magnetism sensor apparatus described above includes, for example, a magnetizing coil 113 which generates a closed loop magnetic field, an alternative-current power supply 110 for the magnetizing coil 113, first and second differential detecting coils 241 and 242 which are wound around a magnetic pole 112 in common with the magnetizing coil 113, as shown in FIG. 9. The median point of two differential detecting coils 241 and 242 is connected to the ground. Outputs 114a and 114b from the ends of both differential detecting coils 241 and 242 are input to a differential amplifier 123, respectively, and a half-wave rectification process of differential output 123c, which is output from the differential amplifier 123, is carried out at a demodulating device 121. The output 121c of the resulting direct current is output via a low-pass filter 122.

Figure 10:
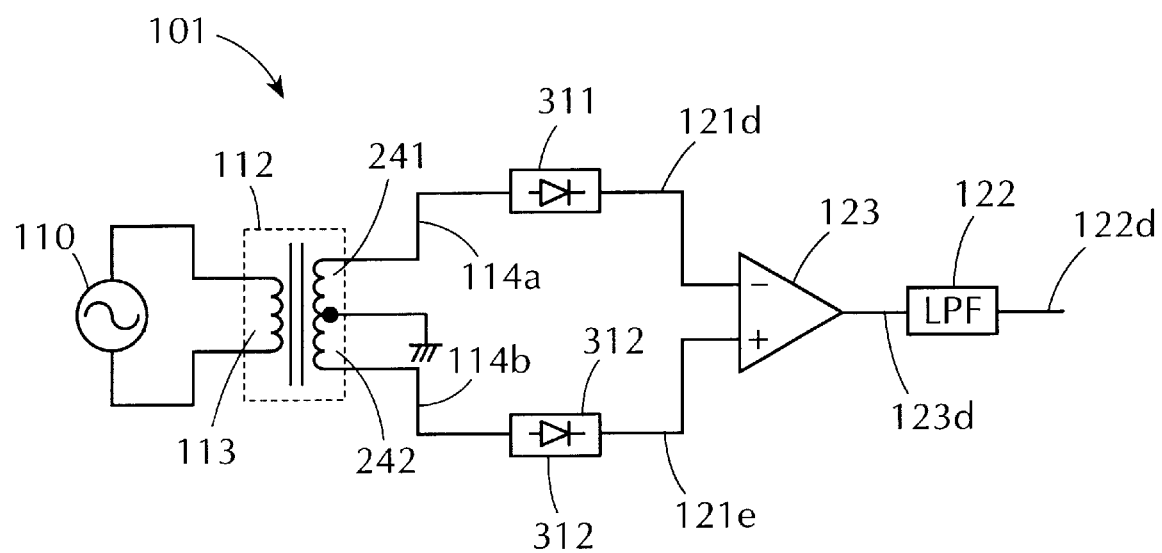
FIG. 10 is a circuit diagram which shows another conventional differential magnetism sensor apparatus.

Also, the differential magnetism sensor apparatus shown in FIG. 10 includes a magnetizing coil 113 which generates a closed loop magnetic field, an alternative-current power supply 110 for the magnetizing coil 113, a first and second differential detecting coils 241 and 242 which are wound around a magnetic pole 112 in common with the magnetizing coil 113. The median point of two differential detecting coils 241 and 242 is connected to the ground. Outputs 114a and 114b from the ends of both differential detecting coils 241 and 242 are half-wave rectified at demodulating devices 311 and 312 resulting in outputs 121d and 121e of the direct current, respectively. The outputs 121d and 121e are input to a differential amplifier 123, and differential output 123d which is output from the differential amplifier 123 is output via a low-pass filter 122. In general, the magnetizing coil 113 and a differential detecting coil 114 are sealed with a resin to prevent the coil from moving or being broken.

In the differential magnetism sensor apparatus shown in FIG. 9, when the location of the differential detecting coils 241 and 242 slips out of place, a phase shift is generated in a wave shape which is output from the differential detecting coil. Also, when a magnetizing frequency is high, a phase shift is easily generated in a wave shape which is output from the differential detecting coil.

The phase shift described above is shown in FIGS. 11(a), (b) and (c). In particular, FIGS. 11(a), (b) and (c) show the outputs 114a and 114b from the differential detecting coils 241 and 242, the differential output 123c from the differential amplifier 123, the output 121c from the demodulating device 121 and an output 122c from the low-pass filter 122 in the case of a phase shift of 0 degrees, 20 degrees and 30 degrees between the outputs 114a and 114b from the differential detecting coils 241 and 242, respectively, in the differential magnetism sensor apparatus shown in FIG. 9.

FIG. 11(a) shows that the output 122c from the low-pass filter 122 is 0 V in the case of a phase shift of 0 degrees between the outputs 114a and 114b from the differential detecting coils 241 and 242. However, when the phase shift between the outputs 114a and 114b from the differential detecting coils 241 and 242 is not 0 degrees, a cancellation between the outputs 114a and 114b from the differential detecting coils 241 and 242 is not carried out appropriately in the differential amplifier 123 resulting in an output of a noise constituent as the differential output 123c. Therefore, the output 122c from the low-pass filter 122 is not 0 V resulting in a low precision of the detection of the sensor as shown in FIGS. 11(a) and (b).

On the other hand, FIGS. 12(a), (b) and (c) show the outputs 114a and 114b from the differential detecting coils 241 and 242, the differential output 123d from the differential amplifier 123 and an output 122d from the low-pass filter 122 in the case of a phase shift of 0 degrees, 20 degrees and 30 degrees between the outputs 114a and 114b from the differential detecting coils 241 and 242, respectively, in the differential magnetism sensor apparatus shown in FIG. 10. FIGS. 12(a), (b) and (c) show that although the outputs 114a and 114b from the differential detecting coils 241 and 242 have a phase shift, the precision of the detection of the sensor is not reduced. However, the differential magnetism sensor apparatus shown in FIG. 10 has a problem in that when the magnetizing frequency is high, an expensive differential amplifier 123 which shows an excellent frequency characteristic has to be used. In general, the magnetizing coil 113 and the differential detecting coil 114 are sealed with a resin. However, in that case, there is a problem in that the stress from the resin during sealing or the stress from the resin following a temperature change after sealing tends to cause a phase shift between outputs from the differential detecting coils.

Note that in the described embodiments of FIGS. 9 and 10, the magnetizing frequency can below.

As described above, in a differential magnetism sensor apparatus of the present invention, two outputs from differential detecting coils are demodulated by demodulating devices. After a high-frequency constituent is removed by low-pass filters, two outputs from the low-pass filters are input to a differential amplifying device. Therefore, each of two outputs from differential detecting coils is input to a differential amplifying device as a signal converted to direct current. Therefore, when two outputs from differential detecting coils have a phase shift, a differential output from a differential amplifying device does not have a noise, resulting in a high precision of the detection of a sensor. In addition, each of two outputs from differential detecting coils is input to a differential amplifying device after being converted to a perfect direct current signal. Therefore, an expensive differential amplifying device which shows an excellent frequency characteristic does not need to be used resulting in the reduction of the cost of a differential magnetism sensor apparatus.

The following describes another preferred embodiment of the present invention. FIGS. 13 through 33 show a coin identifying apparatus or a magnetic sensor body of the present invention.

The magnetic sensor body of the present invention has coin transferring path 1013 on which coin 1015 to be detected is transferred along guide 1014 while being held on moving surface 1013a. It also includes the following: first detecting sensor 1100 which is placed on coin transferring path 1013 and which detects data regarding material or thickness of coin 1015; second detecting sensor 1200 which detects data regarding diameter of coin 1015; and third detecting sensor 1300 which detects one of the following: data regarding unevenness on the surface, unevenness on the side and unevenness at the edge of coin 1015. Herein, the magnetic sensor body of the present invention identifies coin 1015 wherein first detecting sensor 1100, second detecting sensor 1200 and third detecting sensor 1300 are integrated by mold 1012.

In addition to the above described coin transferring path 1013, first detecting sensor 1100, second detecting sensor 1200, and third detecting sensor 1300, the coin identifying apparatus of the present invention comprises identifying means 1017(1417) which provides a temporary decision on coin 1015 to be detected based on the output from first detecting sensor 1100 and second detecting sensor 1200 and which identifies coin 1015 based on the output from third detecting sensor 1300 while considering the temporary decision.

The following is a description of the first detecting sensor 1100, second detecting sensor 1200, third detecting sensor 1300 of the magnetic sensor body, and the configuration of the magnetic sensor body. In addition, the configuration and effects of the coin identifying apparatus are discussed using a flowchart.

Figure 13B:
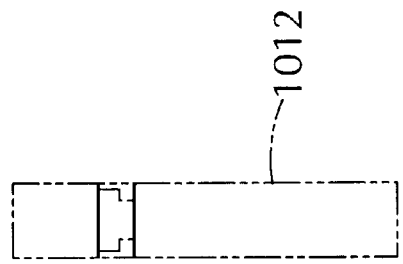
FIGS. 13(b) and (c) indicate third detecting sensors on the side and the back (front) side, respectively, and wave shapes obtained by each of the third detecting sensors.
Figure 13A:
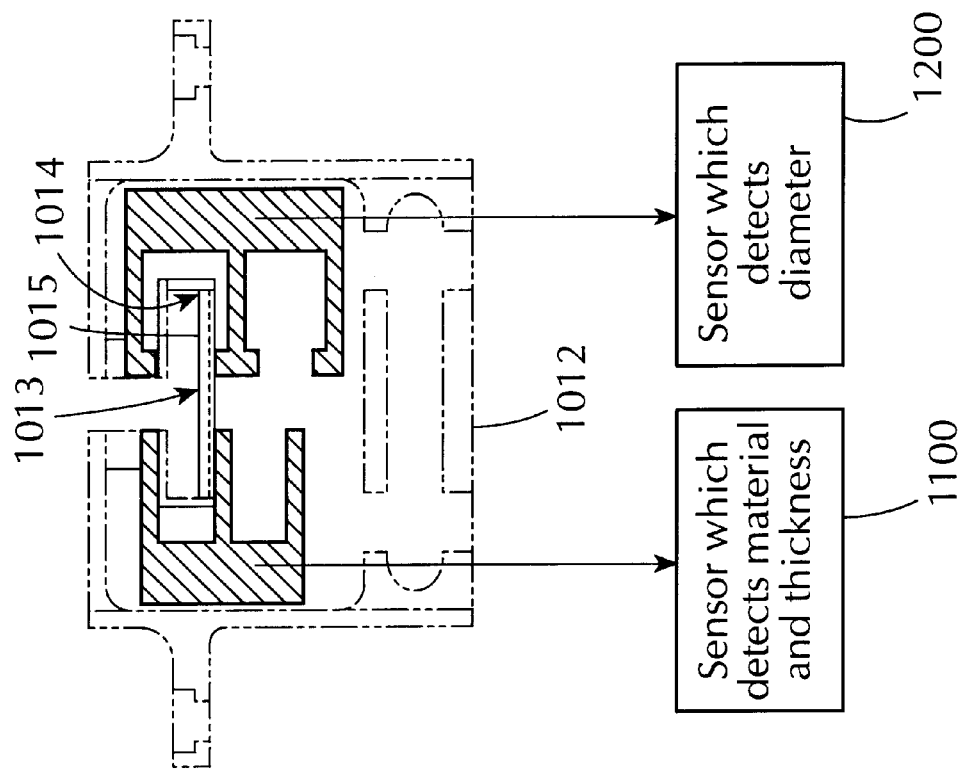
FIGS. 13(a), (b) and (c) show a configuration of a coin identifying apparatus and a magnetic sensor body of the present invention.

In the magnetic sensor body as shown in FIG. 13(a), first detecting sensor 1100 and second detecting sensor 1200, which are positioned at one side of the magnetic sensor body facing each other, are integrated with third detecting sensor 1300, which is positioned on the back of first and second detecting sensors 1100 and 1200, by mold 1012. In other words, first and second detecting sensors 1100 and 1200 are integrated with third detecting sensor 1300 by having their backs facing each other. First detecting sensor 1100 and second detecting sensor 1200 detect macro data regarding characteristics of coin 1015 as a whole, more specifically, data regarding material, thickness and diameter of coin 1015. Third detecting sensor 1300 detects one of the following: data regarding unevenness on the surface, unevenness on the side and unevenness at the edge of coin 1015.

First detecting sensor 1100 and second detecting sensor 1200 of this embodiment are magnetic sensors which detect data regarding coin 1015, separate from data detected by other sensors, by detecting a change in magnetic fluxes corresponding to a change in eddy currents. In other words, they detect at least one of the data regarding the material, thickness and diameter of coin 1015 separate from other data such that highly accurate coin detection is accomplished. The following describes first detecting sensor 1100 which detects the material and thickness of coin 1015 and then second detecting sensor 1200 which detects diameter of coin 1015. Further, a compound detecting sensor, which detects the material, thickness and diameter of the coin 1015, and third detecting sensor 1300 which detects localized data will be discussed.

FIGS. 14, 15, 16 and 20 show a first detecting sensor of the present invention. Magnetic sensor 1100 detects a change in magnetic fluxes caused by a change in eddy currents to obtain information about metallic body to be detected 1115. A good example of a metallic body to be detected 1115 is a coin. The following describes an embodiment in which a coin is employed as a metallic body to be detected 1115 (hereinafter referred to as "coin 1115").

Magnetic sensor 1100 of the present invention individually detects at least one type of information about coin 1115 including either its material, thickness or diameter such that the coins can be accurately identified based on the information. The following first describes magnetic sensor 1100 which detects the material and thickness of coin 1115, then magnetic sensor 1100 which detects the diameter of coin 1115, and finally compound-model magnetic sensor 1100 which detects the material, thickness and diameter.

Figure 14:
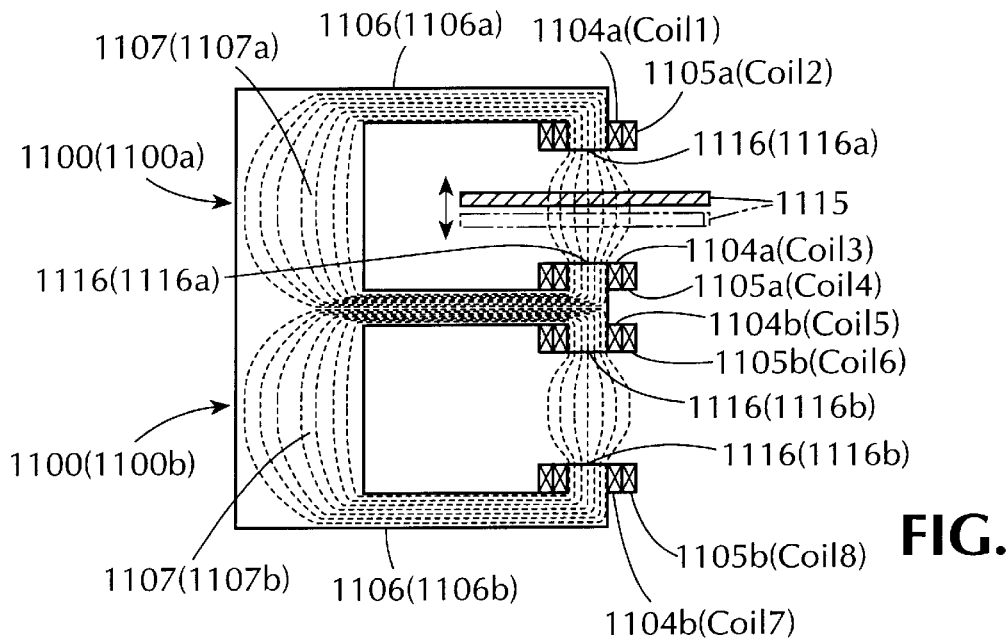
FIG. 14 is a vertical section of a magnetic sensor of a first magnetic sensor according to the present invention.

FIG. 14 shows an embodiment of first magnetic sensor 1100 which detects the material and thickness of coin 1115. First detecting sensor which forms the top half of an E-shaped sensor indicated as 1100a is discussed. This magnetic sensor 1100 is shaped as a "U" wherein projecting portions 1116 indicated as 1116a in FIG. 14 are formed such that two free ends face each other. Magnetizing coil 1104 and detecting coil 1105 are wound around each of projecting portions 1116. Coin 1115 is detected by using a change in the eddy currents when coin 1115 is carried between projecting portions 2. In this case, U-shaped magnetic sensor 1100 is preferably symmetrical and has less fluctuations in outputs.

Projection portions 1116 project out from the free ends of "] (U)"-shaped magnetic sensor 1100 toward the inside, as shown in FIG. 14, such that it is easier for magnetic fluxes to jump from one projection portion 1116 to the other. Additionally, projecting portions 1116 are formed to have narrow ends such that fine magnetic fluxes, which are effective in coin identification, can be formed thereat. As a result, the magnetic fluxes generated at the end surface are converged for higher density. The current efficiency, in turn, is improved to obtain higher sensitivity. Therefore, when coin 1115 passes across a magnetic flux, which jumps from one projecting portion 1116 to the other, the output related to changes in the material or the thickness of coin 1115 increases such that specific information can be readily obtained. In this case, more specifically, it is effective to establish the diameter of projecting portions 1116 to be less than 20 mm, which is smaller than the smallest coin, the One-Yen coin. The end surface or the cross section of projecting portions 1116 is shaped as a narrow rectangle, for example. However, one may not be limited to this shape as long as highly dense magnetic fluxes can be obtained.

Magnetizing coils 1104, indicated as 1104a in FIG. 14, which are formed of coil 1 or coil 3, are wound around each of projecting portions 1116. Magnetizing coils 1104 can be wound at different positions on core 1106 (indicated by 1106a in FIG. 14) other than projecting portions 1116. However, it is easier to control magnetic fluxes which are passing between projecting portions 1116 by winding magnetizing coils 1104 around projecting portions 1116. Especially, in the case of projecting portions 1116 formed to have narrow ends as is in this embodiment, a leak of magnetic fluxes at positions other than projecting portions 1116 can be minimized for conversion of the magnetic fluxes. As a result, it is easier to control magnetic fluxes with magnetizing coils 1104.

Further, detecting coils 1105, indicated as 1105a in FIG. 14, which are formed of coil 2 or coil 4, are wound around magnetizing coils 1104. Detecting coils 1105 detect fine magnetic fluxes which pass through spot-shaped projecting portions 1116. Even a slight change in the magnetic flux can be detected.

In this embodiment, as shown in FIG. 14, a pair of magnetic sensors 1100 and 1100 are integrated. One magnetic sensor 1100 is designated as a detecting magnetic sensor indicated as 1100a, which detects coin 1115, while the other is designated as a reference magnetic sensor indicated as 1100b. Coin 1115 is detected based on outputs from detecting magnetic sensor 1100a and reference magnetic sensor 1100b. A differential sensor is formed wherein a difference between the output from detecting magnetic sensor 1100a and the output from reference magnetic sensor 1100b is provided resulting in more accurate detection.

In this embodiment which has an integrated sensor, magnetizing coils 1104 and detecting coils 1105 are wound around not only detecting magnetic sensor 1100a but also reference magnetic sensor 1100b. The magnetizing coil and detecting coil wound around reference magnetic sensor 1100b are indicated by 1104b and 1105b, respectively. Related figures show magnetic sensor 1100 in which detecting coils 1105 are wound on the top of magnetizing coils 1104. However, one may wind magnetizing coils 1104 on the top of detecting coils 1105.

The following describes the shape of detecting magnetic sensor 1100a and reference magnetic sensor 1110b. As described above, both cores 1106a and 1106b are shaped as a U wherein magnetic fluxes turn around in projecting portions 1116. Herein, the top and the bottom of magnetic sensor 1100 are connected by connecting portion 1107 at the back side of magnetic sensor 1100, opposite from the free ends. This configuration provides a magnetic path in which magnetic fluxes pass through. As a result, the magnetic fluxes receive less resistance compared to a magnetic sensor which does not have the connecting portion at the back side such that it is easier to prevent magnetic fluxes from leaking as they pass through core 6. Therefore, the current efficiency of magnetic sensor dramatically increases resulting in improved identification performance.

As shown in FIG. 14, the E-shaped sensor, formed by integrating cores 1106a and 1106b of detecting magnetic sensor 1100a and reference magnetic sensor 1100b, provides accurate differential outputs. In other words, when coin 1115 pass across the magnetic flux in detecting magnetic sensor 1100a, the detection value of detecting magnetic sensor 1100a decreases while the detection value of reference magnetic sensor 1100b increases. As a result, the difference therebetween increases such that increases in sensitivity provide accurate information.

The form of the differential sensor including detecting magnetic sensor 1100a and reference magnetic sensor 1100b is not limited to the one in the above embodiment.

However, by integrating core 6 as shown in FIG. 14, it is easier to form the core or a thin laminated plate for the core, and the reference metallic body can be placed on the same core 1106. Further, the integrated form provides a larger difference in the outputs as one magnetic flux (e.g. the one in detecting magnetic sensor 1100a with coin 1115) decreases while the other magnetic flux (e.g. the one in reference magnetic sensor 1100b) increases. As a result, the accuracy in detection improves.

The following describes the connection of magnetizing coils 1104 and detecting coils 1105. In a circuit shown in FIG. 15, a plurality of magnetizing coils 1104 and a plurality of detecting coils 1105 are separately connected to be in phase. More specifically, four of magnetizing coils 1104a (coil 1), 1104a (coil 3), 1104b (coil 5) and 1104b (coil 7) are connected in series while four detecting coils 1105a (coil 2), 1105a (coil 4), 1105b (coil 6) and 1105b (coil 8) are connected in series. Herein, detecting coils 1105a (coils 2 and 4) and detecting coils 1105b (coils 6 and 8) are in inverse phase. However, if they are positioned before differential amplifier 1109 for detection as shown FIG. 16, either in-phase or inverse phase can be employed. In addition, all magnetizing coils 1104 can be driven to be in phase by single alternating-current power supply 1108. Alternating-current power supply 1108 constantly provides magnetizing signals having a given sine wave form wherein magnetic fluxes corresponding to the magnetizing signals are generated at magnetizing coils 1104. Symbols indicate parts as follows: 1109 is a differential amplifier; 1110 is a envelop detector; and 1111 is a low path filter (LPF).

According to magnetic sensor 1100 of this embodiment, the material and the thickness of a metallic body has a core having projecting portions 1116 wherein magnetizing coils 1104 are placed at the end of projecting portions 1116 to generate spot-like magnetic fluxes. Therefore, the resulting magnetic field is converged in the space between projecting portions 1116. As a result, magnetic sensor 1100 can converge magnetic fluxes effective for identification such that all the magnetic fluxes can be transmitted through coin 1115. Hence, identification specific to the material of the metallic body to be identified can be performed by measuring a change in the magnetic fluxes.

Further, the core is shaped to sandwich coin 1115 such that the output signal voltage is increased. Therefore, the current efficiency is increased resulting in improved identification performance. By increasing the absolute value of the changing voltage, a significant increase can be caused in the voltage value by a slight change in the material when a circuit with identical transmission gains is used. As a result, the threshold can be established to reflect the actual environment.

In addition, a pair of detecting coils 1105 are placed on the top of each other to sandwich coin 1115 and the direction of the winding is to be in phase. Hence, the outputs from detecting coils 1105 in series do not fluctuate even when coin 1115 moves in the horizontal direction. Moreover, the material and the thickness can be simultaneously identified by carrying coin 1115 while shifting it to one side.

Also, both detecting magnetic sensor 1100a and reference magnetic sensor 1100b are shaped as a "] (U)" wherein the top and the bottom cores 6 are connected by connecting portion 7, opposite from the free ends. Therefore, leaking magnetic fluxes can be contained to path through the conductor (the core). Consequently, the current efficiency is dramatically improved due to a decrease in the resistance which the magnetic fluxes receive resulting in improved identification performance.

Additionally, the differential sensor is formed of detecting magnetic sensor 1100a and reference magnetic sensor 1100b such that it is hardly affected by a change in temperature. Hence, temperature characteristics and identifying performance are improved.

The following describes a preferred embodiment of a second magnetic sensor of the present invention. FIGS. 17, 18, 19 and 21 show a coin identifying apparatus or a magnetic sensor body of the present invention. In particular, FIGS. 17, 18, 19 and 21 show a second magnetic sensor 1200 (a coin identifying sensor) of the present invention. The coin identifying sensor obtains information regarding coin 1215 by detecting a change in magnetic fluxes caused by a change in eddy currents. Especially, the coin identifying sensor of this embodiment detects the information specific to the diameter of coin 1215, that is the data regarding the diameter, separate from the other kinds of information, such as the material and the thickness of coin 1215. By using this data as a basis for identification, coins are accurately identified.

Figure 17:
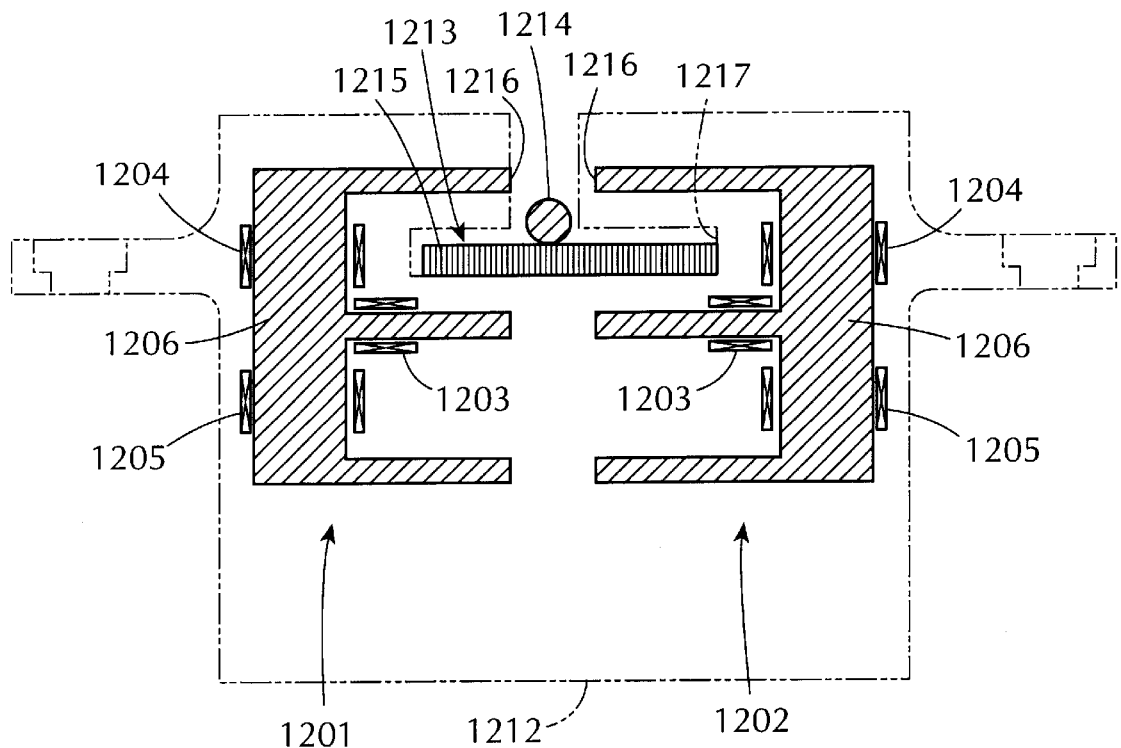
FIG. 17 is a vertical section of a second detecting sensor of an embodiment of the present invention.

In this embodiment, as shown in FIG. 17, the coin identifying sensor includes first and second detecting portions 1201 and 1202 which detect data regarding the diameter on each side of coin 1215, transferred along guide 1217. First and second detecting portions 1201 and 1202 have an E-shaped cross section wherein sides of free ends 1216 face each other. Herein, first detecting sensor portion 1201 and second detecting sensor portion have identical configurations such that their shape can be identical. The following describes first detecting sensor portion 1201, then a coin identifying sensor comprised of detecting sensor portions 1201 and 1202.

Figure 18:
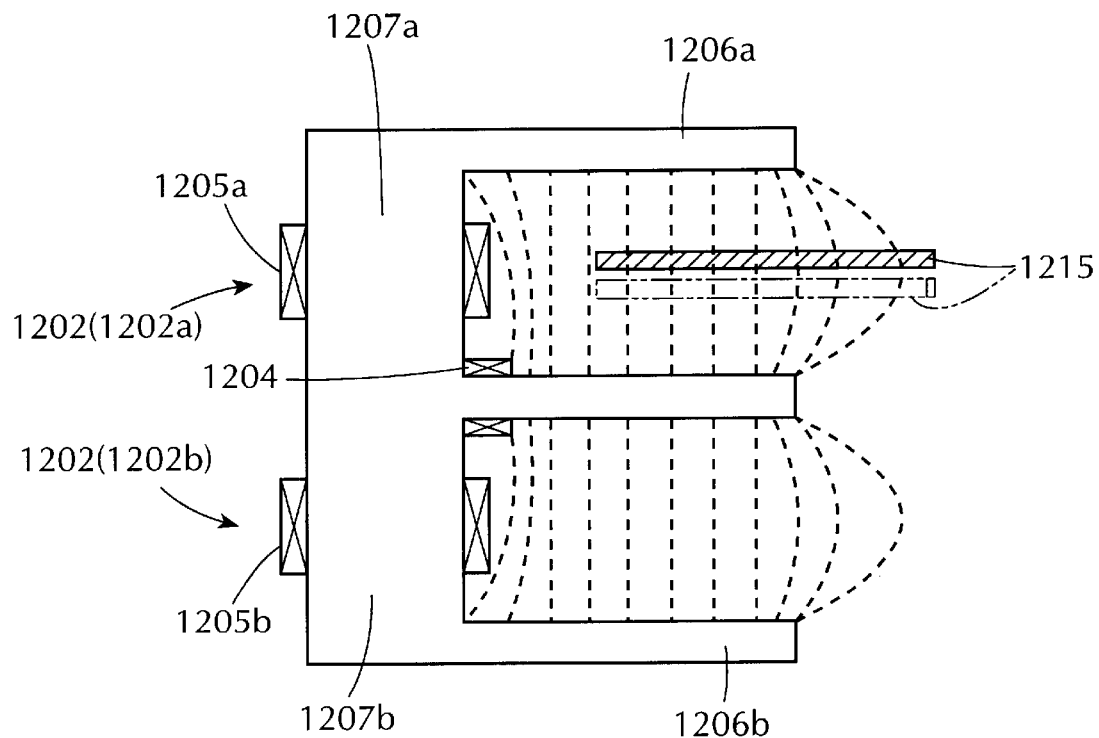
FIG. 18 is a vertical section of an example of a first detecting sensor portion.
Figure 19:
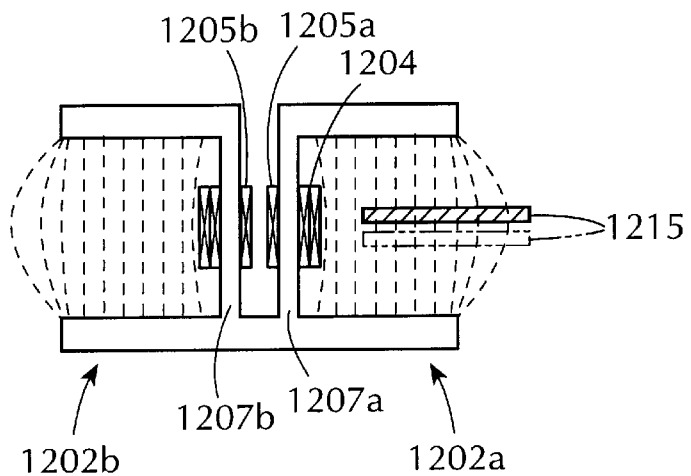
FIG. 19 is a vertical section of another example of the differential first detecting sensor portion.

FIGS. 18 and 19 show first detecting sensor portion 1201 which detects the data regarding the diameter of coin 1215. Within E-shaped first detecting sensor portion 1201, a magnetic sensor for the top part indicated by 1201a is shaped as a "] (U)" wherein coin 1215 passes between two free ends 1216. Core 6a forming magnetic sensor 1201a is such that the top and the bottom of magnetic sensor 1201a are connected with connecting portion 1207a at the back side, opposite from free ends 1216. Herein, a magnetic path, in which a magnetic flux passes, is formed at connecting portion 1207a such that the resistance which the magnetic flux receives is smaller compared to a magnetic sensor which does not have its back side connected. As a result, leaking of magnetic fluxes can be prevented as they pass through core 1206a, resulting in a dramatic increase in the current efficiency of magnetic sensor 1201a. Therefore, identification performance is improved. Also, it is desirable to form core 1206a of a highly permeable magnetic material. Moreover, it is desirable to shape "] (U)"-shaped magnetic sensor 1a to be symmetrical which provides fewer fluctuations in outputs.

In this embodiment, as shown in FIG. 18, magnetic sensor 1201a is integrated with magnetic sensor 1201b which is identically shaped as magnetic sensor 1201a. Also, magnetic sensor 1201a is designated to be a detecting magnetic sensor while magnetic sensor 1201b is designated to be a reference magnetic sensor wherein coin 1215 is detected based on outputs from detecting magnetic sensor 1201a and reference magnetic sensor 1201b. Herein, a first differential detecting sensor portion 1201 is configured wherein its final output is a difference of the output from detecting magnetic sensor 1201a and the output from reference magnetic sensor 1201b. As a result, more accurate detection is enabled.

As shown in FIG. 18, the integrated detecting sensor is shaped as an "E" by combining the projection of cores 1206a and 1206b of detecting magnet sensor 1201a and reference magnetic sensor 1201b. This is very desirable because it can provide accurate differential outputs. In other words, when coin 1215 passes across the magnetic flux at detecting magnetic sensor 1201a, the detected value from detecting magnetic sensor 1201a becomes smaller while the detected value from reference magnetic sensor 1201b becomes larger. Therefore, the difference between the two outputs becomes larger such that the sensitivity improves, resulting in more accurate information.

In order to accurately identify 1 coin 1215 by obtaining data regarding the diameter, that is information specific to the diameter of coin 1215, it is desirable to form a parallel magnetic field in the gap portion of core 1206a. When coin 1215 is placed in the gap portion or passes through the gap portion under such a condition, the magnetic fluxes change accurately corresponding to the size of the diameter. Hence, one can obtain accurate output regarding the diameter.

To generate such a parallel magnetic field, it is preferable to wind a magnetizing coil and detecting coils 1204 and 1205 around connecting portion 1207, which is opposite from free ends 1216, or the vicinity thereof In this embodiment, as shown in FIG. 18, magnetizing coil 1204 is wound around the projection which is shared by core 1206a of detecting magnetic sensor 1201a and core 1206b of reference magnetic sensor 1201b in the area close to connecting portion 1207. Also, first detecting coil 1205 is wound around connecting portion 1207a of magnetic sensor 1201a while second detecting coil 1205 is wound around connecting portion 1207b of magnetic sensor 1201b such that magnetic sensor 1201a and magnetic sensor 1201b generate magnetic fluxes having opposite directions from each other. As a result, an approximately parallel magnetic field is formed in the gap portions of cores 1206a and 1206b.

Further, the magnetic field generated in core 1206 should have magnetic fluxes with even density in addition to being parallel in order to improve accuracy in detection of the diameter.

As described above, it is preferable in terms of improving detection accuracy that first detecting sensor portion 1201 is differential by combining detecting magnetic sensor 1201a and reference magnetic sensor 1201b. However, the configuration of the sensor is not limited to the above. For example, "] (U)"-shaped magnetic sensors 1201a and 1201b can be partially connected back to back to form an approximate rectangle, as shown in FIG. 19. In this case, detecting coils 1205a and 1205b are wound around connecting portions 1207a and 1207b of magnetic sensors 1201a and 1201b while magnetizing coils 1204 are wound on the top of detecting coils 1205a and 1205b around connecting portions 1207a and 1207b. This is just one example of methods to wind the coils.

In the case of integrated core 1206 as shown in FIG. 18, formation of the core (or a laminated thin plate which is used with the core) is easier, and the reference magnetic body (e.g. actual coin 1215) can be positioned on core 1206. Additionally, if one magnetic flux decreases, e.g., the magnetic flux at detecting magnetic sensor 1201a having coin 1215, the other magnetic flux, e.g., the magnetic flux at reference magnetic sensor 1201b, increases. As a result, the difference between the two outputs increases resulting in improved detection accuracy.

As described above, with first detecting sensor portion 1201, the shape of the core and the position of the coils generate parallel magnetic fluxes. Also, a magnetic field in the gap portion of core 1206 is parallel and has even density. Therefore, identification of the diameter of coins is improved. In addition, formation of the differential sensor improves temperature characteristics and identification performance such that accurate data regarding the diameter of coin 1215 are provided.

The above-described first detecting sensor portion 1201 can provide a sufficiently accurate coin identifying sensor. However, a coin identifying sensor of the present invention is configured by combining first detecting sensor portion 1201 with identically shaped second detecting sensor portion 1202. Second detecting sensor portion 1202 is shaped and has a size identical to first detecting sensor portion 1201.

The two sensor portions are placed symmetrically wherein free ends 1216 of second detecting sensor portion 1202 face free ends 1216 of first detecting sensor portion 1201. Second detecting sensor portion 1202 detects data regarding the diameter on the other side of coin 1215.

First detecting sensor portion 1201 and second detecting sensor portion 1202 are integrated by mold 1212 with a given space therebetween. Also, mold 1212 has coin path 1213, which bridges over the gap portions of detecting sensor portions 1201 and 1202, and drive belt 1214. When coin 1215 is transferred through coin path 1213, the data regarding the diameter is detected. Herein, it is preferable to form coin path 1213 and drive belt 1214 such that coin 1215 is constantly transferred along guide 1217 on the side of coin path 1213 closer to sensor portion 1202.

The following describes the position of magnetizing coils 1204 and detecting coils 1205*a* and 1205*b*. In this embodiment, as shown in FIG. 17, magnetizing coil 1204 and first detecting coil 1205*a* are wound around first detecting sensor portion 1201 while magnetizing coil 1204 and second detecting coil 1205*b* are wound around second detecting sensor 1202. Magnetizing coil 1204 of first detecting sensor portion 1201 and magnetizing coil 1204 of second detecting sensor portion 1202 are connected in series while first detecting coil 1205*a* and second detecting coil 1205*b* are connected in phase such that the first detecting coil and second detecting coil are differential.

According to the coin identifying sensor of this embodiment, even when the position of coin 1215 changes while coin 1215 is transferred (for example, when the coin is falling in a vending machine or when the coin is transferred on a belt in a central processor), the diameter signal output does not fluctuate. Therefore, it is not necessary to have a large margin for a change in the position resulting in highly accurate identification of the diameter of coins.

The above is one of preferable embodiments of the present invention. However, one may not be limited to the above as various modifications are applicable within the scope of the present invention.

Figure 21:
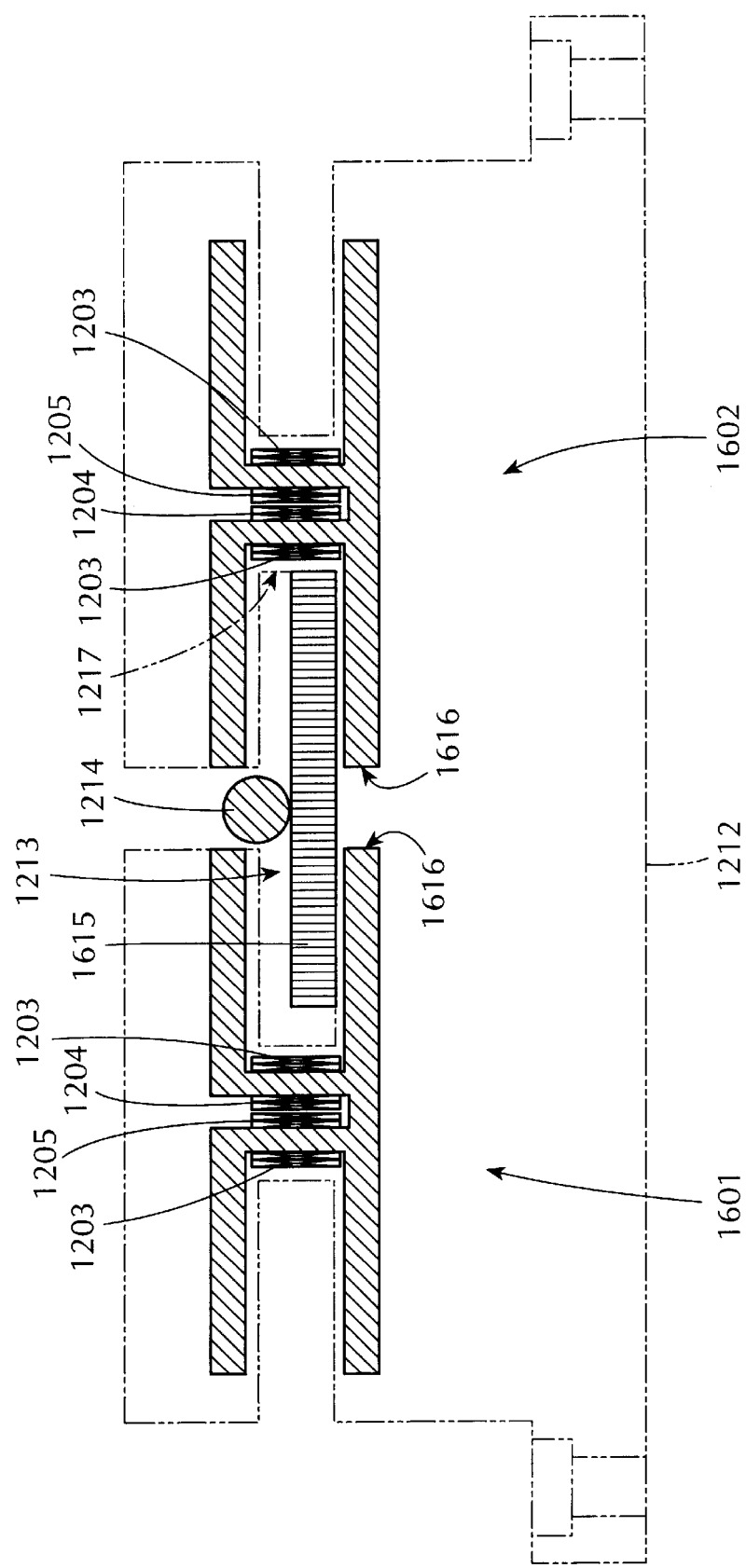
FIG. 21 is a vertical section of another embodiment of the coin identifying sensor.

For example, in the above embodiment, first and second detecting sensor portions 1201 and 1202 have E-shaped core 1206. However, the cross section of detecting sensor portions 1201 and 1202 is not limited to the E-shape. Another example is to leave the detecting magnetic sensor and the reference magnetic sensor separate with their "] (U)"-shaped cross section instead of sharing core 6 between detecting sensor portions 1201 and 1202. Yet another example is to symmetrically place first detecting sensor portion 1601 and second detecting sensor portion 1602 wherein their free ends 1616 face each other to form an approximate rectangle as shown in FIG. 21. Additionally, first and second detecting sensor portions 1601 and 1602, which have a slant to narrow their gap, can be symmetrically placed. These coin identifying sensors can detect data regarding the diameter on both sides of coin 1615 with the pair of facing detecting magnetic sensors. Herein, the symmetrical positioning includes plane, point and line symmetries.

Then, a compound detecting sensor, which detects data regarding all material, thickness and diameter or one of those will be discussed.

Figure 20:
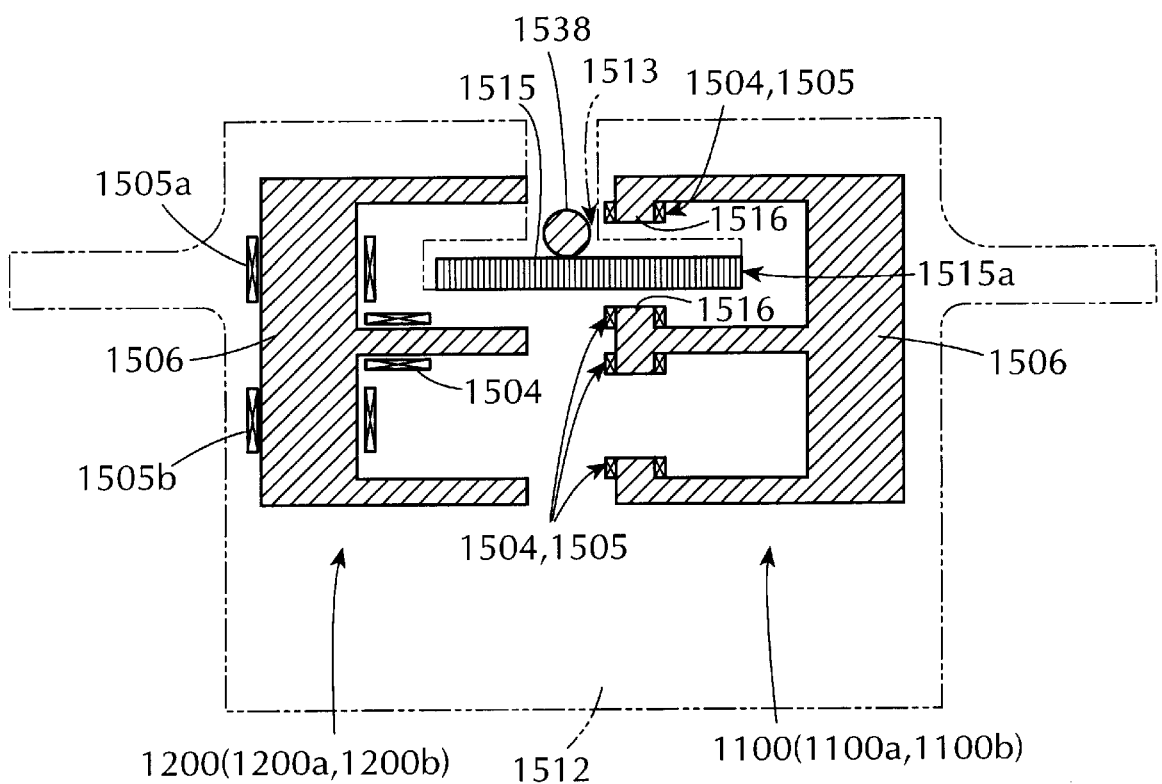
FIG. 20 is a vertical section of an another integrated magnetic sensor according to the present invention which detects the material, thickness and diameter of a metallic body to be identified.

Magnetic sensor 1500, as shown in FIG. 20, detects the material, thickness and diameter of coin 1515 by integrating sensor 1100 as described above, which detects the material and the thickness, and magnetic sensor 1200 as described above which detects the diameter. With this integrated sensor, magnetic sensor (1100*a* and 1100*b*) which detects the material and the thickness on the right and magnetic sensor (1200*a* and 1200*b*) which detects the diameter, on the left are integrated together with mold 1512 such that the gap portions of each sensor face each other. Mold 1512 has a shield, not shown in the figure, which prevents interaction between sensors 1100 (1100*a* and 1100*b*) and 1200 (1200*a* and 1200*b*). Also, mold 1512 has coin path 1513 which is placed over the gap portion between the two sensors wherein the material, thickness and diameter of coin 1515 can be detected after coin 1515 passes therethrough once. Coin path 1513 is formed such that coin edge 1515*a* constantly contacts the wall of coin path 1513 on the side of magnetic sensor 1100 which detects the material and thickness. Hence, a difference in the diameter of coin 1515 is detected by sensor 1200 which detects the diameter. Symbol 1514 indicates a guide which prevents the horizontal movement of coin 1515.

According to the above magnetic sensor which is formed by integrating sensors which separately detects the material, thickness and diameter, the material and the thickness are detected by one magnetic sensor while the diameter is detected by the other.

In this embodiment, the two magnetic sensors 1100 and 1200 are placed to face each other. However, this is not always the case. For example, one of sensors 1100 and 1200 can be placed slightly ahead of the other in the direction of coin 1515 to be transferred wherein both sensors still obtain information about the material, thickness and diameter of coin 1515 while passing thereby.

The present invention intends to provide a coin identifying sensor which accurately detects the thickness of a coin regardless of a change in the position of the coin.

The following is a description of another preferred embodiment of the present invention. FIGS. 22, 23, 24 and 25 show a coin identifying sensor of the present invention. A coin identifying sensor obtains data regarding coin 1715 by detecting a change in magnetic fluxes corresponding to a change in eddy currents. The coin identifying sensor of the present invention detects data specific to the thickness and the diameter of coin 1715, especially data regarding the thickness (hereinafter sometimes referred to as "thickness data") separate from other data of coin 1715. By using such data for identification, coins can be accurately identified.

Figure 22:
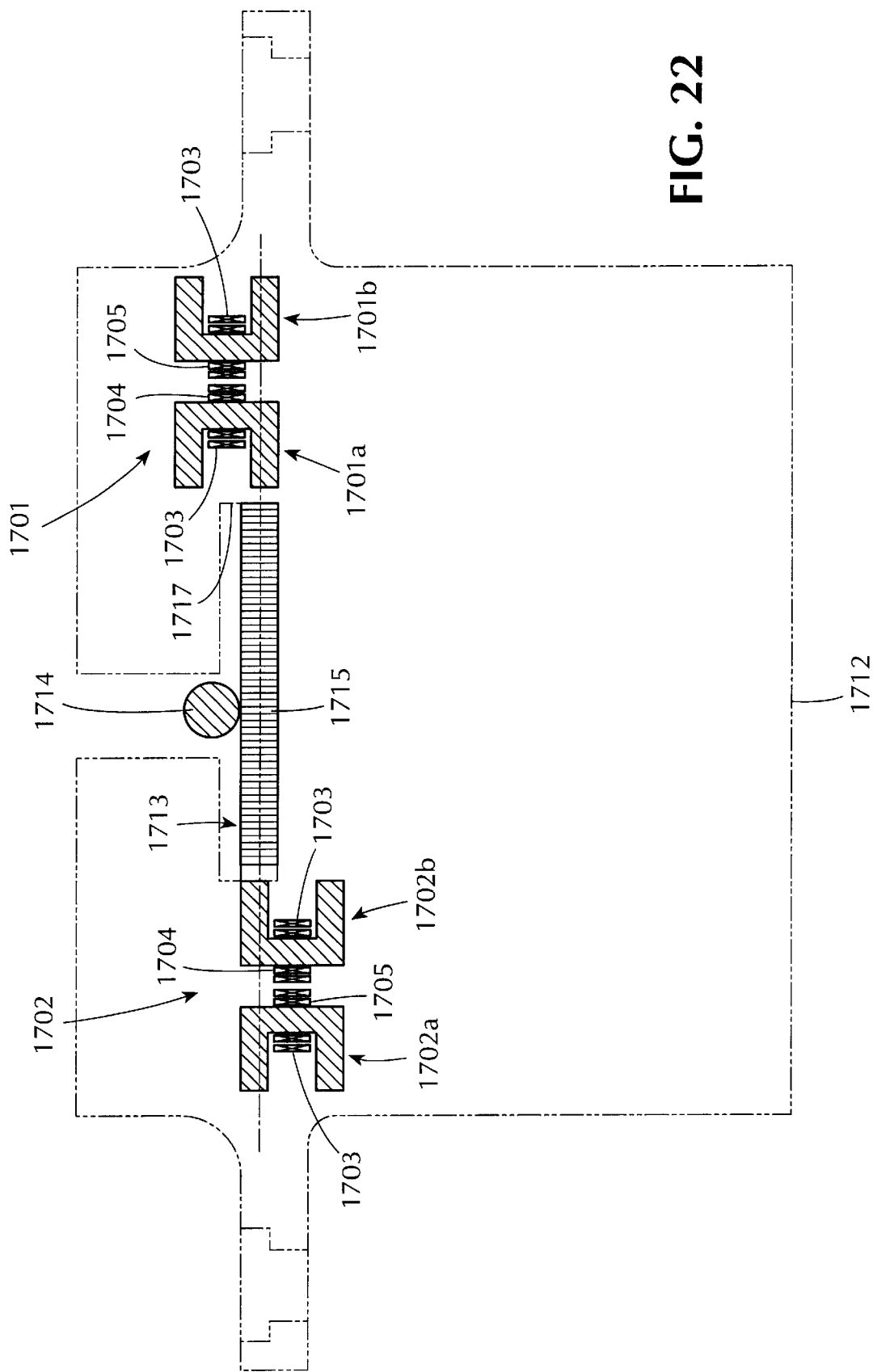
FIG. 22 is a vertical section of another embodiment of the coin identifying sensor of the present invention.

In this embodiment, as shown in FIG. 22, first thickness detecting sensor portion 1701 and second thickness detecting sensor portion 1702, which detect thickness data of coin 1715 transferred along guide 1717, are individually formed by combining sensor bodies (hereinafter referred to as "magnetic sensors") having a "] (U)"-shaped cross section and placed at each edge of coin 1715 in the radial direction. Herein, first thickness detecting sensor portion 1701 and second thickness detecting sensor portion 1702 are magnetic sensors having identical configurations. The following describes first thickness detecting sensor portion 1701 and the coin identifying sensor configured of the two thickness detecting sensor portions 1701 and 1722.

Figure 24:
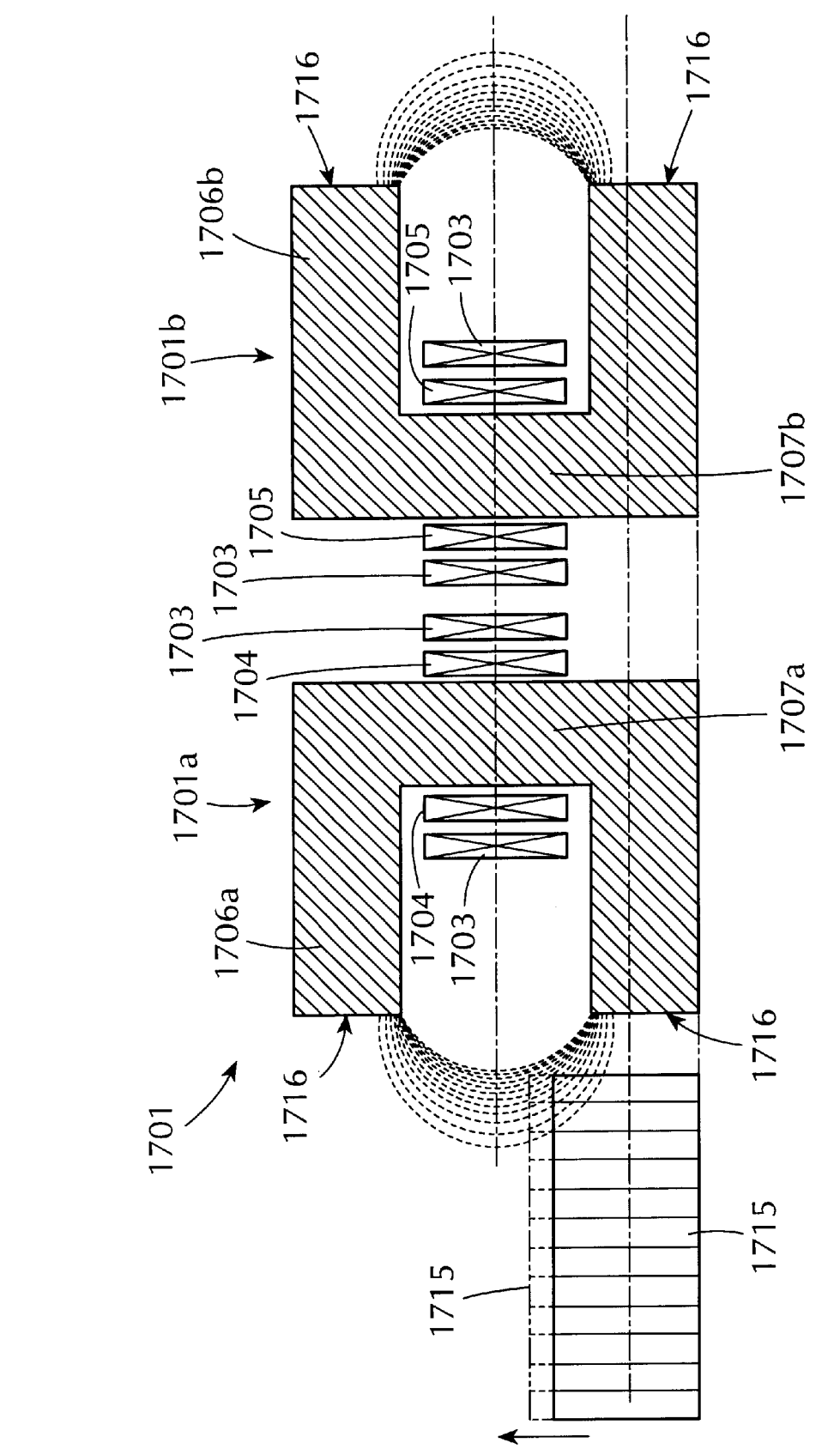
FIG. 24 is a vertical section of one example of a first thickness detecting sensor portion.

FIG. 24 shows first thickness detecting sensor portion 1701 which detects the thickness data of coin 1715. A magnetic sensor of first thickness detecting sensor portion 1701 in FIG. 24, which is closer to coin 1715 (indicated by 1701*a*), is formed as a "U" wherein a magnetic flux, which expands in an approximate "] (U)" semicircular shape or a hemisphere shape, is generated between two free ends 1716. Core 6*a* forming magnetic sensor 1701*a* is such that the top and the bottom of magnetic sensor 1701*a* are connected by connecting portion 1707*a* at the back side opposite from free ends 1716. With this configuration, the magnetic flux receives less resistance compared to a magnetic sensor in which the back side is not connected as a magnetic path as a magnetic flux is formed at connecting portion 1707a. As a result, a leaking magnetic flux can be contained to pass through core 6a. Hence, the current efficiency of magnetic sensor 1701a is dramatically increased resulting in improved identification performance. Also, it is preferable to form core 1706a of a highly permeable magnetic material. Further, it is preferable that U-shaped magnetic sensor 1701a is symmetrical providing fewer fluctuations in outputs.

In this embodiment, as shown in FIG. 24, magnetic sensor 1701a is combined with magnetic sensor 1701b of the shame configuration wherein magnetic sensor 1701a is designated as a detecting magnetic sensor while magnetic sensor 1701b is designated as a reference magnetic sensor. Coin 1715 is detected based on the outputs from detecting magnetic sensor 1701a and reference magnetic sensor 1701b. The above configuration forms a differential sensor which provides a difference between the output from detecting magnetic sensor 1701a and the output from reference magnetic sensor 1701b as its final output. As a result, highly accurate detection is enabled.

Magnetic coils 1703, first detecting coil 1704 and second detecting coil 1705 are wound around first thickness detecting sensor portion 1701. In this embodiment, first detecting coil 1704 is wound around connecting portion 1707a of detecting magnetic sensor 1701a while second detecting coil 1705 is wound around connecting portion 1707b of reference magnetic sensor 1701b. Also, magnetizing coils 1703 are wound around on the top of first detecting coil 1704 and second detecting coil 1705.

In addition, detecting magnetic sensor 1701a and reference magnetic sensor 1701b have their back portions face each other to form a differential sensor as shown in the figure. However, the configuration of the sensor is not limited to the above.

First thickness detecting sensor portion 1701 as described above generates a magnetic flux which expands in an approximate semicircular shape or a hemisphere shape between two free ends 1716. Therefore, when a coin edge passes through the magnetic flux as shown in FIG. 24, a difference in the diameter and the thickness of coin 1715 can be detected. Also, formation of the differential sensor improves the temperature characteristics and identification performance such that data regarding the thickness of coin 1715 can be accurately obtained.

First thickness detecting sensor portion 1701 as described above can provide a sufficient level of detection accuracy. However, the coin identifying sensor of the present invention is configured by a combination of this first thickness detecting sensor portion 1701 with second thickness detecting sensor portion 1702 which has the same shape and configuration.

Figure 23:
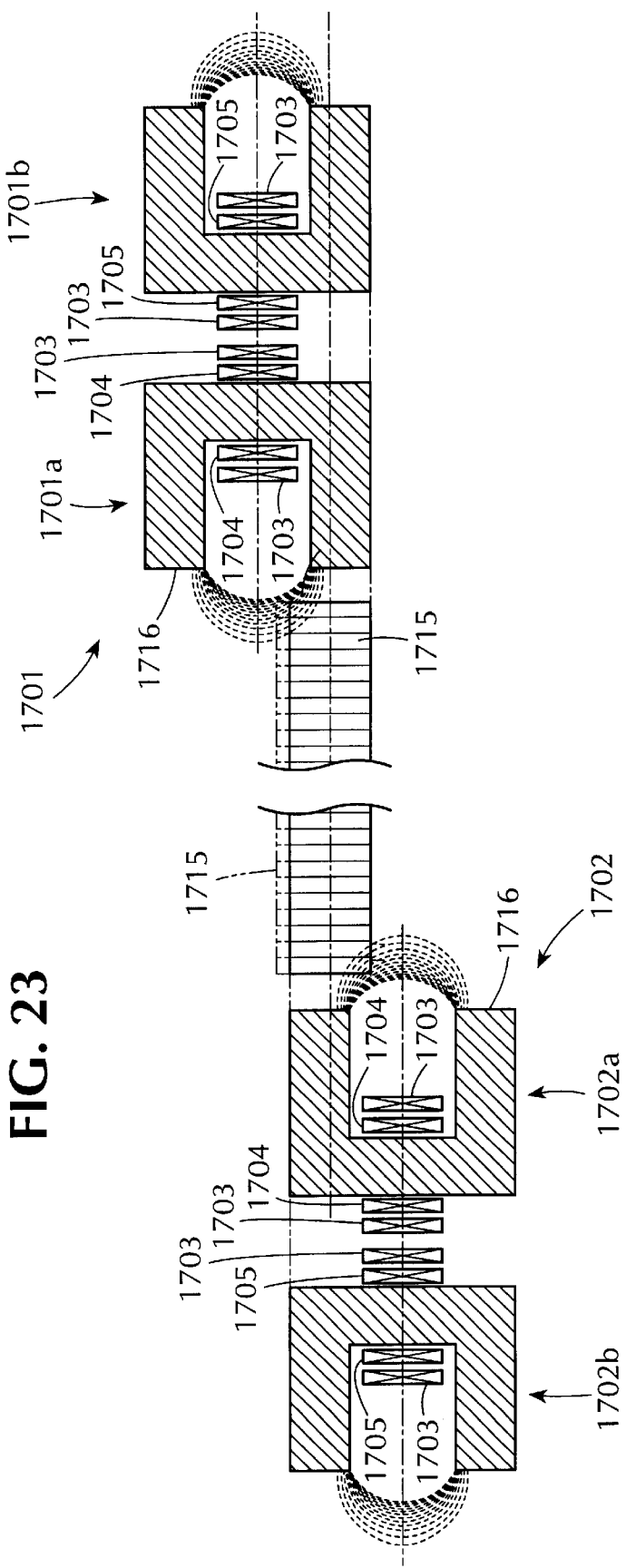
FIG. 23 is a partial view of the coin identifying sensor in FIG. 1.

Second thickness detecting sensor portion 1702, as shown in FIG. 23, has a shape and size identical to first thickness detecting sensor portion 1701. They are integrated by mold 1712 wherein free ends 1716 of detecting magnetic sensor 1701a and 1702a face each other with a space therein. Also, coin path 1713 and drive belt 1714 are formed between first thickness detecting sensor portion 1701 and second thickness detecting sensor portion 1702. It is preferable to form coin path 1713 and drive belt 1714 such that coin 1715 is transferred along guide 1717 which is on the side of one of the thickness detecting sensor portions, e.g., the first thickness detecting sensor portion 1701, in coin path 1713.

First thickness detecting sensor portion 1701 and second thickness detecting sensor portion 1702 can provide the thickness data at both edges in the thickness direction of coin 1715. The edges in the thickness direction means the coin edges on the head and the tail sides of coin 1715. In the case of this embodiment, as shown in FIG. 23, first thickness detecting sensor portion 1701 is placed in the vicinity of the edge on the top side of coin 1715 while second thickness detecting sensor portion 1701 is placed in the vicinity of the edge on the bottom side of coin 1715 wherein each of the thickness detecting sensor portions detects the thickness data and the data regarding the diameter of coin 1715.

Herein, it is preferable to place first thickness detecting sensor portion 1701 and second thickness detecting sensor portion 1702 at a point symmetry. In this embodiment, first thickness detecting sensor portion 1701 and second thickness detecting sensor portion 1702 are symmetrically placed around the center position of coin 1715 or the center position of coin path 1713, then are shifted to the directions opposite from each other to form a step. As a result, the thickness data are more accurately detected. In addition, as shown in FIG. 23, the bottom surfaces of magnetic sensors 1701a and 1701b of first thickness detecting sensor portion 1701 are matched to the bottom side of coin 1715 while the top surfaces of magnetic sensors 1701a and 1702b of second thickness detecting sensor portion 1702 are matched to the top side of coin 1715. Therefore, the heights of thickness detecting sensor portions 1701 and 1702 become symmetrical around coin 1715.

With the coin identifying sensor of the above embodiment, first thickness detecting sensor portion 1701 and second thickness detecting sensor portion 1702 are symmetrically placed wherein the thickness data for coin 1715 are obtained based on the output from both thickness detecting sensor portions 1701 and 1702. Accordingly, fluctuations in the output due to a change in the position of the coin are eliminated. In other words, when coin 1715 is transferred along the side of coin path 1713, a change in the position in the thickness direction is zero such that correct data regarding the diameter can be obtained based on the total of the outputs from both thickness detecting sensor portions 1701 and 1702. When the position of coin 1715 moves in the thickness direction as indicated with an imaginary line in FIG. 24, the output from second thickness detecting sensor portion 1702 decreases according to the change in the position while the output from first thickness detecting sensor portion 1701 increases by the amount equal to the decreased output from second thickness detecting sensor portion 1702. Therefore, the error due to a change in the position can be canceled out. Consequently, this coin identifying sensor can constantly detect the thickness data accurately regardless of the change in the position of coin 1715.

Further, the coin identifying sensor of the above embodiment can accurately detect also data regarding the diameter. In other words, when coin 1715 is transferred along guide 1717, a change in the position of the coin in the direction of its diameter is zero such that second thickness detecting sensor portion 1702 provides correct diameter data. When coin 1715 moves away from guide 1717 such that the position thereof changes, the output from second thickness detecting sensor portion 1702 decreases according to the change in the position while the output from first thickness detecting sensor portion 1701 increases by the amount equal to the decreased output from second thickness detecting sensor portion 1702. Therefore, the error due to a change in the position can be canceled out. Consequently, this coin identifying sensor can constantly detect the diameter data as shown in the figure.

In the coin identifying sensor of the above embodiment, the output error due to a change in the position of the coin can be canceled out. Therefore, even when the edges of coin 1715 are unevenly positioned in relation to magnetic poles of first thickness detecting sensor portion 1701 and second thickness detecting sensor portion 1702, for example, the distance from one edge to free ends 1716 is different from the distance from the other edge to free ends 1716, the thickness data and the diameter data can be accurately detected as normal. Hence, accurate detection is possible regardless of the position of the edges of coin 1715 in relation to the magnetic poles as long as a given output reference value for the coin is established.

The following describes connections of magnetizing coils 1703 and detecting coils 1704 and 1705. In the above embodiment, as shown in FIG. 22, magnetizing coil 1703 and first detecting coil 1704 are wound around first thickness detecting sensor portion 1701 while magnetizing coil 1703 and second detecting coil 1705 are wound around second thickness detecting sensor portion 1702. Also, magnetizing coil 1703 of first thickness detecting sensor portion 1701 and magnetizing coil 1703 of second thickness detecting sensor portion 1702 are connected in series while first detecting coil 1704 and second detecting coil 1705 are connected in phase to form a differential sensor.

With the coin identifying sensor of the above embodiment, even when coin 1715 becomes unstable and the position thereof changes as being transferred, e.g., when the coin is falling down in a vending machine or when the coin is transferred by a belt in a central processor, the signal output regarding the thickness, and further the signal output regarding the diameter does not fluctuate. Therefore, a large margin to compensate the change in the position is not necessary resulting in highly accurate coin identification.

This is one of the most preferable embodiments of the present invention. However, one is not limited to this embodiment as various modifications are applicable within the scope of the present invention.

Figure 25:
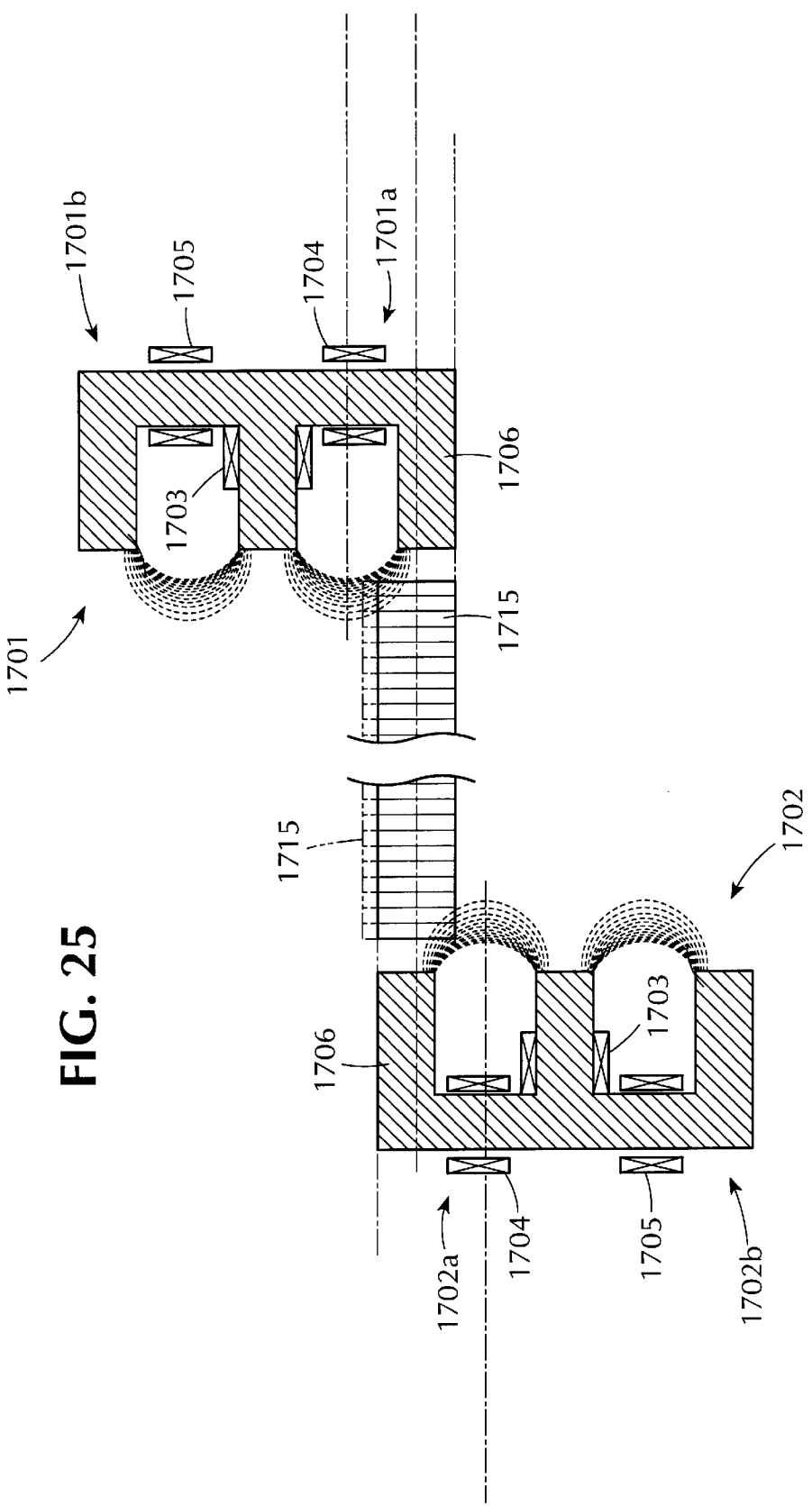
FIG. 25 is a vertical section of another embodiment of the coin identifying sensor.

For example, the above embodiment provides for the coin identifying sensor in which U-shaped magnetic sensor 1701a, 1701b, 1702a and 1702b are combined. However, the shape of the magnetic sensors is not limited to the "] (U)". As shown in FIG. 25, the coin identifying sensor can have a symmetrical configuration with first thickness detecting sensor portion 1701 and second thickness detecting sensor portion 1702 having an E-shaped cross section. Such integrated thickness detecting sensor portions 1701 and 1702 provide accurate differential outputs. Further, it is easier to form the core or a thin laminated plate can be used to form the core. In this coin identifying sensor, magnetizing coil 1703 is shared between detecting magnetic sensor 1701a (1702a) and reference magnetic sensor 1701b (1702b) such that there are two positions around which magnetizing coils 1703 are wound.

The following discusses third detecting sensor 1300. FIGS. 26, 27, 28 and 29 show third detecting sensor 1300. Third detecting sensor 1300 is placed in the vicinity of guide 1314 in coin transferring path 1313 and obtains localized data such as data regarding the unevenness on surfaces, the sides and at the edges of coin 1315. The following discussion is about detection of the unevenness at the edges of coin 1315, such as pearls 1319 which are observed on both surfaces of a 500 Yen coin by third detecting sensor 1300. Pearls 1319 means a plurality of small projections which are placed at equal distance in the circumferential direction.

Third detecting sensor 1300 detects pearls 1319 by detecting the unevenness formed by pearls 1319. Further, it detects whether the size and pitch of pearls 1319 match data predetermined by the distance between the pattern of the unevenness to identify coin 1315 inserted to the coin identifying apparatus as a 500 Yen coin.

Third detecting sensor 1300 is positioned across from pearls 1319 such that it can detect the unevenness formed by pearls 1319 arranged at equal distance while coin 1315 is transferred. In other words, third detecting sensor 1300 of this embodiment can detect a plurality of pearls 1319, about 5 or 6 of them in this embodiment, which are passing thereby.

It is preferable to place third detecting sensors 1300 corresponding to the top and the bottom surfaces of coin 1315 such that pearls 1319 on both surfaces can be simultaneously detected. Therefore, a 500 Yen coin can be readily identified from foreign coins with pearls 1319 on only one side such as a 500 Won.

Further, it is preferable to place a plurality of third detecting sensors 1300 such that all pearls 1319 on a surface can be simultaneously detected at various positions. Even when third detecting sensor 1300 has difficulty in identification of coin 1315 at a certain position due to damage or wearing on the surface thereat, other third detecting sensors 1300 can make up the difficulty to increase the identification accuracy as a whole.

Figure 28A:
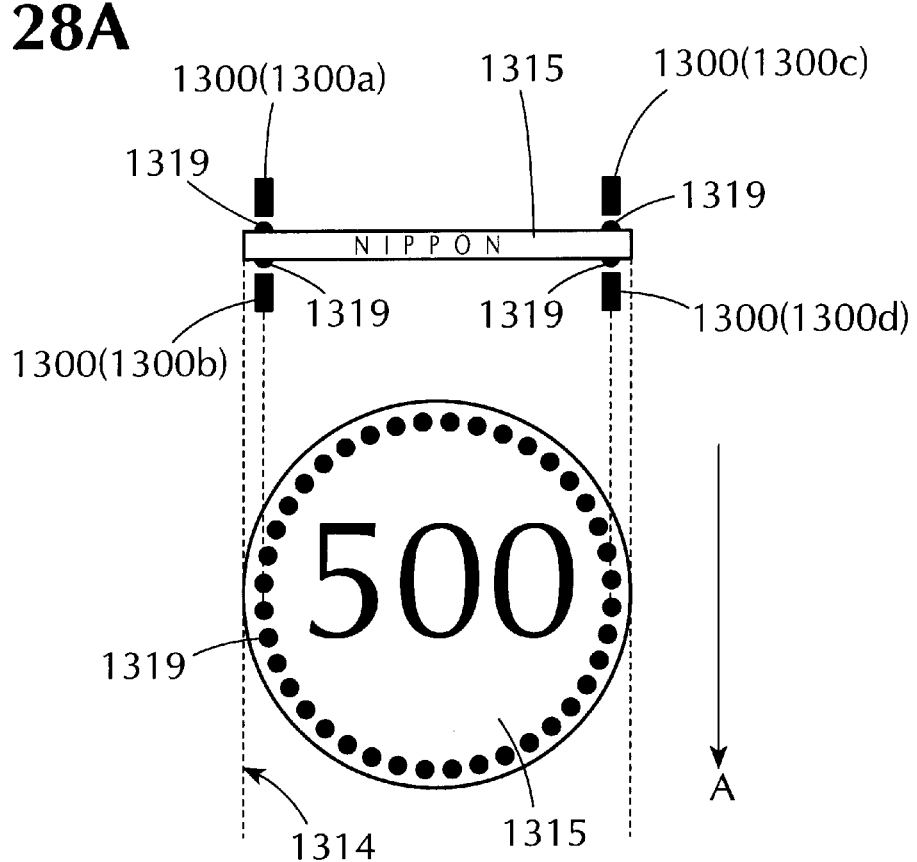
FIGS. 28(a) and (b) show an example of the positioning of third detecting sensors in the coin identifying apparatus.
Figure 28B:
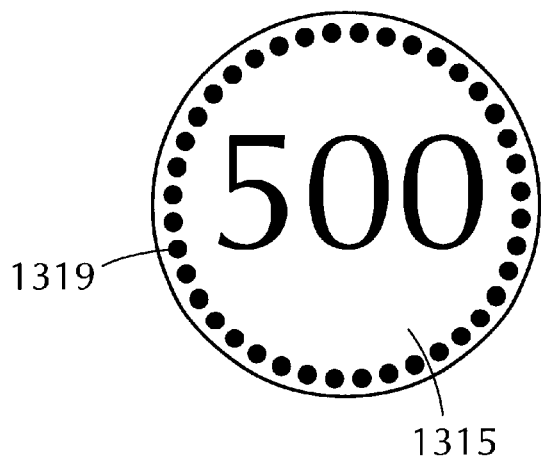

In this embodiment, as shown in FIG. 28, two of third detecting sensors 1300a and 1300c are positioned across from each other approximately at both ends of a diametrical line while two other third detecting sensors 1300b and 1300d are positioned on the back surface corresponding to the positions of 1300a and 1300c.

Third detecting sensors 1300 are not limited to the above configuration as long as they are capable of detecting the unevenness formed by continuous pearls 1319. It is preferable and easy to use a eddy current loss detecting type magnetic sensor or an optical sensor. The optical sensor is not resilient to dust, but is able to provide longer detection distance from an object to be detected. On the other hand, the magnetic sensor is resilient to dust, but has a short detection distance. In this embodiment, therefore, an eddy current loss detecting type magnetic sensor and an optical sensor are combined as third detecting sensor 1300 such that the drawbacks of the two types of machines are compensated by each other. As a result, the coin identifying apparatus can have higher reliability. For example, third detecting sensors 1300a and 1300b are magnetic sensors while 1300c and 1300d are optical sensors in this embodiment.

Figure 26:
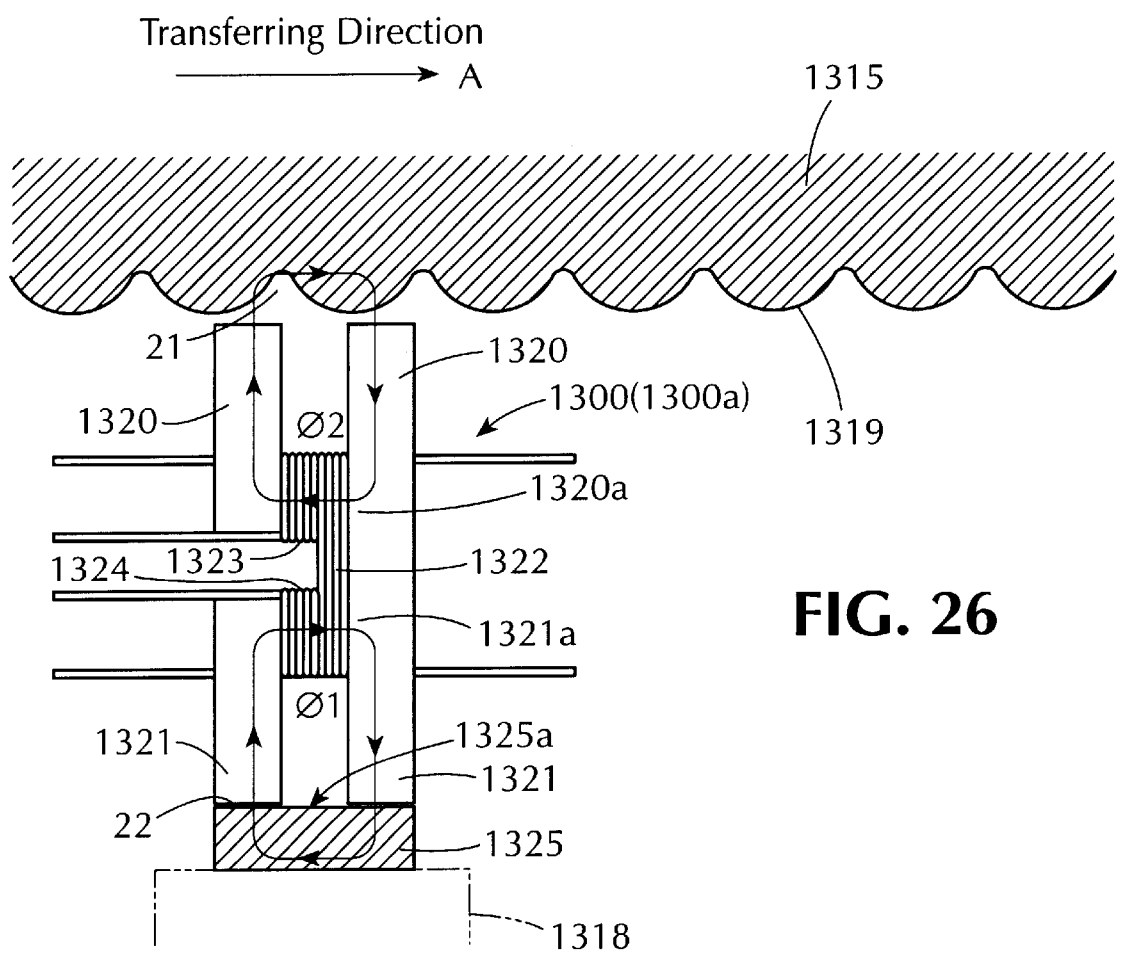
FIG. 26 is a schematic side view of an eddy current loss detecting type magnetic sensor as the third detecting sensor.

FIG. 26 shows an example of a configuration of third detecting sensor 1300a. The configuration of third detecting sensor 1300b is identical thereto. Third detecting sensor 1300a includes a pair of detecting magnetic poles 1320 and 1320 which face each other having detection space 21 with pearls 1319 on coin 1315, and a pair of reference magnetic poles 1321 and 1321 which project away from detecting magnetic poles 1320 and 1320.

Detecting magnetic poles 1320 and reference magnetic poles 1321 are configured of integrated core bodies in a flat shape. Also, magnetizing coil 1322 is wound around both base portions 1321 and 1321a of detecting magnetic poles 1320 and reference magnetic poles 1321. Magnetizing signals having a given sinusoidal wave are constantly supplied from alternating-current power supply 1329 to magnetizing coil 1322 such that magnetic fluxes 2 and 1 corresponding to those magnetizing signals are formed at detecting magnetic poles 1320 and reference magnetic poles 1321, respectively. Additionally, detecting coils 1323 and 1324 are wound around base portions 1320a and 1321a of detecting magnetic poles 1320 and reference magnetic poles 1321.

When coin 1315 is horizontally transferred in coin transferring direction A, the size of detection space 21 changes according to the projections of pearls 1319. In addition, eddy currents are generated in coin 1315 due to magnetic flux 2 in detecting magnetic pole 1320. The intensity of the eddy current changes according to the size of detection space 21.

In other words, when detecting magnetic pole 1320 faces pearls 1319 on coin 1315, the size of detection space 21 becomes smaller. As a result, the eddy current value increases while magnetic flux 2 decreases resulting in a lowered output from detecting coil 1323. On the contrary, when detecting magnetic pole 1320 faces the convex portion between pearls 1319 and 1319, the eddy current value decreases. Hence, magnetic flux 2 increases such that the output from detecting coil 1323 increases. As described above, the output from detecting coil 1323 of detecting magnetic pole 1320 completely corresponds to the uneven pattern formed by pearls 1319.

Reference magnetic pole 1321 is positioned to face reference detection surface 1325a of reference magnetic body 1325, referred as a sample for comparison herein, separately placed from coin 1315, with a reference space 22 whose size remains constant. Sample for comparison 1325 is for obtaining an output used as a reference when a threshold value for coin identification is established. More specifically, sample for comparison 1325 has flat reference detection surface 1325a and is fixed to the core of reference magnetic pole 1321. Also, sample for comparison 1325 can be mounted on mount portion 1318 such that replacement of sample 1325 is easier, as shown in FIG. 26. Consequently, the size of reference detection space 22 is maintained constant even when coin 1315 is horizontally transferred in coin transferring direction A. Materials used for sample for comparison 1325 include ones having almost identical resistivity as coin 1315, more specifically copper and white copper for a 500 Yen. Moreover, detecting magnetic pole 1320 and reference magnetic pole 1321 can be positioned in contact with coin 1315 and sample for comparison 1325.

In spite of the transferring of coin 1315, reference space 22 at reference magnetic pole 1321 remains constant. Therefore, the eddy currents generated in sample for comparison 1325 due to magnetic flux 1 also remain constant such that the output from detecting coil 1324 of reference magnetic pole 1321 is maintained constant.

Figure 27:
FIG. 27 is a graph showing differential outputs of the third detecting sensor in FIG. 26.

The output from detecting coil 1323 of detecting magnetic pole 1320 and the output from detecting coil 1324 of reference magnetic pole 1321 are provided to differential amplifier 1326 wherein differential outputs are obtained via detector 1327 and low pass filter 1328. A change in the detection output of detecting magnetic pole 1320 is exactly extracted from differential amplifier 1326 such that the output having a wave shape exactly corresponding to the uneven pattern of pearls 1319 can be obtained as shown in FIG. 27. Therefore, data including the number, size and pitch of pearls 1319 which pass by third detecting sensor 1300a by analyzing the wave shape of the output is provided.

A circuit configuration of third detecting sensor 1300 can be such that a detecting circuit is formed by a digital circuit using an A/D converter.

Third detecting sensor 1300 configured as described above can provide data regarding pearls 1319 on coin 1315 including the number, size and pitch of pearls 1319. Therefore, it can identify whether inserted coin 1315 is a real 500 Yen coin by checking whether coin 1315 has pearls 1319, whether pearls 1319 exist on both surfaces of the coin and further whether the size and pitch of pearls 1319 match the size and pitch of a real 500 Yen coin. As a result, counterfeit coins having a diameter, material and weight similar to a 500 Yen coin can be eliminated. Further, foreign coins having pearls 1319 on only one side, such as a 500 Won coin, can be differentiated from a 500 Yen coin and thus eliminated.

Moreover, pearls 1319 arranged at a constant distance are consistent regardless of the angle of inserted coin 1315 in the circumferential direction and therefore, it is not necessary to consider the angle of coin 1315 in the circumferential direction. For example, coin 1315, transferred at an angle, is just as identifiable as it was transferred straight. Also, dotted line S indicates the position of third detecting sensor 1300. Hence, a process required for identification of coin 1315 is much simpler and performed at a high speed compared to identifying a design pattern on coin 1315.

The foregoing embodiment is a preferred example of a third detecting sensor 1300, however, the present invention is not limited to this embodiment.

Third detecting sensors 1300 are not limited to be placed facing both sides of coin 1315, but one may be placed to face either side of the coin. In this case, data regarding pitch and size of pearls 1319 can be obtained based on the output from third detecting sensor 1300 to check whether the data matches the ones of a real 500 Yen coin such that foreign coins having pearls 1319, such as a 500 Won, can be discriminated against a 500 Yen coin.

In the above embodiment, to provide more reliable coin identifying apparatus, an eddy current loss detecting type magnetic sensor and an optical sensor are combined such that each other's drawbacks are compensated. However, one may employ only the eddy current loss detecting type magnetic sensor, only the optical sensor or other sensors which detect unevenness.

Also, pearls 1319 are detected while coin 1315 is moving in the above embodiment. However, one can move third detecting sensor 1300 while coin 1315 is fixed. In this case, third detecting sensor 1300 can be transferred linearly or in a circular motion along the circumference formed by pearls 1319.

Further, a 500 Yen coin is the object to be detected in the above embodiment. However, various objects having pearls 1319, such as other coins and medals, are detectable with the present invention.

Pearls 1319 on both sides of a 500 Yen coin are preferred to specify coin 1315 independent on the angle of coin 1315 in the circumferential direction. However, other shapes or patterns equivalent to pearls 1319 to be detected by third detecting sensor 1300 can be used. For example, coin 1315 can be identified as third detecting sensor 1300 detects a fine uneven pattern on the top or the back surface of coin 1315 which specifies coin 1315 regardless of the angle in the circumferential direction.

The above describes detection of pearls 1319 at the edge of coin 1315, however, it is just one of the examples of unevenness to be detected. Others include the unevenness on the surface, the unevenness on the side, other kinds of unevenness and a hole. For example, some coins have the unevenness on the side (hereinafter sometimes referred to as "corrugations 1337") which are formed at a constant distance on the outer circumference surface of coin 1315 while others do not. Also, the characteristics of corrugations 1337 such as pitch, depth, width and number differ according to coin 1315. Therefore, data necessary for identification of coin 1315 can be obtained by detecting corrugations 1337 by third detecting sensor 3 Herein, corrugations 1337 are equivalent of pearls 1319 in FIG. 26.

The above-described first detecting sensor 1100, second detecting sensor 1200 and third detecting sensor 1300 are integrated by mold 1012 to form a magnetic sensor body.

Figure 13C:
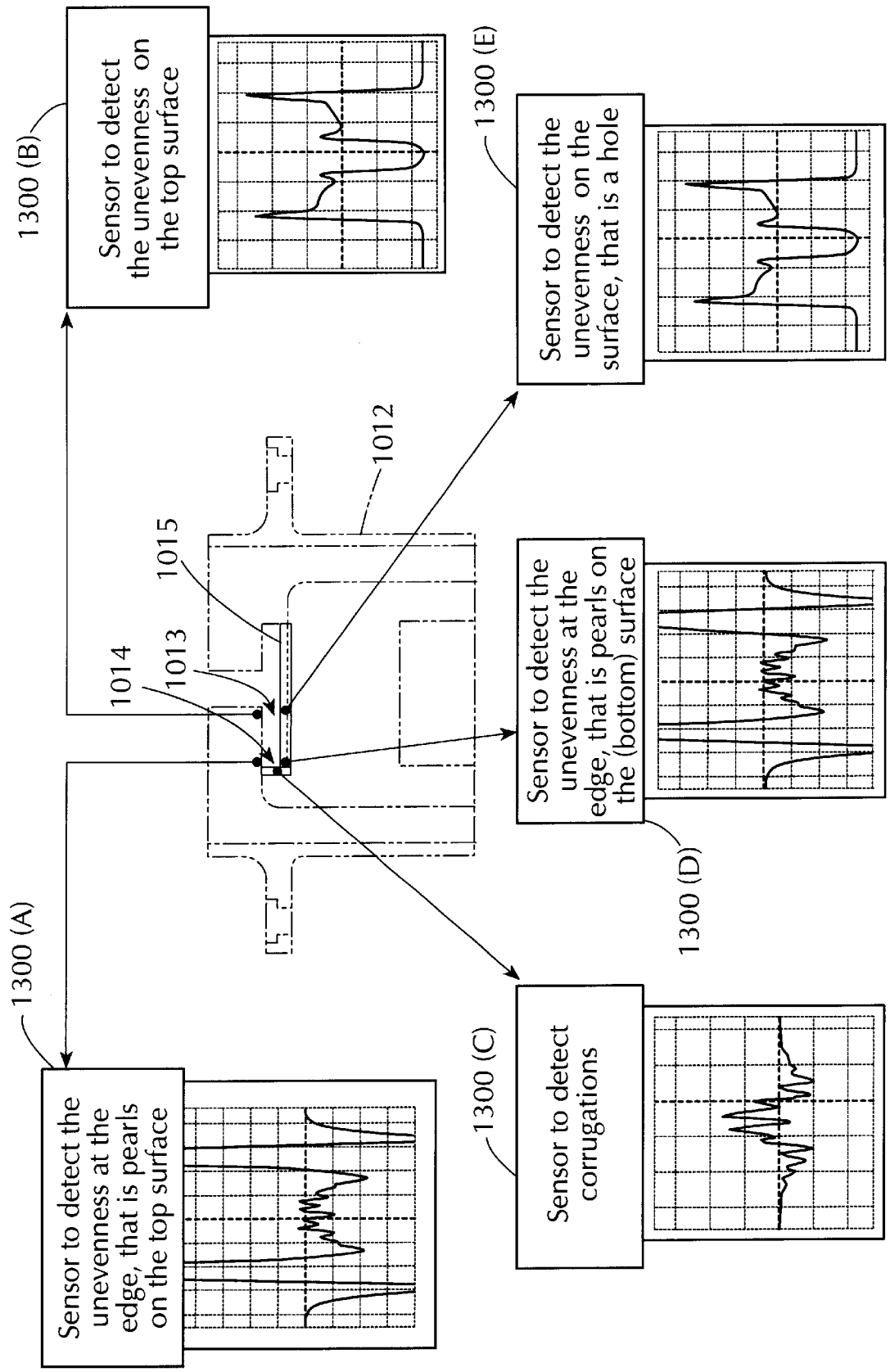

FIG. 13 shows the following five kinds of third detecting sensors 1300: (1) sensor to detect the shape of the edge, that is pearls on the top; (2) sensor to detect the unevenness on the top surface; (3) sensor to detect corrugations; (4) sensor to detect the shape of the edge, that is pearls on the bottom; (5) sensor to detect the unevenness, that is a hole. However, one may need to place any of those necessary of third detecting sensor 1300.

Figure 29:
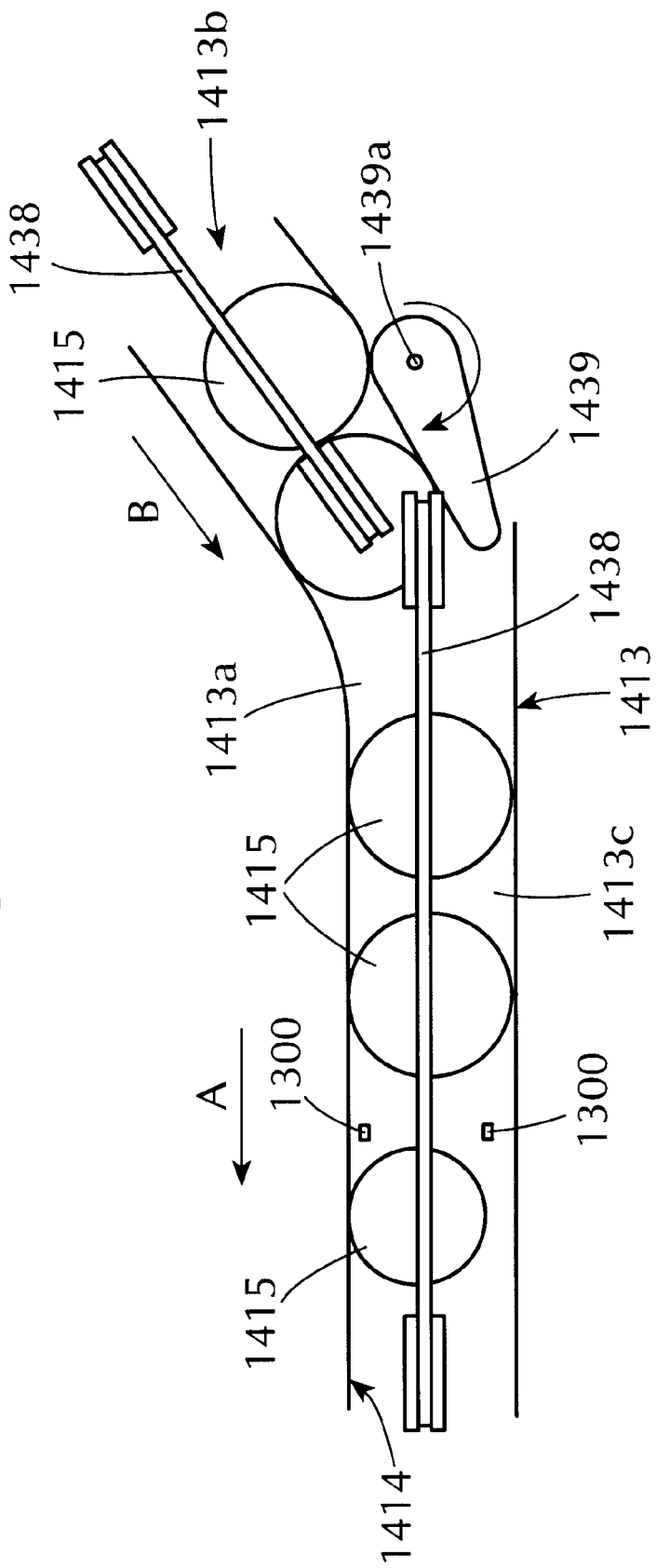
FIG. 29 is a schematic plan view of an example of a coin transferring path formed in the coin identifying apparatus.
Figure 30A:
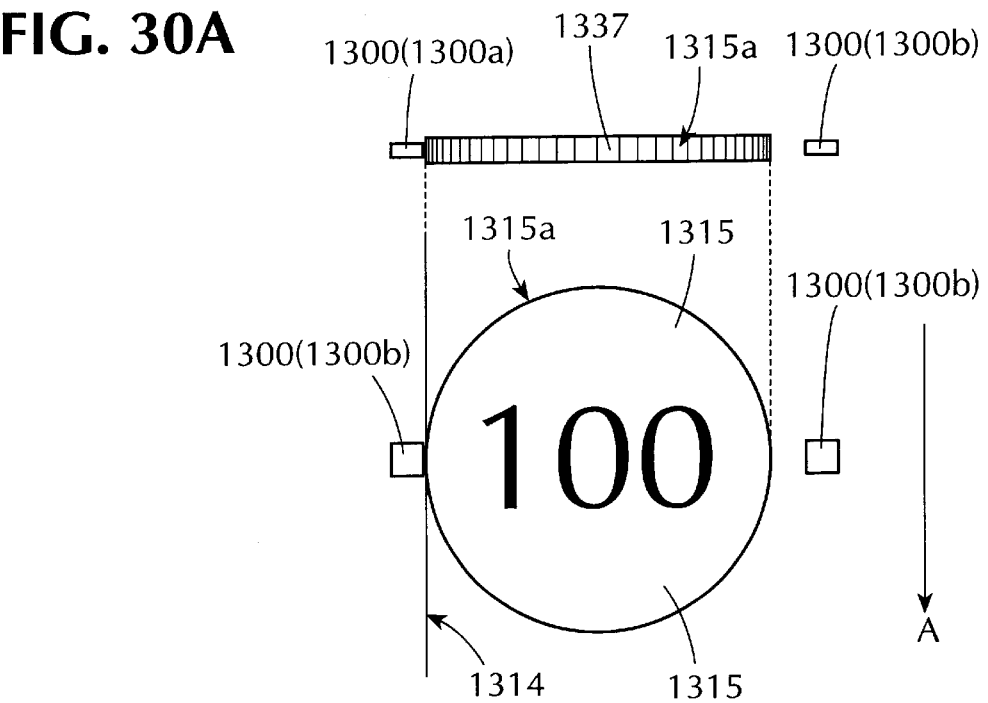
FIGS. 30(a) and (b) show another example of the positioning of detecting sensors in the coin identifying apparatus.
Figure 30B:
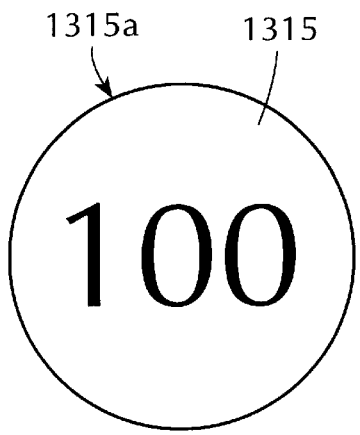

Such a magnetic sensor body comprises coin transferring path 1013. The following describes coin transferring path 1013. It is shaped as a flat "V" as shown in FIG. 29 and transfers coin 1415 along guide 1414 while holding coin 1415 on moving surface 1413a. It also includes bottom moving plate 1413c such that moving surface 1413a can hold coin 1415 to be detected which is transferred from entrance 1413b at the right side in the figure towards the left hand side. Also, transferring belt 1438 is placed straight above bottom moving plate 1413c.

Guide 1414 is formed along a part of the edge of bottom moving plate 1413c. Coin controlling lever 1439, which pushes coin 1415 against guide 1414, is rotatably supported by pin 1439a at the bent portion of coin transferring path 1413. Coin controlling lever 1439 pushes coin 1415, which is transferred on bottom moving plate 1413c, against guide 1414 with a means to apply pressure (not shown) such as a spring. After coins 1415 pass the position of coin controlling lever 1439 toward the lower part of coin transferring path 1413, they are continually transferred while their outer circumference 1415a is in contact with guide 1414.

The lower part of coin transferring path 1413 includes the above described third detecting sensors 1300. As coins 1415 are transferred along guide 1414 and pushed to one side indicated by arrow B in FIG. 29, third detecting sensors 1303c and 1303d do not provide outputs for coins with a small diameter 1415, such as 1 Yen, 50 Yen, 100 Yen and 10 Yen coins. Therefore, they can be easily differentiated from a 500 Yen coin.

Also, coin transferring path 1413 is not limited to having coin controlling lever 1439 as shown in FIG. 29. Coin transferring path 1413 can be configured such that coins 1415 are transferred while pushed against guide 1414 with their own weight. In this case, when coin 1415 pass by third detecting sensors 1300 while rotating, the wave shape of the output from third detecting sensors 1300 should be analyzed considering the rotation to obtain data regarding the unevenness of coin 1415 such as pearls 1419.

The following describes a coin identifying apparatus of the present invention. The coin identifying apparatus includes a first detecting sensor, a second detecting sensor, a third detecting sensor, coin transferring path 1413 and identifying means 1417.

Figure 31:
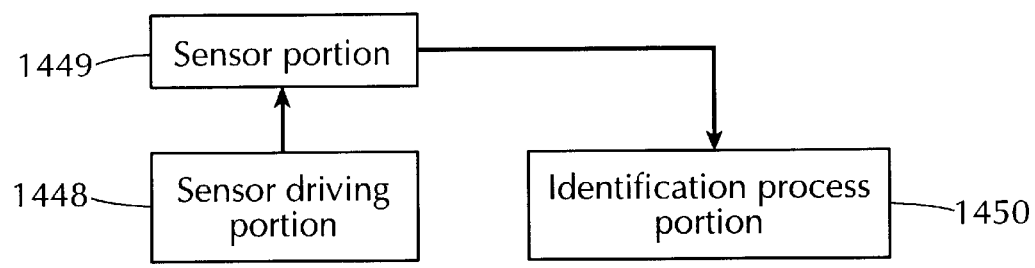
FIG. 31 is a schematic configuration of a coin identifying apparatus of the present invention.

FIG. 31 shows a schematic configuration of the coin identifying apparatus. As shown in the figure, it drives sensor portion 1449 by sensor driving portion 1448 and processes detected data at identification process portion 1450. Sensor driving portion 1448 is configured of a magnetizing circuit of detecting sensors 1100, 1200 and 1300 while sensor portion 1449 is configured with a detecting circuit of detecting sensors 1100, 1200 and 1300. Also, identification process portion 1450 is mainly formed of identifying means 1417.

Figure 32:
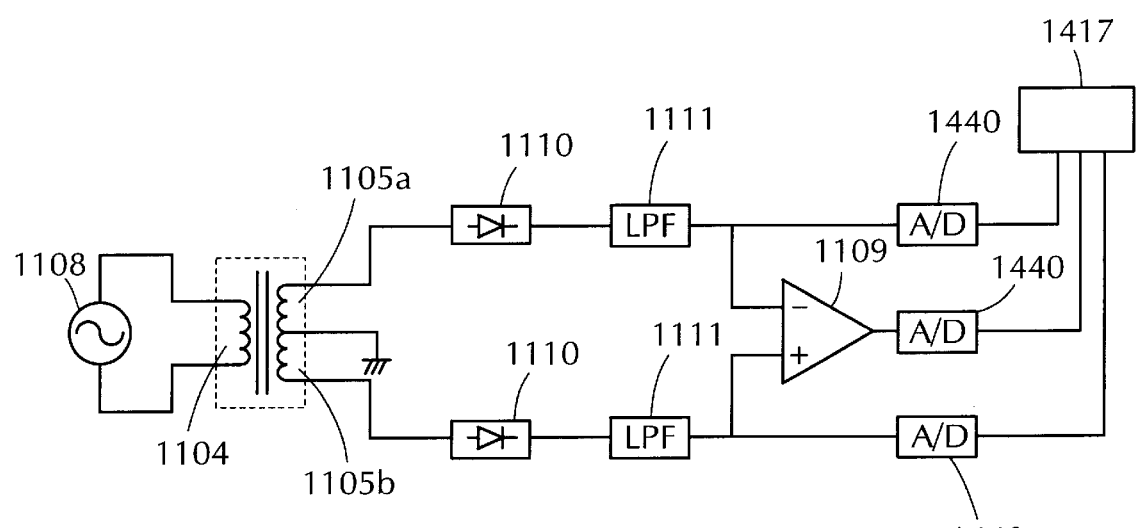
FIG. 32 is an example of a circuit having an identifying means.
Figure 33:
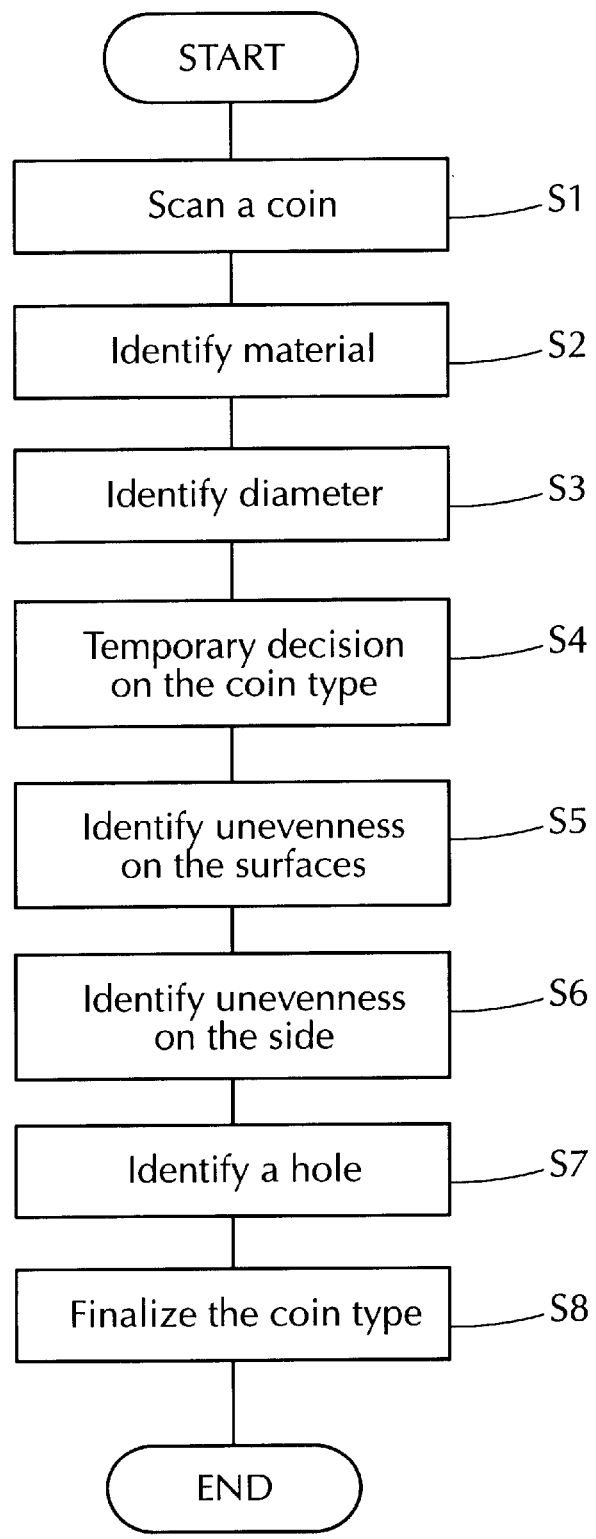
FIG. 33 is a flowchart of a basic process flow of coin identification.

Identifying means 1417 provides a temporary decision on coin 1415 to be detected based on the outputs from first detecting sensor 1100 and second detecting sensor 1200, then identifies coin 1415 based on the output from third detecting sensor 1300 while considering the temporary decision. Identifying means 1417 is also formed of a memory for data regarding the unevenness on the surface or a CPU, and as shown in FIG. 32, identifies coin 1415 by using the output signals from detecting sensors 1100, 1200 and 1300 which are converted to digital data by A/D converter 1440.

The following describes an algorithm of identification using identifying means 1417. Coin identification by identifying means 1417 is performed according to a basic process flow shown in FIG. 33. When coin 15, e.g. a 500 Yen coin, which is transferred along guide 1414 passes the sensor portion, coin scanning is performed (Step 1), followed by signals from detecting sensors 1100,1200 and 1300 as shown in FIG. 17. First, material is identified using signal data from a material sensor formed of first detecting sensor 1100 (Step 2). As is obvious, the signal data from the material sensor is used in identification of the material. Also, signal data from a diameter sensor formed of second detecting sensor 1200 is used in identification of diameter.

Based on the data regarding material and diameter obtained through the process up to this point, a temporary decision is made on the type of the coin. Type K of the coin determined in the temporary decision (or data K regarding type) is utilized in identification using localized data in the following process.

Identification of the unevenness on the surface of the coin is made using signal data from a lower sensor to detect unevenness and a upper sensor to detect unevenness formed of third detecting sensors 1300. The lower and upper sensors to detect unevenness are positioned such that the characteristic uneven pattern on 500 Yen coin 1415 passes by the sensors. Therefore, in the case of a 500 Yen coin, a pattern shown in FIG. 17 appears in the sensors to detect the unevenness on the surfaces.

The pattern at the center of the signal wave is due to the uneven pattern characteristic of a 500 Yen coin. In the case of coins other than a 500 Yen coin, the characteristic uneven pattern is not found at the position of the sensors. Therefore, the pattern observed in the figure does not show. For example, with respect to the unevenness on surfaces such as pearls 1419, the signal pattern from the lower and upper sensors to detect unevenness are used. Which part of each signal pattern is evaluated should be determined for each coin type based on the position of the sensors. First, parameters are established, and the part to be evaluated, which is determined based on the coin type provided by the temporary decision, is extracted from the signal data of the lower sensor to detect the unevenness. The extracted pattern is verified against a master pattern of the coin type previously prepared for the sensor to detect the unevenness on the surface. Herein, a degree of similarity is designated as r1. Next, the part to be evaluated, which is determined based on the coin type provided by the temporary decision, is extracted from the signal data of the upper sensor to detect the unevenness. The extracted pattern is verified against the other master pattern of the coin type previously prepared for the sensor to detect the unevenness on the surfaces. Herein, a degree of similarity is designated as r2. Matching of the patterns is performed as follows. The data of the extracted signal patterns is designated as vector F, and T indicates the first master pattern. Correlation values can be used as a measurement of the similarity. Defining the degree of similarity as r:

$$r=(F \cdot T)/|F| \cdot |T|$$

wherein: (F·T)=scalar product of F and T; and | |=norm of vector.

Next, the patterns of F and T2, the other master pattern, are matched to obtain a correlation value r. If r is larger than predetermined value r0, it is determined that the type of the coin being evaluated matches the type provided in the temporary decision such that the coin type is concluded as an official coin type. In the above description, master patter T has information regarding both sides of one kind of coin, e.g. a 500 Yen coin, while master pattern T2 has information regarding other kind of coin, e.g. a 500 Won coin.

The following discusses identification of the unevenness on the side. If coin 1415 is a 100 Yen or a 50 Yen coin, a vibration pattern shown in FIG. 17 appears with the sensor to detect the unevenness on the side due to corrugations 1337. In the case of coin 1415(1315) without corrugations 1337, such a pattern is not observed. A part to be evaluated, which is determined based on the coin type provided by the temporary decision, is extracted from the signal data of the sensor to detect the unevenness on the side. The extracted pattern is verified against a master pattern of the coin type previously prepared for the sensor to obtain the degree of similarity. Further, in identification of a hole, the length of a pulse in the signal data from a sensor to detect a hole is measured. If the measured value is smaller than a predetermined value, it is determined that the coin has a hole. If not, it is determined that the coin does not have a hole.

Once the degree of similarity for each sensor r1, r2 and r3 is determined, the coin type is then determined.

The above-described coin identifying apparatus enables elimination of counterfeit or forged coin which was impossible with a conventional sensor dependent of macro data.

The above coin identifying apparatus is one of the preferred embodiments of the present invention. However, the present invention is not limited to the above embodiment as various modifications are applicable within the scope of the present invention.

For example, the diameter was identified (Step 3) in the above algorithm for coin identification. However, the thickness of coin 1415 can be detected and identified instead of or at the same time as the identification of the diameter. In this case, an algorithm similar to the one for the identification of the diameter can be employed. However, in the identification of a 500 Yen coin as in the above embodiment, only the thickness of a 500 Yen coin is different from the rest of coins.

In the embodiment of third detecting sensor 1300, sample for comparison 1325 is positioned at reference magnetic pole 1321. Similarly, sample for comparison 1325 can be placed at reference magnetic sensor 1100b of first detecting sensor 1100 or reference magnetic sensor 1200b of second detecting sensor 1200 to use it as a reference for detection of coin 1415.

Also, an example of a driving circuit for a sensor to detect the unevenness, which is formed of third detecting sensor 1300, was discussed. However, the present invention is not limited to such a circuit as various circuits can be adapted.

Figure 15:
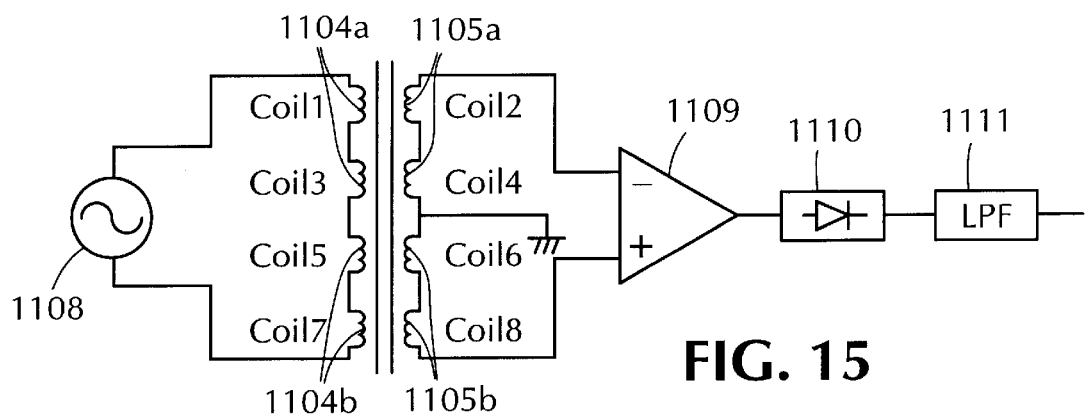
FIG. 15 is a circuit diagram to indicate a connection of magnetizing coils and detecting coils of a differential magnetic sensor.
Figure 16:
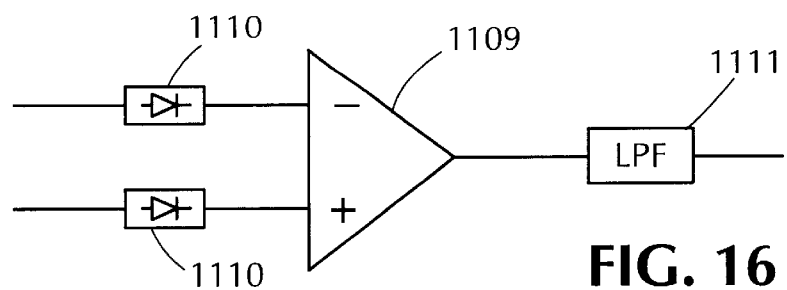
FIG. 16 is a part circuit diagram to indicate a connection that detecting coils are positioned before a differential amplifier for detection.

In the above described differential magnetism sensor apparatus, the configurations of the magnetic pole, the magnetizing coil and the differential detecting coil which are included by the magnetic sensor portion are not limited to those shown in FIGS. 15, 16 and 32. The present invention can be applicable to any differential magnetism sensor apparatus which includes a magnetizing coil which generates a closed loop magnetic field and a differential detecting coil which detects a variation of a magnetic flux passing through the magnetizing coil.

As is obvious from the above description, the magnetic sensor coin identifying apparatus of this invention obtains macro data regarding overall characteristics of a coin such as the material by using a first detecting sensor and a second detecting sensor. Also, it obtains localized data such as the unevenness on the surface of the coin by using a third detecting sensor. Therefore, it can perform high-level coin identification based on such data. As a result, it accurately identifies the authenticity or the type of the coin to prevent illegal use of forged and counterfeit coins.

Further, this coin identifying apparatus provides a temporary decision about the coin based on the macro data which is considered for final determination. Therefore, identification of the coin can be completed by simply verifying and processing the data regarding the coin from the temporary decision. Consequently, only a short process time is required for the identification.

In addition, the coin identifying apparatus has a detecting sensor which obtains macro data and a detecting sensor which obtains localized data, as an integrated body. Hence, the size of the apparatus can be minimized. Moreover, the integrated configuration minimizes probability of defects such as a step in a coin transferring path.

The magnetic sensor body of this invention can accurately identify the authenticity or the type of a coin based on macro data, which are regarding overall characteristics of the coin, such as material, and which are provided by a first detecting sensor and a second detecting sensor, and localized data which include the unevenness on the surface of the coin and which are provided by a third detecting sensor.

In the magnetic sensor body of this invention, a detecting magnetic sensor and a reference magnetic sensor configures a differential sensor such that there is a differential output of the two sensors. As a result, the temperature characteristics and identification performance of the sensor improves. Also, both of the detecting magnetic sensor and the reference magnetic sensor are shaped as a "](U)" wherein the top and the bottom cores are connected by a connecting portion. Hence, it prevents magnetic fluxes from leaking as they pass through a conductor (the core) such that the resistance of the magnetic fluxes is decreased. Consequently, the current efficiency is dramatically improved resulting in increased identification performance.

The magnetic sensor body of this invention can also provide signals as a reference for coin detection based on a sample for comparison. Also, the sample can be easily replaced with others.

According to a magnetic sensor of this invention, projecting portions are formed such that two free ends face each other wherein magnetic coils and detecting coils are wound around the projecting portions. As a result, magnetic fluxes generated thereat are converged to a spot for higher density. This results in improved current efficiency for higher sensitivity. Therefore, a metallic body can be accurately identified by obtaining signals specific to the material or the thickness thereof.

Additionally, the core is shaped to sandwich the metallic body to be identified such that the output signal voltage is increased, resulting in improved identifying performance.

Consequently, a slight change in the material causes a large change in the changing voltage value such that the threshold can be established to reflect the actual environment.

Further, a pair of detecting coils are placed such that they sandwich the metallic body to be identified in the vertical direction while they are wound to be in equiphase. Therefore, even when the metallic body moves in the vertical direction, the output from the coils in series remains constant. Herein, the material and the thickness can be simultaneously identified by shifting the metallic body to one side while being transferred.

According to a magnetic sensor of this invention, a detecting magnetic sensor and a reference magnetic sensor configure a differential sensor to provide differential outputs between the two sensors. As a result, the temperature characteristics and the identification performance are improved.

In addition, the detecting magnetic sensor and the reference magnetic sensor are shaped as a "] (U)" wherein the top and the bottom cores are connected by a connecting portion. Hence, leaking magnetic fluxes can be contained to pass through the conductor (the core). Consequently, the low resistance for magnetic fluxes result in dramatically improved current efficiency such that the identification performance also improves.

According to a magnetic sensor of this invention, magnetizing coils and detecting coils are wound around a connecting portion, opposite from free ends, such that a parallel magnetic field with even density can be generated in the gap portion of the core. As a result, the diameter of the metallic body is more accurately identified. Also, formation of the differential sensor improves the temperature characteristics and identification performance such that the diameter of the metallic body can be further accurately identified.

According to a magnetic sensor of this invention, projections have a slant such that the distance therebetween becomes narrower towards the free ends. As a result, magnetic resistance is decreased such that the amount of magnetic flux which shorts out before reaching the ends can be decreased. Therefore, the core as a whole provides more parallel and even magnetic fluxes resulting in accurate detection of the diameter of the magnetic body.

According to a magnetic sensor of this invention, a detecting magnetic sensor and a reference magnetic sensor configure a differential sensor which improves the temperature characteristics and identification performance.

According to the coin identifying sensor of this invention, detecting sensor portions can detect data regarding the diameter of a coin transferred along a guide. Also, when the position of the coin changes, error in the data can be canceled out such that the data output does not fluctuate regardless of the change in the position of the coin. As a result, a large margin for the change in the position is not necessary and the diameter of the coin can be accurately identified all the time.

In addition, the first and the second detecting sensors are formed as E-shaped differential coils. Therefore, the coin identifying sensor is barely impacted by a change in the surrounding environment wherein the temperature characteristics and identifying performance are improved resulting in accurate detection of data regarding the diameter of the coin.

According to the coin identifying sensor of this invention, even when the position of the coin changes, error in the data can be canceled out such that the data output does not fluctuate regardless of the change in the position of the coin. As a result, a large margin for the change in the position is not necessary and the diameter of the coin can be accurately identified all the time.

Further, the first and the second detecting sensors are formed as E-shaped differential coils. Therefore, the coin identifying sensor is barely impacted by a change in the surrounding environment wherein the temperature characteristics and identifying performance are improved resulting in accurate detection of the data regarding the diameter of the coin.

According to the coin identifying sensor of this invention, thickness detecting sensor portions detect data regarding the thickness of a coin which is transferred along a guide in a coin path. When the position of the coin moves, the detection output from one of the thickness detecting sensor portions decreases while the detection output from the other increases by the decreased amount resulting in canceling off of the error in the data. Therefore, this coin identifying sensor can prevent fluctuations in the data output regardless of a change in the position of the coin. As a result, the coin identifying sensor can constantly detect the thickness of the coin accurately without a rage margin to compensate the change in the position.

Further, the first and the second thickness detecting sensor portions are individually formed as a differential coil configured of U-shaped sensor bodies. Hence, the coin identifying sensor is hardly affected by a change in the environment wherein the temperature characteristics and identification performance are improved such that the thickness data of the coin can be accurately detected.

According to the coin identifying sensor of this invention, accurate detection is possible regardless of the position of the edges of coin 15 in relation to the magnetic poles by establishing a given output reference value for the coin.

According to the coin identifying sensor of this invention, the first thickness detecting sensor portion and the second thickness detecting portion are symmetrically positioned such that the thickness data can be accurately detected. Also, such a coin identifying sensor is easy to manufacture.

Figure 34:
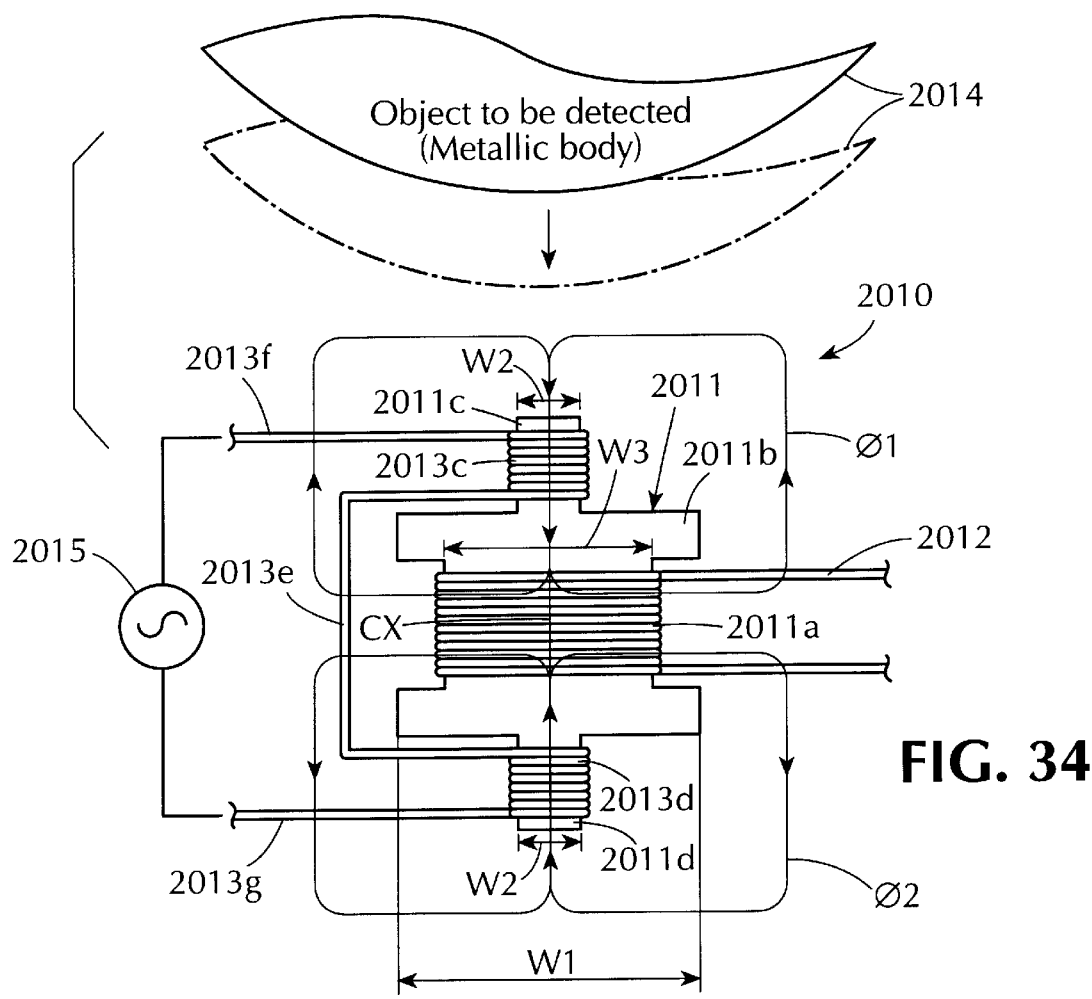
FIG. 34 is a schematic side view of a displacement sensor of the present invention.
Figure 35:
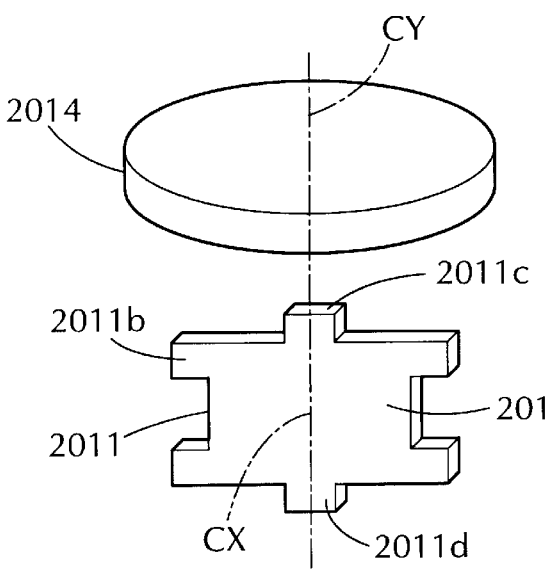
FIG. 35 is an oblique view of the outside showing the configuration of a core in the displacement sensor in FIG. 34.

The following describes another preferred embodiment of the present invention. In displacement sensor 2010 of this embodiment shown in FIGS. 34 and 35, detecting coil 2012 is wound around core center portion 2011a of core body 2011 formed of a piece of thin plate. Also, magnetizing coils 2013c and 2013d are separately wound around each of core end portions 2011c and 2011d which are continually formed on the top and the bottom sides of core center portion 2011a with engaging projection portions 2011b therebetween.

One core end portion 2011c, the one towards the top in the figure, is positioned to face object to be detected 2014 formed of a metal member of a magnetic body. Herein, the direction of axis CX, which passes core center portion 2011a and reaches the other core end portion 2011d, is established to be approximately equal to the direction of axis CY of object 2014 (the vertical direction in the figure). Object 2014 is moved back and forth along the direction of axis CX. Therefore, when object 2014 approaches and retreats in relation to core end portion 2011c while they face each other, the position of object 2014 is detected. Displacement sensor 2010 can be configured to move while object 2014 is fixed.

More specifically, core center portion 2011a is positioned at the approximate center of position sensor 2010 in the direction in which axis CX extends (the vertical direction in the figure). Width $W_1$ of core center portion 2011a in the direction perpendicular to the direction of axis CX (the horizontal direction in the figure) is established to be relatively wide. Also, width $W_2$ of core end portions 2011c and 2011d is established to be smaller than width $W_1$ of core center portion 2011a ($W_2 < W_1$). In this embodiment, $W_2$ is established to be less than a half of $W_1$ ($W_2 = W_1/2$). Herein, core center portion 2011a has a notch at a position, around which detecting coil 2012 is wound, to have a slightly narrow width, $W_3$.

A pair of magnetizing coils 2013c and 2013d, wound around core end portions 2011c and 2011d, are formed of a continual coil member. The inner ends of each coil member, around the base portion of core end portions 2011c and 2011d, are connected to each other via connecting wire 2013e to configure them in series. Also, lead portions 2013f and 2013g from the tip of core end portions 2011c and 2011d are connected to terminals of alternating-current power supply 2015. A sine wave or a rectangular wave, generated by alternating-current power supply 2015, is applied to the section of core end portions 2011c and 2011d around which the coils are wound. As a result, opposed magnetic fields 1 and 2, in the reverse directions from each other, are formed on axis CX.

Engaging projection portions 2011b and 2011d, which are formed at the borders of core center portion 2011a with a pair of core end portions 2011c and 2011d, project out in the width direction perpendicular to the direction of axis CX. Magnetizing coils 2013c and 2013d and the detecting coil are wound around the portions above and below engaging projection portions 2011b and the core center portion 2011a, respectively (see FIG. 34). In other words, the positions around which coils 2013c and 2013d are wound should be determined by engaging projection portions 2011b and 2011b.

In displacement sensor 2010 having the above configuration, the detection output from detecting coil 2012 is based on the magnetic field equal to a sum of opposed magnetic fields 1 and 2 in the reverse directions from each other generated by a pair of magnetizing coils 2013c and 2013d. Therefore, when object to be detected 2014 does not exist or when object 2014 is sufficiently distant from displacement sensor 2010 (infinitely distant), the absolute values of opposed magnetic fields 1 and 2 are equal (|1|=|2|) such that the output from detecting coil 2012 becomes zero. When the relative positions of object 2014 and displacement sensor 2010 become closer, the eddy current generated in object 2014 changes corresponding to a change in the relative positions. As a result, balance between opposed magnetic fields 1 and 2 is lost, for example, 1 increases while 2 decreases. Then, based on the magnetic field equivalent to a difference in the absolute value of magnetic fields 1 and 2 (|1|=|2|), a differential output is provided from detecting coil 2012.

The above differential condition provides an output which can be expressed by the following equation:

$$\text{Output} = \frac{d\Phi_1}{dt} - \frac{d\Phi_2}{dt} \qquad \text{Equation 1}$$

wherein: 1=A sin t (in phase)
2=B sin t

In displacement sensor 2010 having the above configuration, magnetizing coils 2013c and 2013d and detecting coil 2012 are separately placed. In addition, detection is performed based on the balance between the pair of magnetizing coils 2013c and 2013d. Therefore, a change in the magnetic fluxes can be sensitively detected with excellent linearity using thin and compact core body 2011 regardless of impedance by direct current resistance division and the like. Further, without using a constant current circuit as in a conventional configuration, an inexpensive circuit can provide stable detection operation in spite of a change in the surrounding temperature.

In this embodiment, core end portions 2011c and 2011d, to which object to be detected 2014 approaches, have a narrow width such that the current efficiency in core end portions 2011c and 2011d is improved. Hence, more magnetic flux is generated resulting in increased change in detection, that is, higher sensitivity.

Further, in displacement sensor 2010 of the above embodiment, engaging projection portion 2011b is formed at the borders of core center portion 2011a with core end portions 2011c and 2011d. As a result, the positions around which coils 2012, 2013c and 2013d are wound are accurately determined. Therefore, deviations in the phase or outputs can be reduced while a large rate of change can be obtained.

According to displacement sensor 2010, described above, the output balance between the pair of magnetizing coils 2013c and 2013d is established to be differential. As a result, more sensitive and accurate detection is enabled. Also, the differential output improves the temperature characteristics.

Figure 36:
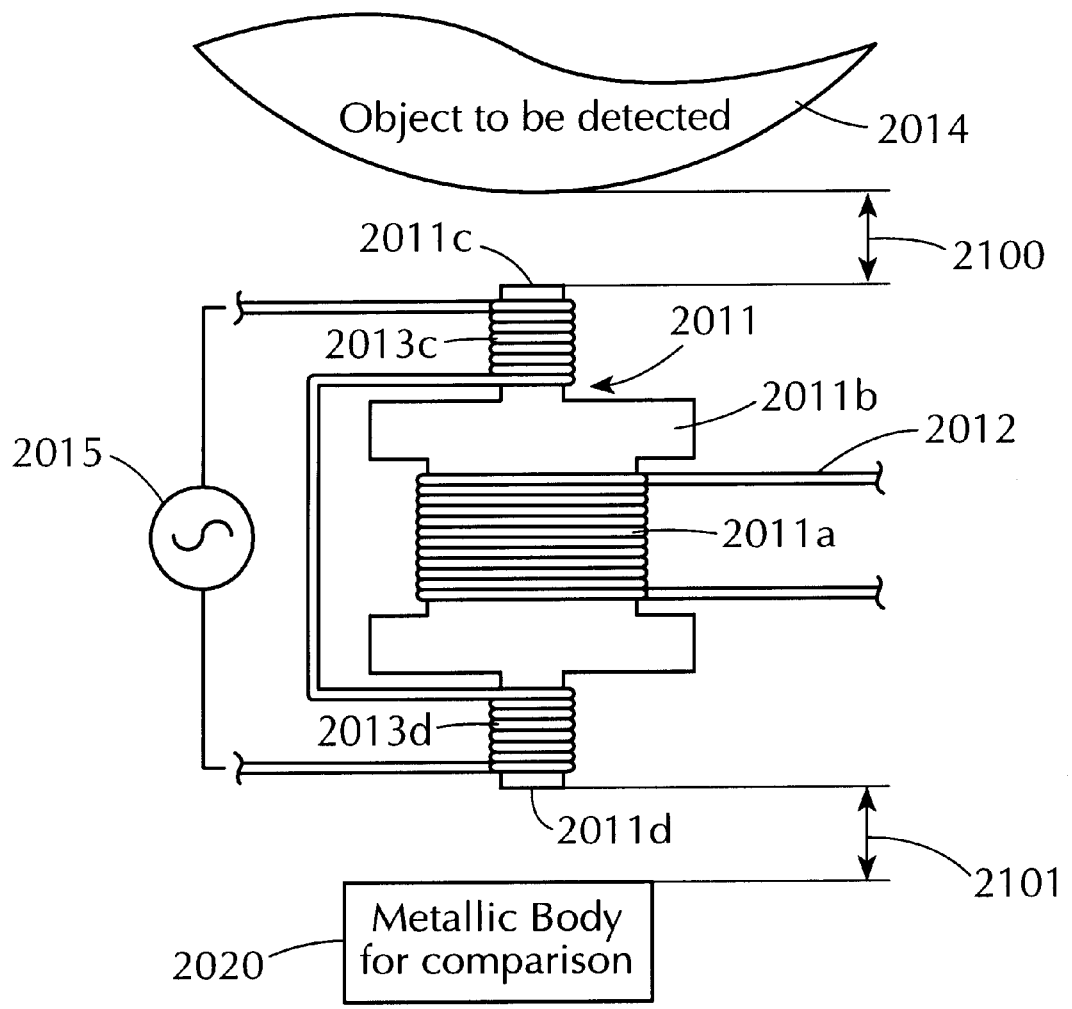
FIG. 36 is a schematic side view of another displacement sensor of the present invention.

In an embodiment shown in FIG. 36 having components indicated by symbols identical to the ones in the above embodiment, one core end portion 2011c toward the top in the figure is positioned to face object to be detected 14 formed of a metallic member or a magnetic body. Also, the other core end portion 2011d is positioned to face metallic body for comparison 2020 having material, conductivity or permeability almost identical to the ones of object to be detected 2014. With respect to conductivity, if object 2014 is non-magnetic, metallic body 2020 should be non-magnetic. With respect to permeability, if object 2014 is magnetic, metallic body 2020 should be magnetic. Further, if object 2014 is aluminum, copper, ferrite, permalloy and the like, metallic body 2020 should be the same material, such as aluminum, copper, ferrite, permalloy, or a combination of magnetic materials or a combination of non-magnetic materials.

In the case of a motor shaft as the object to be detected 2014, when object 2014 moves in the vertical direction in the figure in relation to displacement sensor 2010, the position of one core end portion 2011c becomes closer to or away from object 2014. As a result, the distance 2100 between the two members changes. Herein, the other core end portion 2011d remains at a given position without changing distance 2101 in relation to metallic body for comparison 2020.

Therefore, the position, at which the output from detecting coil 2012 becomes zero, is where distance 2101, between metallic body for comparison 2020 and the other core end portion 2011d, is equal to distance 2100, between object 2014 and one core end portion 2011c. By establishing a range of change in distance 2100 to be equal to or smaller than the one of distance 2101 (0=2100=2101), a significant change in the detection output and excellent linearity can be obtained.

According to the displacement sensor in this embodiment, a difference between the detection output from object to be detected 2014 and the detection output from metallic body for comparison 2020 is provided as an amount of change. Therefore, one can change a position, at which the difference becomes zero, by changing the distance 2101 between metallic body 2020 and core end portion 2011c (2011d). As a result, a large amount of change in the output is obtained such that detection accuracy and identification performance are increased resulting in improved linearity.

The present invention is not limited to the above-described embodiments as various modifications are applicable within the scope of the present invention.

For example, magnetizing coils 2013c and 2013d are positioned on each side of detection coil 2012 at the center in the above embodiment. However, a magnetizing coil can be placed at the center and detecting coils can be pleced on each side.

The width of core end portion 2011c is established to be narrower than the width of core center portion 2011a ($W_2 < W_1$) in the above embodiment. However, one can establish those widths equally or establish the size relation thereof to be reverse of the above. Also, core center portion 2011a of core body 2011 has a notch at the position around which detection coil 2012 is wound. However, it can be formed as a simple rectangle without the notch.

In addition, a piece of thin plate is used as a core body in the above embodiment. However, one can employ a three-dimensional core body which can be formed as a simple rectangle without a notch.

Further, disc-shaped object to be detected 2014 can be modified to be a shaft such as a rotational shaft of a motor. In this case, displacement sensor 2010 is mounted on the fixed side of the motor. If the motor has a fixed shaft, displacement sensor 2010 is mounted to the fixed shaft such that the rotor side becomes the object to be detected 2014. Also, to detect the point of origin, displacement sensor 2010 can be placed on the fixed side while the object to be detected 2014 is placed on the slider side.

Moreover, a pair of magnetizing coils 2013c and 2013d are continually formed in series. However, one may connect magnetizing coils 2013c and 2013d in parallel to alternating current power supply 2015 to form opposed magnetic fields.

According to the displacement sensor of this invention, magnetizing coils and a detecting coil are separately placed such that detection is performed based on the balance between the pair of magnetizing coils. As a result, a compact core body can provide an amount of change, after removing impedance due to the direct current resistance and the like by canceling out, with excellent linearity. Also, instead of a constant current circuit as in a conventional configuration, an inexpensive circuit can provide stable detection operation regardless of fluctuations in the surrounding temperature. Therefore, a simple configuration can accurately provide stable detection results resulting in improved performance and reliability.

According to the displacement sensor of this invention, using a piece of a thin plate, a core body is formed thin such that the whole sensor can be minimized.

According to the displacement sensor of this invention, a core end portion, to which an object to be detected approaches, is formed narrow to improve the current efficiency therein. As a result, more magnetic fluxes are converged such that detection sensitivity is improved. Therefore, the above discussed effects can be further enhanced.

Also, engaging projection portions are formed at the borders of the core center portion with the core end portions such that the positions of coils to be wound can be accurately determined. This decreases deviation in phases while a large rate of change can be obtained.

Further, detection is performed by using the difference between the detection output from an object to be detected and the detection output from a metallic body for comparison as an amount of change. Also, the output at the initial position in a detection section required for the object to be detected is established to be zero by varying the material of the metallic body for comparison. As a result, a large amount of change in the output is provided such that higher detection performance and excellent linearity are obtained.

Moreover, according to the displacement sensor of this invention, a pair of the magnetizing coils form opposed magnetic fields such that ideal differential output can be obtained. Therefore, highly accurate detection is enabled.

Additional preferred embodiments of a proximity sensor in accordance with the present invention are described below.

Figure 37:
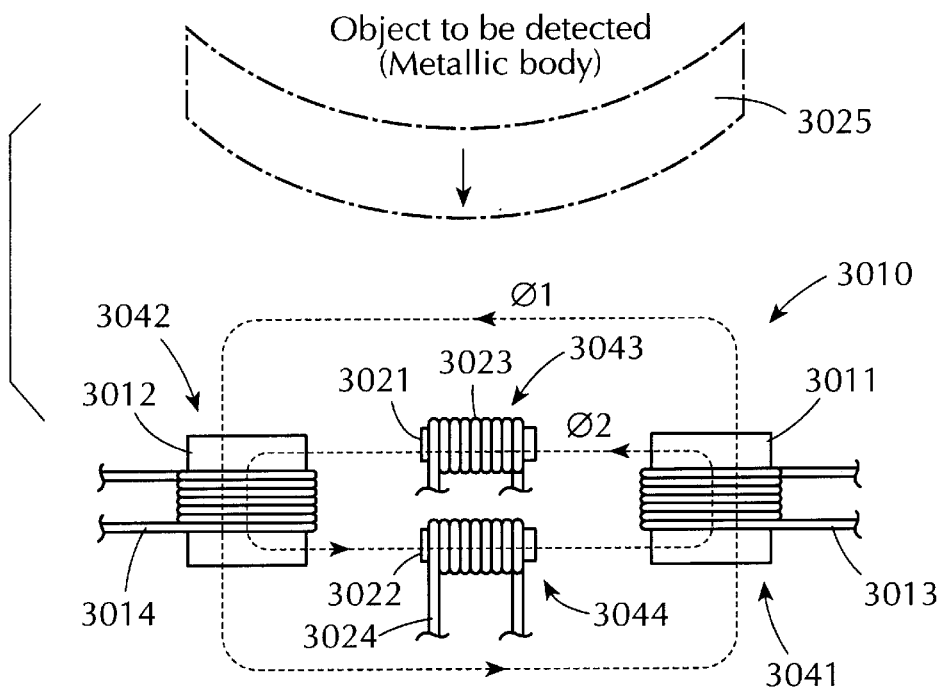
FIG. 37 is a schematic view of a proximity sensor of the present invention.

FIG. 37 shows a proximity sensor 3010 including a first magnetizing portion 3041, a second magnetizing portion 3042, a first magnetism detecting portion 3043 and a second magnetism detecting portion 3044. The first magnetizing portion 3041 and second magnetizing portion 3042 are disposed at a predetermined interval. The first magnetism detecting portion 3043 and the second magnetism detecting portion 3044 are disposed between the first magnetizing portion 3041 and the second magnetizing portion 3042.

The first magnetizing portion 3041 includes a magnetizing core 3011 and a magnetizing coil 3013 which is wound around the magnetizing core 3011. In the same way as the first magnetizing portion 3041, the second magnetizing portion 3042 includes a magnetizing core 3012 and a magnetizing coil 3014 which is wound around the magnetizing core 3012. The magnetizing core 3011 of the first magnetizing portion 3041 and the magnetizing core 3012 of the second magnetizing portion 3042 are disposed in parallel and in the same direction as shown in FIG. 37.

On the other hand, the first magnetism detecting portion 3043 includes a detecting core 3021 and a detecting coil 3023 which is wound around the detecting core 3021. In the same way as the first magnetism detecting portion 3043, the second magnetism detecting portion 3044 includes a detecting core 3022 and a detecting coil 3024 which is wound around the core 3022. The detecting core 3021 of the first magnetism detecting portion 3043 and the detecting core 3022 of the second magnetism detecting portion 3044 are disposed in parallel to each other and in a direction perpendicular to that of the magnetizing core 3011 or the magnetizing core 3012, i.e., in a right and left direction as in FIG. 37. The magnetizing core 3011, the magnetizing core 3012, the detecting core 3021 and the detecting core 3022 are separated magnetically from each other.

When an electric current is applied to both the magnetizing coil 3013 and the magnetizing coil 3014, a magnetic flux is generated and the magnetic field is generated between the magnetizing core 3011 and the magnetizing core 3012. The magnetic flux which is generated between the magnetizing core 3011 and the magnetizing core 3012 includes a magnetic flux 1 which comes out from the core 3011, enters the core 3012, comes out from the core 3012 and enters the core 3011, and a magnetic flux 2 which comes out from the magnetizing core 3011, passes through the detecting core 3021, enters the core 3012, comes out from the core 3012, passes through the detecting core 3022 and enters the core 3011. An object 3025 to be detected made of metal is placed on the path of the above mentioned magnetic flux 1.

In other words, a flux path which passes through the object 3025 to be detected and a flux path which passes through the magnetism detecting portions 3043 and 3044 are formed by both the magnetizing portions 3041 and 3042. FIG. 37 shows a going path of the magnetic flux bound from the core 3011 to the core 3012 and a returning path of the magnetic flux bound from the core 3012 to the core 3011, as indicated by arrows. The magnetism detecting portion 3043 is placed on the going path and the magnetism detecting portion 3044 is placed on the returning path.

Figure 38A:
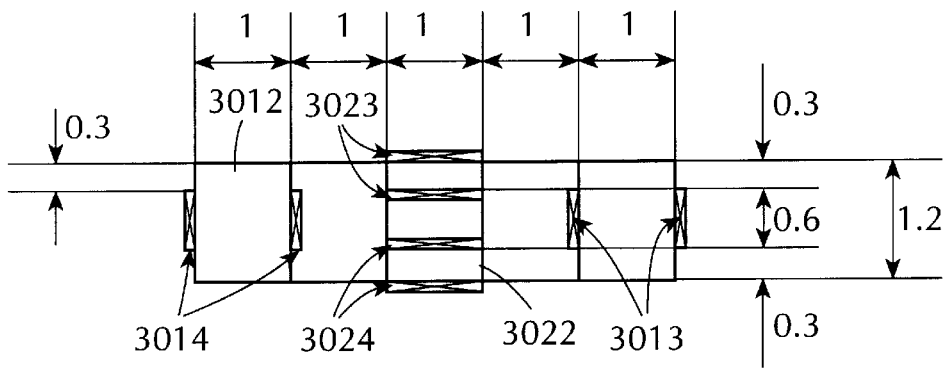
FIGS. 38(a) and (b) are front and bottom views of an embodiment of the present invention which show the size of each portion, respectively.
Figure 38B:
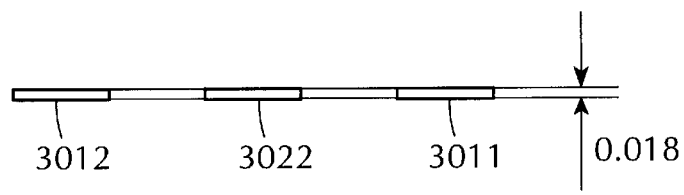

As shown in FIG. 38, the above mentioned magnetizing cores 3011 and 3012 are a thin plate and have the same rectangular shape. The detecting cores 3021 and 3022 are a thin plate and have the same rectangular shape. The four cores are disposed on an identical plane. Therefore, the magnetic fluxes 1 and 2 are distributed in one plane.

Figure 41A:
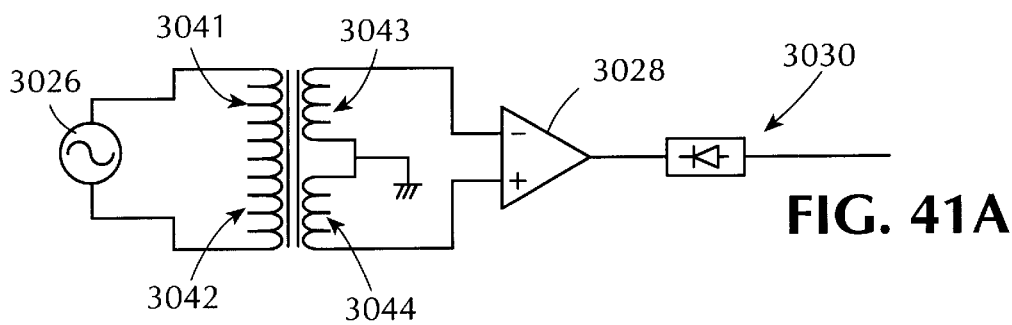
FIG. 41 is an example of an energized circuit in which electricity flows in the magnetizing portions and a detecting circuit in which the magnetism detecting portions are used.
Figure 41B:
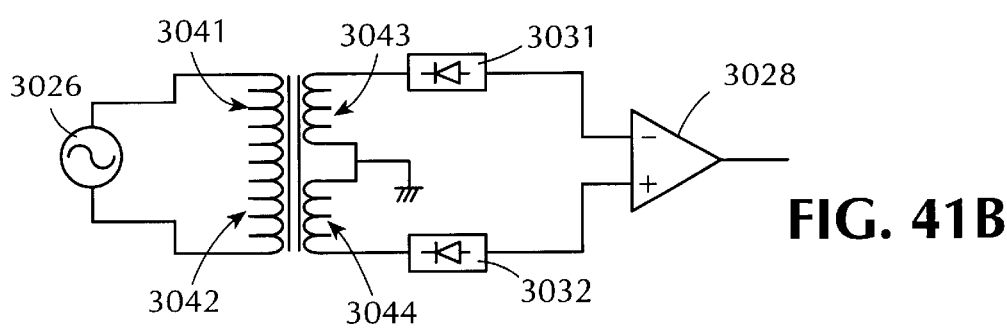

An example of an energized circuit in which electricity flows in the magnetizing portions 3041 and 3042 and a detecting circuit in which the magnetism detecting portions 3043 and 3044 are used is shown in FIGS. 41(*a*) and (*b*). In each of two examples of circuits, an alternating current power is supplied to the coils of the magnetizing portions 3041 and 3042 from an alternating current power supply 3026, and a differential output between the magnetism detecting portions 3043 and 3044 is output. A commercial sine-wave alternating current power supply or a power supply which supplies a pulse current power is used as the alternating current power supply 3026. In the example in FIG. 41(*a*), the output from the detecting coil of the magnetism detecting portion 3043 is input to the minus "−" terminal of a differential amplifier 3028 and the output from the detecting coil of the magnetism detecting portion 3044 is input to the plus "+" terminal of the differential amplifier 3028, and a differential output is output from the differential amplifier 3028 and then input in a rectifier 3030 in which the differential output is rectified. In the example in FIG. 41(*b*), the output from the detecting coil of the magnetism detecting portion 3043 is rectified in a rectifier 3031 and then input to the minus "−" terminal of a differential amplifier 3028 and an output from the detecting coil of the magnetism detecting portions 3044 is rectified in a rectifier 3032 and then input to the plus "+" terminal of the differential amplifier 3028 resulting in an output of a differential output from the differential amplifier 3028.

The constructions of the magnetic pole, the magnetizing coil and the differential detecting coil which are included by the magnetic sensor portion are not limited to those shown in FIGS. 41(*a*) and (*b*). The present invention can be applicable to any differential magnetism sensor apparatus which includes a magnetizing coil which generates a closed loop magnetic field and a differential detecting coil which detects a variation of a magnetic flux passing through the magnetizing coil.

In FIG. 37, when the object 3025 to be detected made of metal is not placed or is far from the proximity sensor 3010, the magnetic flux which passes through the detecting core 3021 of the magnetism detecting portion 3043 balances approximately with the magnetic flux which passes through the detecting core 3022 of the magnetism detecting portion 3044, resulting in approximately no differential output between the detecting coils 3023 and 3024.

When the object 3025 to be detected approaches the proximity sensor 3010 and enters a first flux path, the first magnetic flux 1 is changed by the object 3025 to be detected. When the object 3025 to be detected is a nonmagnetic metal, an eddy current flows in the object 3025 to be detected because the magnetic flux 1 changes alternatively. As the result, a magnetic field is generated by the eddy current in a direction to block the magnetic flux 1, in other words to cancel the magnetic flux 1. Therefore, the magnetic flux 1 which passes through the flux path from the magnetizing core 3011 to the magnetizing core 3012 decreases. On the other hand, the magnetic flux 2 which passes through the detecting core 3021 of the magnetism detecting portions 3043 increases. The total amount of the magnetic fluxes 1 and 2 decreases.

As a result, since an output of the detection generated by the detecting coil 3023 increases, the location of the object 3025 to be detected can be detected. However, in the example in FIG. 37, the differential output between the detecting coils 3023 and 3024 is output. The magnetic flux which passes through the detecting core 3022 of the magnetism detecting portions 3044 on the opposite side of the object 3025 to be detected varies according to the total magnetic flux of the magnetic fluxes 1 and 2. When the total amount of the magnetic fluxes 1 and 2 decreases as described above, the output from the detecting coil 3024 decreases. Therefore, when the differential output between the detecting coils 3023 and 3024 is output, the sensitivity of the near sensor improves because of a large variation of output corresponding to a variation of the location of the object 3025 to be detected.

When the differential output between the first detecting coil 3023 and the second detecting coil 3024 is output, the output of the detection with a large variation rate can be obtained, resulting in a near sensor with a very high sensitivity compared with a conventional near sensor. In addition, the magnetism detecting portion 3043 and the magnetism detecting portion 3044 have the same structure. Therefore, when the differential output between the magnetism detecting portions 3043 and 3044 is output, a variation of output by a variation of temperature in each of the magnetism detecting portions 3043 and 3044 is canceled, resulting in the output of the detection with a good temperature characteristic which is hardly affected by a variation of temperature.

In FIG. 37, when the object 3025 to be detected is a magnetic metal and an eddy current is hard to generate because of a low magnetizing frequency, or when the object 3025 to be detected is a magnetic metal and an eddy current is hard to generate because of a low conductivity of the magnetic metal, the result opposite to that obtained when the object 3025 to be detected is a conductive metal is obtained. In other words, when the object 3025 to be detected approaches, the magnetic flux 1 increases and the magnetic flux 2 decreases. Therefore, the increase or decrease of the magnetic flux 2 which passes through the second flux path is thought to be a variation of the location of the object 3025 to be detected. In this way, the location of the object 3025 to be detected made of metal can be detected by means of a variation of the rate of the magnetic fluxes 1 and 2 which passes through the first flux path and the second flux path, respectively.

FIG. 38 shows the size of each portion in the above mentioned embodiment. The unit of the size is mm. The width of each of the magnetizing cores 3011 and 3012 is 1 mm. The length of each of the detecting cores 3021 and 3022 is 1 mm. The thickness of each of the magnetizing cores 3011 and 3012 and the detecting cores 3021 and 3022 is 0.018 mm. The four cores are disposed on an identical plane. An interval between the magnetizing core 3011 and the detecting core 3021 and that between the detecting core 3021 and the magnetizing cores 3012 are 1 mm, respectively. An interval between the detecting cores 3021 and 3022 which are parallel each other is 0.6 mm. The magnetizing coils 3013 and 3014 are wound around the same range of the magnetizing cores 3011 and 3012 as the interval between the detecting cores 3021 and 3022, respectively. Therefore, both the ends of the magnetizing cores 3011 and 3012 have a range of 0.3 mm around which the magnetizing coils 3013 and 3014 are not wound, respectively. In FIG. 38, the length or the size in a longitudinal direction of each of the magnetizing cores 3011 and 3012 is 1.2 mm, and the side surfaces which are on the outside of each of the detecting cores 3021 and 3022 each other are positioned on a line connecting both the end surfaces in a longitudinal direction of the magnetizing cores 3011 and 3012. The magnetizing coil and the detecting coil which have a thickness (φ) of 0.02 mm are wound around 40 times. Magnetic material made of amorphous ribbon is used as the core.

Figure 39:
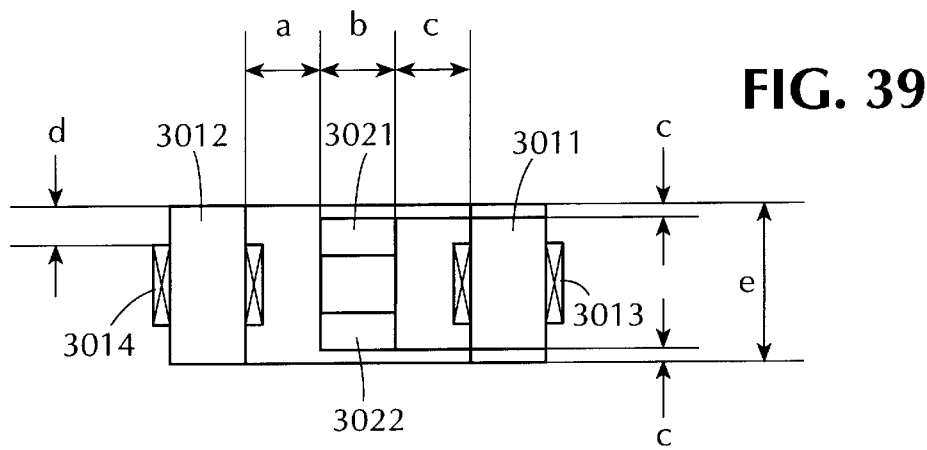
FIG. 39 is a front view of an embodiment of the present invention which shows a preferable configuration of the portions.

FIG. 39 shows the location of each of the above mentioned cores and coils using a code. The interval between the magnetizing core 3011 and the detecting cores 3021 and 3022 and the interval between the detecting cores 3021 and 3022 and the magnetizing core 3012, the length of each of the detecting cores 3021 and 3022, the length of each of the magnetizing cores 3011 and 3012, the size in a longitudinal direction of the end part of each of the magnetizing cores 3011 and 3012 projecting in a longitudinal direction from the outside surface of the detecting cores 3021 or 3022, and the size in a longitudinal direction of the end part of the magnetizing cores 3011 and 3012 around which the magnetizing coils 3013 and 3014 are not wound, respectively, are designated as a, b, e, c and d. A variation characteristic of output of the detection of the detecting coils 3023 and 3024 corresponding to a variation of the location of the object to be detected, in other words the rate of the above mentioned magnetic fluxes 1 and 2 varies according to the above mentioned sizes.

Therefore, a good linearity of an output of the detection and a large variation of an output of the detection can be obtained according to setting the above mentioned sizes as follows: a=b is desirable, c≧0 is desirable, it is desirable that "d" is small, and it is desirable that "e" is small.

The above mentioned embodiment provides the following effect. The conventional magnetic proximity sensor which detects a variation of the impedance detects a whole variation of a magnetic resistance in the core—air—object to be detected through which a magnetic flux passes. Also, the near sensor in accordance with the above mentioned embodiment examines the magnetic flux which is effected largely according to the location of the object to be detected. In addition, the detecting coil is disposed independently in such a location as to detect efficiently the magnetic flux. Therefore, a near sensor which shows a high sensitivity can be obtained, because of a large variation of an output of the detection corresponding to a variation of the location of the object to be detected.

In this connection, the conventional magnetic proximity sensor shows about 10–20% of a variation of output compared with an output in the absence of the object to be detected (present at an infinite distance). On the other hand, the proximity sensor in accordance with the above mentioned embodiment which has only the detecting coil 3023 shows about 160–170% of a variation of output compared with an output in the absence of the object to be detected present at an infinite distance). The proximity sensor in accordance with the above mentioned embodiment in which the differential output between the first detecting coil 3023 and the second detecting coil 3024 is output shows about 700–800% of a variation of output compared with an output in the absence of the object to be detected (present at an infinite distance).

The conventional magnetic proximity sensor which detects a variation of the impedance detects a whole variation of a magnetic resistance in the core—air—object to be detected which a magnetic flux passes through. The magnetic resistance generated when the magnetic flux passes through the air is effected by the square of the distance between the object to be detected and the core, and the larger ratio of the magnetic resistance to the whole magnetic resistance gives a better sensitivity. In other words, the better the sensitivity is, the worse the linearity of the output of the detection is.

On the other hand, the proximity sensor in accordance with the embodiment which detects the increase or decrease of a variation of the magnetic flux shows a good linearity. When the object to be detected made of metal approaches the proximity sensor, the impedance of the magnetizing coil hardly changes. The proximity sensor in accordance with this embodiment does not need a constant-current circuit.

The proximity sensor in accordance with the embodiment which detects a differential output from the first and second magnetism detecting portions shows an improved temperature characteristic and shows a high sensitivity as described above.

Figure 40:
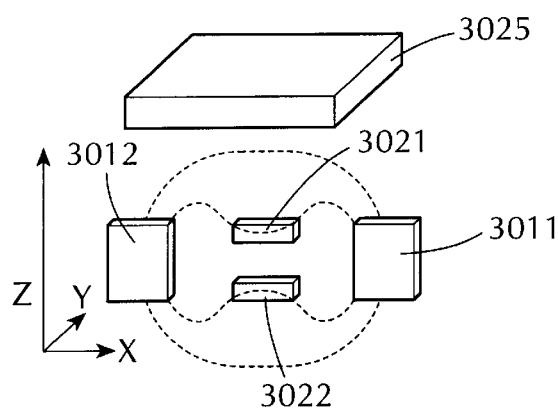
FIG. 40 is a perspective view which shows a scheme of distribution of the magnetic flux in an embodiment of the present invention.
Figure 44:
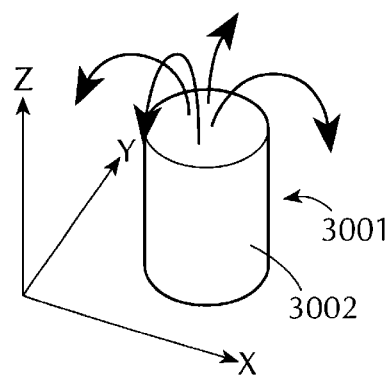
FIG. 44 is a perspective view which shows a scheme of distribution of the magnetic flux in the conventional proximity sensor.

In the conventional magnetic proximity sensor, since a magnetic flux to detect the object to be detected is distributed in the X, Y, and Z directions in the three-dimensional space as shown in FIG. 44, the size of the sensor needs to have a three-dimensional shape. On the other hand, since the proximity sensor in accordance with the embodiment has approximately a two-dimensional shape in the X and Z directions as shown in FIG. 40, the proximity sensor can have a thin shape in the Y direction or have a small thickness in the Y direction. The proximity sensor can have the cores with a thickness of tens μm. Therefore, amorphous ribbon can be used as a material of the core.

Another embodiment of a proximity sensor of the present invention is described below.

Figure 42:
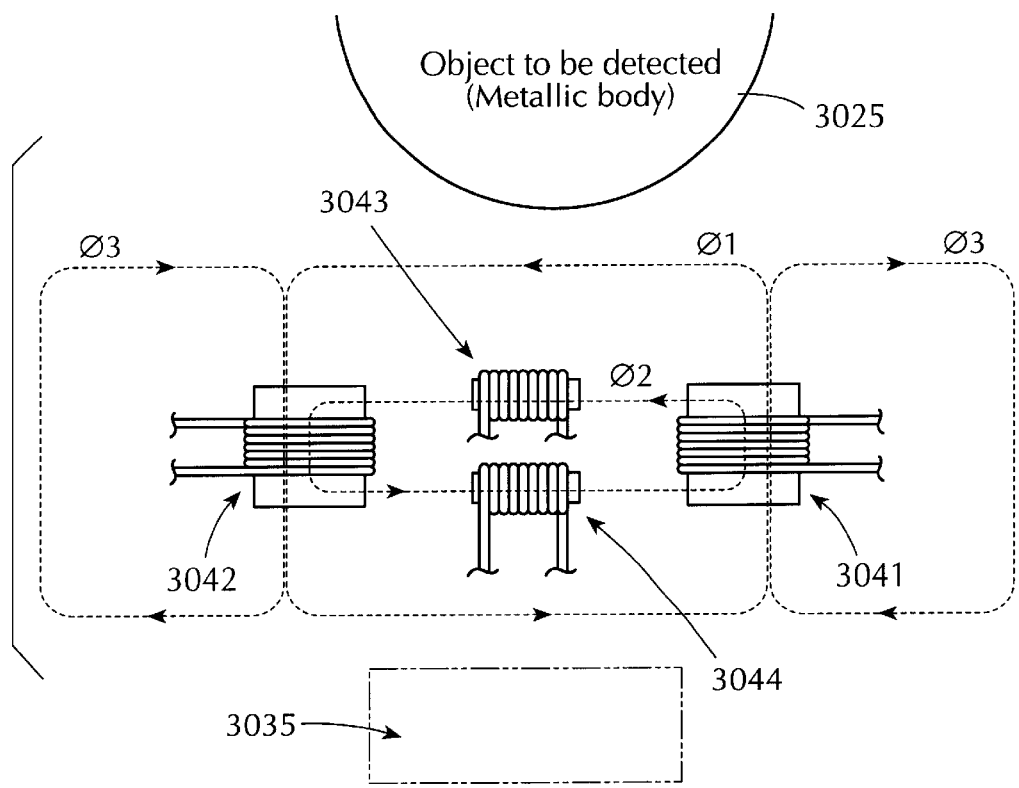
FIG. 42 is a schematic view of another embodiment of a proximity sensor of the present invention.

FIG. 42 shows the structure of another embodiment with a higher sensitivity than the above embodiment. In this embodiment, two flux paths are generated between two magnetizing portions 3041 and 3042, and a metal 3035 made of approximately the same material or having approximately the same conductivity with the object 3025 to be detected is disposed on the flux path on the opposite side of the flux path which passes through the object 3025 to be detected. The metal 3035 is disposed at the predetermined distance from the proximity sensor. On the basis of the distance, the output of the detection which is output from the first and second magnetism detecting portions 3043 and 3044 is compared as a differential output resulting in the output of the detection having a high resolution. In addition, the embodiment can be applied to a location controlling apparatus in which, on the basis of the distance from the present sensor to the metal 3035, the sensor is set so that the differential output is 0 when the base distance is equal to the distance from the present sensor to the object 3025 to be detected, and which regulates the location of the object 3025 to be detected so that the differential output is 0.

Figure 43:
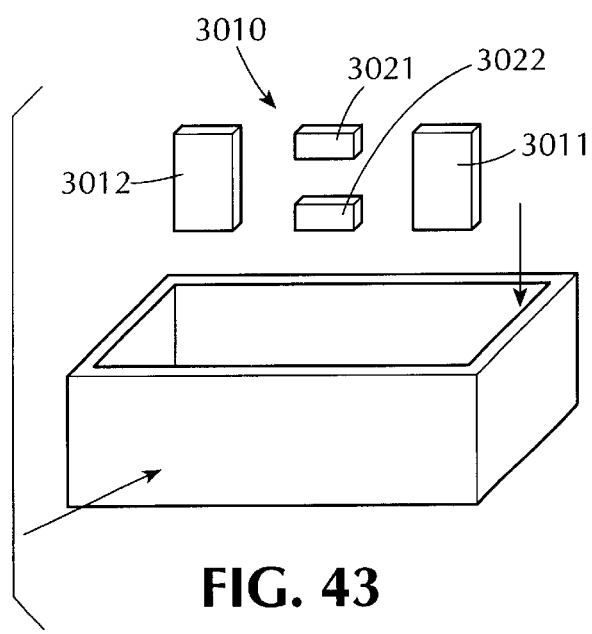
FIG. 43 is a perspective disassembly view of another embodiment of a proximity sensor of the present invention.

FIG. 42 shows another embodiment of a near sensor of the present invention which has the structure with a much higher sensitivity than the above embodiment. When electricity flows in the magnetizing coils 3013 and 3014, not only the first and second magnetic fluxes 1 and 2 but also a magnetic flux 3 which comes out from the magnetizing cores 3011 and 3012 and return to the magnetizing cores 3011 and 3012, respectively, are generated as shown in FIG. 42. When the magnetic flux 3 is reduced or totally removed, the magnetic fluxes 1 and 2 increase corresponding to the reduction of the magnetic flux 3, resulting in a further improvement of the sensitivity. Therefore, the whole proximity sensor 3010 including the magnetizing cores 3011 and 3012 and the detecting cores 3021 and 3022 is in a case 3036 made of nonmagnetic metal with a high conductivity as shown in FIG. 43. In this embodiment, since the magnetic resistance of the flux path which the magnetic flux 3 passes through increases, it is difficult for the magnetic flux to pass through the flux path. Therefore, the first and second magnetic fluxes 1 and 2 increase corresponding to the reduction of the magnetic flux 3, resulting in a further improvement of the sensitivity. At least one of the faces of the case 3036 is open and the object 3025 to be detected is located on the side of the open face of the case 3036.

As such, the magnetism detecting portion which includes the detecting core and the detecting coil which is wound around the detecting core is disposed between two magnetizing portions, a variation of the magnetic flux on the flux path which passes through the object to be detected according to the location of the object to be detected varies the magnetic flux on the flux path which passes through the magnetism detecting portion, and the location of the object to be detected is detected by means of a variation of an output of the detection from the magnetism detecting portion. Therefore, the magnetic flux varies largely according to the location of the object to be detected resulting in a sensitive near sensor with a good linearity.

Furthermore, two magnetism detecting portions are disposed between two magnetizing portions so that two magnetism detecting portions are on the going path and returning path of the magnetic flux, respectively, and the detecting coil of each of two magnetism detecting portions is wired so that the differential output between two magnetism detecting portions is output. The location of the object to be detected is detected by means of the differential output, resulting in a highly sensitive proximity sensor with a good temperature characteristic.

Also, each magnetizing core and the detecting core which are a plate with a rectangular shape are disposed on an identical plane. Since the magnetic flux is distributed in the two-dimensional space, the magnetic flux can be used effectively to detect the object to be detected. Therefore, the sensitivity of the proximity sensor can be improved by increasing the ratio of the variation of the magnetic flux to the variation of the location of the object to be detected. In addition, a proximity sensor which has a thin shape or a small thickness can be obtained.

In addition, a metal made of approximately the same material or having approximately the same conductivity with the object to be detected is disposed on the flux path on the opposite side of the flux path which passes through the object to be detected. Therefore, a more highly sensitive near sensor can be obtained by means of the differential output between two detecting coils.

What is claimed is:

1. A coin identifying sensor comprising first and second thickness detecting sensor portions placed at both ends of a coin transferred along a guide wherein each of said first and second thickness detecting sensor portions comprise a combination of sensor bodies having a "] (U)"-shaped cross section wherein:
    said first thickness detecting sensor portion is placed in the vicinity of one side of said coin in the thickness direction while said second thickness detecting sensor portion is placed in the vicinity of the other side of said coin;
    magnetizing coils and first and second detecting coils are wound around said first and second thickness detecting sensor portions; and
    said magnetizing coils of said first and second thickness are connected in series and said first detecting coil and said second detecting coil are connected in phase and are configured to be differential.

2. A coin identifying sensor in comprising first and second thickness detecting sensor portions placed at both ends of a coin transferred along a guide wherein each of said first and second thickness detecting sensor portions comprise a combination of sensor bodies having a "] (U)"-shaped cross section wherein:
    said first thickness detecting sensor portion is placed in the vicinity of one side of said coin in the thickness direction while said second thickness detecting sensor portion is placed in the vicinity of the other side of said coin;
    magnetizing coils and first and second detecting coils are wound around said first and second thickness detecting sensor portions; and
    said magnetizing coils of said first and second thickness are connected in series and said first detecting coil and said second detecting coil are connected in phase and are configured to be differential;
    wherein said coin has edges which are positioned unbalanced in relation to magnetic poles of said first thickness detecting sensor portion and said second thickness detecting sensor portion.

3. A coin identifying sensor in comprising first and second thickness detecting sensor portions placed at both ends of a coin transferred along a guide wherein each of said first and second thickness detecting sensor portions comprise a combination of sensor bodies having a "] (U)"-shaped cross section wherein:
    said first thickness detecting sensor portion is placed in the vicinity of one side of said coin in the thickness direction while said second thickness detecting sensor portion is placed in the vicinity of the other side of said coin;
    magnetizing coils and first and second detecting coils are wound around said first and second thickness detecting sensor portions; and
    said magnetizing coils of said first and second thickness are connected in series and said first detecting coil and said second detecting coil are connected in phase and are configured to be differential;
    wherein said first thickness detecting sensor portion and said second thickness detecting sensor portion are placed at a point symmetrical from each other.

4. A coin identifying sensor comprising:
    a first thickness detector disposed on one side of a coin to be identified, the first thickness detector having at least one U-shaped sensing body, a first magnetizing coil and first detecting coil wound around the first thickness detector; and
    a second thickness detector disposed on the other side of the coin being identified, the second thickness detector having at least one U-shaped sensing body, a second magnetizing coil and second detecting coil wound around the second thickness detector;
    the first and second magnetizing coils being connected in series, the first and second detecting coils being connected in phase and configured to be differential.

5. The coin identifying sensor according to claim 4, wherein:
    each of the first and second thickness detectors includes first and second free ends;
    the first free ends of the first and second thickness detectors are disposed near the edge of the coin; and
    the second free end of the first thickness detector is disposed on the side of an upper surface of the coin and the second free end of the second thickness detector is disposed on the side of a lower surface of the coin.

6. The coin identifying sensor according to claim 4, wherein:

the first thickness detector includes a second detector coil and the at least one U-shaped sensing body of the first thickness detector includes first and second U-shaped sensing bodies positioned back to back to each other; and the second thickness detector includes a first detector coil and the at least one U-shaped sensing body of the second thickness detector includes first and second U-shaped sensing bodies positioned back to back to each other.

7. The coin identifying sensor according to claim 6, wherein:

the first detecting coil is wound around the first U-shaped sensing body;

the second detecting coil is wound around the second U-shaped sensing body;

the first magnetizing coil is wound around the first and second sensing bodies of the first thickness detector; and the second magnetizing coil is wound around the first and second sensing bodies of the second thickness detector.

* * * * *